US010559111B2

(12) United States Patent
Sachs et al.

(10) Patent No.: US 10,559,111 B2
(45) Date of Patent: Feb. 11, 2020

(54) SYSTEMS AND METHODS FOR GENERATING COMPUTER READY ANIMATION MODELS OF A HUMAN HEAD FROM CAPTURED DATA IMAGES

(71) Applicant: LoomAi, Inc., San Francisco, CA (US)

(72) Inventors: Ian Sachs, Larkspur, CA (US); Kiran Bhat, San Francisco, CA (US); Dominic Monn, Mels (CH); Senthil Radhakrishnan, Oakland, CA (US); Will Welch, San Francisco, CA (US)

(73) Assignee: LoomAi, Inc., San Francisco, CA (US)

(*) Notice: Subject to any disclaimer, the term of this patent is extended or adjusted under 35 U.S.C. 154(b) by 0 days.

(21) Appl. No.: 16/221,321

(22) Filed: Dec. 14, 2018

(65) Prior Publication Data

US 2019/0122411 A1    Apr. 25, 2019

Related U.S. Application Data

(63) Continuation-in-part of application No. 15/885,667, filed on Jan. 31, 2018, now Pat. No. 10,169,905, (Continued)

(51) Int. Cl.
*G06T 13/40*  (2011.01)
*G06T 13/20*  (2011.01)
(Continued)

(52) U.S. Cl.
CPC .............. *G06T 13/40* (2013.01); *G06F 3/005* (2013.01); *G06K 9/00208* (2013.01);
(Continued)

(58) Field of Classification Search
None
See application file for complete search history.

(56) References Cited

U.S. PATENT DOCUMENTS 6,047,078 A    4/2000 Kang
6,088,042 A    7/2000 Handelman et al.
(Continued)

FOREIGN PATENT DOCUMENTS

EP     1884896 A2    2/2008
KR   20140033088 A   3/2014
(Continued)

OTHER PUBLICATIONS

International Preliminary Report on Patentability for International Application PCT/US2017/039136, Report issued Dec. 25, 2018, dated Jan. 3, 2019, 9 pgs.
(Continued)

*Primary Examiner* — Michelle Chin
(74) *Attorney, Agent, or Firm* — KPPB LLP

(57) ABSTRACT

System and methods for computer animations of 3D models of heads generated from images of faces is disclosed. A 2D captured image that includes an image of a face can be received and used to generate a static 3D model of a head. A rig can be fit to the static 3D model to generate an animation-ready 3D generative model. Sets of rigs can be parameters that each map to particular sounds or particular facial movement observed in a video. These mappings can be used to generate a playlists of sets of rig parameters based upon received audio or video content. The playlist may be played in synchronization with an audio rendition of the audio content. Methods can receive a captured image, identify taxonomy attributes from the captured image, select a template model for the captured image, and perform a shape solve for the selected template model based on the identified taxonomy attributes.

18 Claims, 56 Drawing Sheets
(38 of 56 Drawing Sheet(s) Filed in Color)

Related U.S. Application Data which is a continuation of application No. 15/632,251, filed on Jun. 23, 2017, now Pat. No. 10,062,198.

(60) Provisional application No. 62/767,393, filed on Nov. 14, 2018, provisional application No. 62/353,944, filed on Jun. 23, 2016, provisional application No. 62/367,233, filed on Jul. 27, 2016.

(51) Int. Cl.

| | | |
|---|---|---|
| *G06T 15/04* | (2011.01) | |
| *G06T 17/20* | (2006.01) | |
| *G06T 19/20* | (2011.01) | |
| *G06T 7/11* | (2017.01) | |
| *G06T 7/13* | (2017.01) | |
| *G06T 7/73* | (2017.01) | |
| *G06T 7/90* | (2017.01) | |
| *G06T 7/246* | (2017.01) | |
| *G06K 9/00* | (2006.01) | |
| *G06K 9/62* | (2006.01) | |
| *G06F 3/00* | (2006.01) | |
| *G06K 9/46* | (2006.01) | |
| *H04N 7/15* | (2006.01) | |

(52) U.S. Cl.
CPC ..... *G06K 9/00234* (2013.01); *G06K 9/00255* (2013.01); *G06K 9/00281* (2013.01); *G06K 9/00308* (2013.01); *G06K 9/4628* (2013.01); *G06K 9/6218* (2013.01); *G06K 9/6273* (2013.01); *G06T 7/11* (2017.01); *G06T 7/13* (2017.01); *G06T 7/246* (2017.01); *G06T 7/248* (2017.01); *G06T 7/73* (2017.01); *G06T 7/90* (2017.01); *G06T 13/205* (2013.01); *G06T 15/04* (2013.01); *G06T 17/20* (2013.01); *G06T 19/20* (2013.01); *H04N 7/157* (2013.01); *G06T 2207/10016* (2013.01); *G06T 2207/10024* (2013.01); *G06T 2207/20021* (2013.01); *G06T 2207/20036* (2013.01); *G06T 2207/20081* (2013.01); *G06T 2207/20084* (2013.01); *G06T 2207/30201* (2013.01); *G06T 2219/2012* (2013.01); *G06T 2219/2021* (2013.01)

(56) References Cited

U.S. PATENT DOCUMENTS

| | | |
|---|---|---|
| 6,278,466 B1 | 8/2001 | Chen |
| 6,466,215 B1 | 10/2002 | Matsuda et al. |
| 6,535,215 B1 | 3/2003 | Wideman et al. |
| 6,552,729 B1 | 4/2003 | Di Bernardo et al. |
| 6,554,706 B2 | 4/2003 | Kim et al. |
| 6,556,196 B1 | 4/2003 | Blanz et al. |
| 6,700,586 B1 | 3/2004 | Demers |
| 6,714,200 B1 | 3/2004 | Talnykin |
| 7,149,330 B2 | 12/2006 | Liu et al. |
| 7,168,953 B1 | 1/2007 | Poggio et al. |
| 7,209,139 B1 | 4/2007 | Keet et al. |
| 7,372,536 B2 | 5/2008 | Shah et al. |
| 7,433,490 B2 | 10/2008 | Huang et al. |
| 7,522,165 B2 | 4/2009 | Weaver |
| 7,859,546 B2 | 12/2010 | Gornowicz et al. |
| 7,937,253 B2 | 5/2011 | Anast et al. |
| 8,004,519 B2 | 8/2011 | Gornowicz et al. |
| 8,035,643 B2 | 10/2011 | Pighin et al. |
| 8,112,254 B1 | 2/2012 | Bhat et al. |
| 8,130,225 B2 | 3/2012 | Sullivan et al. |
| 8,144,153 B1 | 3/2012 | Sullivan et al. |
| 8,174,528 B1 | 5/2012 | Conran et al. |
| 8,199,152 B2 | 6/2012 | Sullivan et al. |
| 8,237,729 B1 | 8/2012 | Hery |
| 8,390,628 B2 | 3/2013 | Harding et al. |
| 8,537,164 B1 | 9/2013 | Pighin et al. |
| 8,542,236 B2 | 9/2013 | Sullivan et al. |
| 8,553,037 B2 | 10/2013 | Smith et al. |
| 8,610,716 B1 | 12/2013 | Conran et al. |
| 8,614,714 B1 | 12/2013 | Koperwas et al. |
| 8,624,904 B1 | 1/2014 | Koperwas et al. |
| 8,649,555 B1 | 2/2014 | Bhat et al. |
| 8,659,596 B2 | 2/2014 | Corazza et al. |
| 8,666,119 B1 | 3/2014 | Bhat et al. |
| 8,681,158 B1 | 3/2014 | Sullivan et al. |
| 8,704,832 B2 | 4/2014 | Aguiar et al. |
| 8,744,121 B2 | 6/2014 | Polzin et al. |
| 8,749,556 B2 | 6/2014 | De Aguiar et al. |
| 8,786,610 B1 | 7/2014 | Pighin et al. |
| 8,797,328 B2 | 8/2014 | Corazza et al. |
| 8,854,376 B1 | 10/2014 | Bhat et al. |
| 8,860,731 B1 | 10/2014 | Coehn Bengio et al. |
| 8,913,839 B2 | 12/2014 | Ricanek, Jr. et al. |
| 8,928,672 B2 | 1/2015 | Corazza et al. |
| 8,928,674 B1 | 1/2015 | Sullican et al. |
| 8,941,665 B1 | 1/2015 | Sullivan et al. |
| 8,982,122 B2 | 3/2015 | Corazza et al. |
| 8,988,435 B1 | 3/2015 | Cohen Bengio |
| 9,001,132 B1 | 4/2015 | Bhat et al. |
| 9,123,175 B1 | 9/2015 | Goldenthal et al. |
| 9,142,055 B1 | 9/2015 | Bhat et al. |
| 9,165,393 B1 | 10/2015 | Low et al. |
| 9,183,660 B2 | 11/2015 | Koperwas et al. |
| 9,196,074 B1 | 11/2015 | Bhat et al. |
| 9,256,973 B2 | 2/2016 | Koperwas et al. |
| 9,317,740 B2 | 4/2016 | Ricanek, Jr. et al. |
| 9,317,954 B2 | 4/2016 | Li et al. |
| 9,342,912 B1 | 5/2016 | Pighin et al. |
| 9,508,178 B2 | 11/2016 | Jutan et al. |
| 9,508,179 B2 | 11/2016 | Jutan et al. |
| 9,600,742 B2 | 3/2017 | Yu et al. |
| 9,626,788 B2 | 4/2017 | Corazza et al. |
| 9,721,385 B2 | 8/2017 | Herman |
| 9,747,495 B2 | 8/2017 | Corazza et al. |
| 9,786,084 B1 | 10/2017 | Bhat et al. |
| 9,792,479 B2 | 10/2017 | Mallet et al. |
| 9,898,849 B2 | 2/2018 | Du et al. |
| 9,916,538 B2 | 3/2018 | Zadeh et al. |
| 10,062,198 B2 | 8/2018 | Bhat et al. |
| 10,169,905 B2 | 1/2019 | Bhat et al. |
| 10,198,845 B1 | 2/2019 | Bhat et al. |
| 10,452,896 B1 | 10/2019 | Weise et al. |
| 2002/0050988 A1 | 5/2002 | Petrov et al. |
| 2003/0164829 A1 | 9/2003 | Bregler et al. |
| 2003/0169907 A1 | 9/2003 | Edwards et al. |
| 2003/0208116 A1 | 11/2003 | Liang et al. |
| 2003/0215130 A1 | 11/2003 | Nakamura et al. |
| 2004/0021660 A1 | 2/2004 | Ng-Thow-Hing et al. |
| 2004/0049309 A1 | 3/2004 | Gardner et al. |
| 2004/0210427 A1 | 10/2004 | Marschner et al. |
| 2004/0218894 A1 | 11/2004 | Harville et al. |
| 2004/0227752 A1 | 11/2004 | McCartha et al. |
| 2005/0062739 A1 | 3/2005 | Balmelli et al. |
| 2005/0264572 A1 | 12/2005 | Anast et al. |
| 2006/0002631 A1 | 1/2006 | Fu et al. |
| 2006/0109274 A1 | 5/2006 | Alvarez et al. |
| 2006/0126924 A1 | 6/2006 | Liu et al. |
| 2006/0134585 A1 | 6/2006 | Adamo-villani et al. |
| 2006/0171590 A1 | 8/2006 | Lu et al. |
| 2006/0228040 A1 | 10/2006 | Simon et al. |
| 2006/0245618 A1 | 11/2006 | Boregowda et al. |
| 2006/0267978 A1 | 11/2006 | Litke et al. |
| 2007/0091085 A1 | 4/2007 | Wang et al. |
| 2007/0104351 A1 | 5/2007 | Yang et al. |
| 2007/0167779 A1 | 7/2007 | Kim et al. |
| 2007/0182736 A1 | 8/2007 | Weaver |
| 2008/0002862 A1 | 1/2008 | Matsugu et al. |
| 2008/0024487 A1 | 1/2008 | Isner et al. |
| 2008/0030497 A1 | 2/2008 | Hu et al. |
| 2008/0031512 A1 | 2/2008 | Mundermann et al. |
| 2008/0043021 A1 | 2/2008 | Huang et al. |
| 2008/0152213 A1 | 6/2008 | Medioni et al. |
| 2008/0158224 A1 | 7/2008 | Wong et al. |

(56) References Cited

U.S. PATENT DOCUMENTS

| | | |
|---|---|---|
| 2008/0170077 A1 | 7/2008 | Sullivan et al. |
| 2008/0170078 A1 | 7/2008 | Sullivan et al. |
| 2008/0180448 A1 | 7/2008 | Anguelov et al. |
| 2008/0187213 A1 | 8/2008 | Zhang et al. |
| 2008/0187246 A1 | 8/2008 | Andres Del Valle |
| 2008/0252596 A1 | 10/2008 | Bell et al. |
| 2008/0284779 A1 | 11/2008 | Gu et al. |
| 2009/0027337 A1 | 1/2009 | Hildreth |
| 2009/0067730 A1 | 3/2009 | Schneiderman |
| 2009/0195544 A1 | 8/2009 | Wrinch |
| 2009/0196466 A1 | 8/2009 | Capata et al. |
| 2009/0196475 A1 | 8/2009 | Demirli et al. |
| 2009/0202114 A1 | 8/2009 | Morin et al. |
| 2009/0202144 A1 | 8/2009 | Taub et al. |
| 2009/0231347 A1 | 9/2009 | Omote |
| 2010/0007665 A1 | 1/2010 | Smith et al. |
| 2010/0020073 A1 | 1/2010 | Corazza et al. |
| 2010/0073361 A1 | 3/2010 | Taylor et al. |
| 2010/0134490 A1 | 6/2010 | Corazza et al. |
| 2010/0141662 A1 | 6/2010 | Storey et al. |
| 2010/0149179 A1 | 6/2010 | de Aguiar et al. |
| 2010/0203968 A1 | 8/2010 | Gill et al. |
| 2010/0235045 A1 | 9/2010 | Craig et al. |
| 2010/0238182 A1 | 9/2010 | Geisner et al. |
| 2010/0253703 A1 | 10/2010 | Ostermann |
| 2010/0259547 A1 | 10/2010 | de Aguiar et al. |
| 2010/0271366 A1 | 10/2010 | Sung et al. |
| 2010/0278405 A1 | 11/2010 | Kakadiaris et al. |
| 2010/0285877 A1 | 11/2010 | Corazza |
| 2011/0234581 A1* | 9/2011 | Eikelis ............... G06K 9/00228 345/419 |
| 2011/0292034 A1 | 12/2011 | Corazza |
| 2011/0296331 A1 | 12/2011 | Iyer et al. |
| 2011/0304622 A1 | 12/2011 | Rogers et al. |
| 2011/0304629 A1 | 12/2011 | Winchester et al. |
| 2012/0019517 A1 | 1/2012 | Corazza et al. |
| 2012/0038628 A1 | 2/2012 | Corazza et al. |
| 2012/0130717 A1 | 5/2012 | Xu et al. |
| 2012/0327091 A1 | 12/2012 | Eronen et al. |
| 2013/0021348 A1 | 1/2013 | Corazza et al. |
| 2013/0100140 A1 | 4/2013 | Ye et al. |
| 2013/0127853 A1 | 5/2013 | Corazza et al. |
| 2013/0215113 A1 | 8/2013 | Corazza et al. |
| 2013/0235045 A1 | 9/2013 | Corazza et al. |
| 2013/0257877 A1 | 10/2013 | Davis et al. |
| 2013/0271451 A1 | 10/2013 | Tong et al. |
| 2013/0311412 A1 | 11/2013 | Lazar et al. |
| 2014/0035934 A1 | 2/2014 | Du Yangzhou et al. |
| 2014/0043329 A1 | 2/2014 | Wang et al. |
| 2014/0160116 A1 | 6/2014 | de Aguiar et al. |
| 2014/0204084 A1 | 7/2014 | Corazza et al. |
| 2014/0285496 A1 | 9/2014 | de Aguiar et al. |
| 2014/0313192 A1 | 10/2014 | Corazza et al. |
| 2014/0313207 A1 | 10/2014 | Taylor et al. |
| 2015/0145859 A1 | 5/2015 | Corazza et al. |
| 2015/0193975 A1 | 7/2015 | Corazza et al. |
| 2015/0262405 A1 | 9/2015 | Black et al. |
| 2015/0358613 A1 | 12/2015 | Sandrew et al. |
| 2015/0363634 A1 | 12/2015 | Yin et al. |
| 2016/0328384 A1 | 11/2016 | Divakaran et al. |
| 2017/0053663 A1 | 2/2017 | Yu et al. |
| 2017/0372505 A1 | 12/2017 | Bhat et al. |
| 2018/0174348 A1 | 6/2018 | Bhat et al. |

FOREIGN PATENT DOCUMENTS

| | | |
|---|---|---|
| WO | 2007132451 A2 | 11/2007 |
| WO | 2009007701 A1 | 1/2009 |
| WO | 2010060113 A1 | 5/2010 |
| WO | 2010129721 A2 | 11/2010 |
| WO | 2010129721 A3 | 6/2011 |
| WO | 2011123802 A1 | 10/2011 |
| WO | 2012012753 A1 | 1/2012 |
| WO | 2017223530 A1 | 12/2017 |

OTHER PUBLICATIONS

International Search Report and Written Opinion for International Application PCT/US2010/033797, completed Jun. 11, 2010, 5 pgs.

International Search Report and Written Opinion for International Application No. PCT/US2009/057155, completed Dec. 22, 2009, dated Jan. 12, 2010, 10 pgs.

International Search Report and Written Opinion for International Application No. PCT/US2009/065825, completed Jan. 21, 2010, dated Jan. 28, 2010, 9 pgs.

International Search Report and Written Opinion for International Application No. PCT/US2017/039136, Search completed Aug. 21, 2017, dated Sep 5, 2017, 17 Pgs.

International Search Report and Written Opinion for International Application PCT/US2011/045060, completed Nov. 27, 2011, 6 pgs.

U.S. Appl. No. 14/222,390, Non-Final Office Action Received May 22, 2014, 66 pgs.

Written Opinion of the International Searching Authority for International Application No. PCT/US09/57155, date completed Dec. 22, 2009, dated Jan. 12, 2010, 6 pgs.

Written Opinion of the International Searching Authority for International Application No. PCT/US09/65825, date completed Jan. 21, 2010, dated Jan. 28, 2010, 6 pgs.

Written Opinion of the International Searching Authority for International Application No. PCT/US2010/033797, filed May 5, 2010, completed Jun. 11, 2010, 4 pgs.

Written Opinion of the International Searching Authority for International Application No. PCT/US2011/045060, completed Nov. 27, 2011, 5 pgs.

Alkawaz et al, "Blend Shape Interpolation and FACS for Realistic Avatar", 3D Research vol. 6, No. 6, Jan. 2015, 11 pgs.

Allen At Al., "The Space of Human Body Shapes: Reconstruction and Parameterization from Range Scans", ACM Transactions on Graphics, Jul. 2004, vol. 22, No. 3, pp. 587-594.

Allen et al., "Articulated Body Deformation from Range Scan Data", ACM Transactions on Graphics, Jul. 21-26, 2002, vol. 21, No., 8 pgs.

Anguelov et al., "Recovering Articulated Object Models from 3D Range Data", In Proceedings of the 20th Conference on Uncertainty in Artificial Intelligence, Jul. 7-11, 2004, 9 pgs.

Anguelov et al., "SCAPE: Shape Completion and Animation of People", Printed Oct. 14, 2013, from www.robotics.stanford.edu/!drago/projects/scape/scape.html, 1 page.

Anguelov et al., "The Correlated Correspondence Algorithm for Unsupervised Registration of Nonrigid Surfaces", Advance in Neural Information Processing Systems, vol. 17, 8 pgs.

Baran, Llya S. , "Using Rigging and Transfer to Animate 3D Characters", Thesis, Sep. 2010, 82 pgs.

Baran et al, "Automatic rigging and animation of 3D characters", ACM Transactions on Graphics (TOG)—Proceedings of ACM SIGGRAPH 2007, Jul. 2007, vol. 26, Issue 3, 8 pgs.

Beaudoin et al., "Adapting Wavelet Compression to Human Motion Capture Clips", Graphics Interface, May 28-30, 2007, pp. 313-318.

Blanz et al., "A morphable model for the synthesis of 3D faces", SIGGRAPH '99 Proceedings of the 26th annual conference on Computer graphics and interactive techniques, Jul. 1, 1999, pp. 187-194.

Blanz et al., "Reanimating faces in images and video", Eurographics, Sep. 2003, vol. 22, No. 3, 10 pgs.

Booth et al., "A 3d morphable model learnt from 10,000 faces", In Proceedings of the IEEE Conference on Computer Vision and Pattern Recognition 2016, pp. 5543-5552.

Bray, "Markerless Based Human Motion Capture: A Survey", Published 2001, Televirtual Ltd., Norwich, UK, 44 pgs.

Buenaposada et al., "Performance Driven Facial Animation Using Illumination Independent Appearance-Based Tracking", Proceedings of ICPR, Hong Kong, Aug. 2006, 4 pgs.

Cheung et al., "Shape-from Silhouette of Articulated Objects and its use for Human Body Kinematics Estimation and Motion Capture", In Conference on Computer Vision and Pattern Recognition (CVPR), Jun. 18-20, 2003, 8 pgs.

Cootes et al., "Active appearance models", Proc. European Conference on Computer Vision, 1998, vol. 2, 16 pgs.

(56) References Cited

OTHER PUBLICATIONS

Corazza, Stefano et al., U.S. Appl. No. 12/579,334, Notice of Allowance dated Feb. 7, 2014, 7 pgs.
Curio et al., "Semantic 3D Motion Retargeting for Facial Animation", ACM, Jul. 28, 2006, 8 pgs.
Curless et al., "A Volumetric Method of Building Complex Models from Range Images", Proceedings of SIGGRAPH, 1996, pp. 303-312.
Davis et al., "Filing Holes in Complex Surfaces Using Volumetric Diffusion", Symposium on 3D Data Processing, Visualization, and Transmission, Feb. 2002, 11 pgs.
De Aguiar et al., "Automatic Conversion of Mesh Animations into Skeleton-based Animations", Eurographics, Apr. 24, 2008, vol. 27, No. 2, 9 pgs.
De Aguiar et al., "Marker-Less 3D Feature Tracking for Mesh-Based Human Motion Capture", Human Motion, Oct. 27, 2007, LNCS 4818, 15 pgs.
Di Bernardo et al., "Generating Realistic Human Motions from Observations", submitted to Fifth European Conference on Computer Vision, ECCV 1998, pp. 1-12.
Gao et al., "Motion normalization: the preprocess of motion data", VRST '05, Nov. 7-9, 2005, pp. 253-256.
Garland et al., "Surface Simplification Using Quadric Error Metrics", Proceedings of SIGGRAPH, Aug. 3, 1997, 8 pgs.
Goncalves et al., "Reach Out and Touch Space (Motion Learning)", Proceedings, Third IEEE International Conference Apr. 14-16, 1998, 6 pgs.
Grassia, "Believable Automatically Synthesized Motion by Knowledge-Enhanced Motion Transformation", Thesis CMU-CS-00-163, Aug. 21, 2000, 215 pgs.
Grochow et al., "Style-Based Inverse Kinematics", ACM Transactions on Graphics, Aug. 1, 2004, vol. 23, No. 3, pp. 522-531.
Hahnel et al., "An Extension of the ICP Algorithm for Modeling Nonrigid Objects with Mobile Robots", Proceedings of the International Joint Conference on Artificial Intelligence (IJCAI), Aug. 9, 2003, 6 pgs.
He et al., "Deep residual learning for image recognition", arXiv:1512.03385 [cs.CV], in 2016 IEEE Conference on Computer Vision and Pattern Recognition, Dec. 10, 2015, 12 pgs.
Hilton et al., "From 3D Shape Capture to Animated Models", IEEE Computer Society, First International Symposium on 3D Processing, Visualization and Transmission (3DVPT2002), Jun. 19-21, 2002, 10 pgs.
Isidro et al., "Stochastic Refinement of the Visual Hull to Satisfy Photometric and Silhouette Consistency Constraints", Boston University Computer Science Tech. Report No. 2003-017, Jul. 31, 2003, Accepted to The Ninth International Conference on Computer Vision (ICCV 2003), 14 pgs.
Jones et al., "Fast multi-view face detection", Mitsubishi Electric Research Lab TR-20003-96, Aug. 2003, 11 pgs.
Ju et al., "Mean Value Coordinates for Closed Triangular Meshes", Proceedings of ACM SIGGRAPH, Jul. 31, 2005, 6 pgs.
Ju et al., "Reusable Skinning Templates Using Cage-based Deformations", ACM Transactions on Graphics (TOG)—Proceedings of ACM SIGGRAPH Asia 2008, vol. 27 Issue 5, Dec. 2008, 10 pgs.
Kahler et al., "Head Shop: Generating Animated Head Models with Anatomical Structure", ACM SIGGRAPH Symposium on Computer Animation, Jul. 21, 2002, 10 pgs.
Kalogerakis, "Machine Learning Algorithms for Geometry Processing by Example", Thesis, 2010, 178 pgs.
Laine et al., "Production-Level Facial Performance Capture Using Deep Convolutional Neural Networks", arXiv:1609.06536 [cs.CV], Jun. 2, 2017, retrieved from https://arxiv.org/abs/1609.06536 on Jul. 20, 2017, 10 pgs.
Larsson, "Morph targets and bone rigging for 3D facial animation", Bachelor's Thesis in Game Design, 15 hp Program: Speldesign och grafik, Jun. 2017, 31 pgs.
Lewis, "H.264/MPEG-4 AVC CABAC overview", Oct. 25, 2012, printed Jun. 24, 2013 from http://www.web.archive.org/web/20121025003926/www.theonlineoasis.co.uk/notes.html, 3 pgs.

Lewis et al., "Pose Space Deformation: A Unified Approach to Shape Interpolation and Skeleton-Drive Deformation", Proceedings of ACM SIGGRAPH, Jul. 1, 2000, pp. 165-172.
Liepa, "Filing Holes in Meshes", Proc. of the Eurographics/ACM SIGGRAPH Symposium on Geometry Processing, Jun. 23, 2003, 8 pgs.
Lin, M. et al., "Network in network", arXiv:1312.4400 [cs.NE], Dec. 18, 2013, 9 pgs.
Liu et al., "3D Motion Retrieval with Motion Index Tree", Computer Vision and Image Understanding, Jun. 1, 2003, vol. 92, pp. 265-284.
Lum et al., "Combining Classifiers for Bone Fracture Detection in X-Ray Images", Image Processing, 2005. ICIP 2005. IEEE International Conference on (vol. 1) Date of Conference: Sep. 11-14, 2005, 4 pgs.
Ma et al., "An Invitation to 3D Vision", Springer Verlag, Chapter 2, 2004, pp. 15-28.
Mamou et al., "Temporal DCT-based compression of 3D dynamic meshes", ICCOM'06 Proceedings of the 10th WSEAS international conference on Communications, Jul. 10-12, 2006, 6 pgs.
Mamou et al., "The New MPEG-4/FAMC Standard for Animated 3D Mesh Compression", IEEE 3DTV-CON'08, May 28-30, 2008, pp. 97-100.
Marsella, Stacy et al., "Virtual Character Performance From Speech", Proceedings of the 12th ACM SIGGRAPH/Eurographics Symposium on Computer Animation. ACM, Jul. 19, 2013, 11 pgs.
Mekhilef et al., "Automatic Face Recognition System", The Institution of Engineers, Malaysia vol. 69, No. 2; Publication, Jun. 2, 2008, 9 pgs.
Mohr et al., "Building Efficient, Accurate Character Skins from Examples", ACM Transactions on Graphics, Jul. 27, 2003, vol. 22, No. 3, pp. 562-568.
Noh et al., "Expression Cloning", Proceedings of ACM SIGGRAPH, Aug. 12-17, 2001, published Aug. 1, 2001, 12 pgs.
Okada et al., "A Video Motion Capture System for Interactive Games.", MVA2007 IAPR Conference on Machine Vision Applications, May 16-18, 2007, pp. 186-189.
Park et al., "On-line locomotion generation based on motion blending", ACM SIGGRAPH Symposium on Computer Animation, Jul. 21, 2002, 8 pgs.
Park et al., "On-line motion blending for real-time locomotion generation", Computer Animation & Virtual Worlds, Jun. 16, 2004, vol. 15, pp. 125-138.
Persson, "ExMS: an animated and avatar-based messaging system for expressive peer communication", Group '03, Nov. 9-12, 2003, published Nov. 9, 2003, pp. 31-39.
Rotenberg, "Facial Expressions & Rigging", CSE169: Computer Animation, Instructor: Steve Rotenberg, UCSD, Spring 2016, 59 pgs.
Safonova et al., "Construction and optimal search of interpolated motion graphs", ACM SIGGRAPH, Jul. 2007, vol. 26, Issue 3, Article 106, published Aug. 8, 2007, 11 pgs.
Salazar et al., "Fully automatic expression-invariant face correspondence", Machine Vision and Applications. May 1, 2014;25(4), 27 pgs.
Sand et al., "Continuous Capture of Skin Deformation", ACM Transactions on Graphics, vol. 22, No. 3, Jul. 27, 2003, pp. 578-586.
Seitz et al., "A Comparison and Evaluation of Multi-View Stereo Reconstruction Algorithms", Computer Vision and Pattern Recognition, 2006 IEEE Computer Society Conference on. vol. 1. IEEE, Jun. 17, 2006, 8 pgs.
Seo et al., "An Automatic Modeling of Human Bodies from Sizing Parameters", In Symposium on Interactive 3D Graphics, Apr. 27, 2003, 9 pgs.
Sloan et al., "Shape by Example", In 2001 Symposium on Interactive 3D Graphics, Mar. 1, 2001, pp. 135-143.
Smola et al., "A Tutorial on support Vector Regression", In Technical Report NC2-TR-1998-030, NeuroCOLT2, Oct. 1998, 73 pgs.
Smola et al., "A Tutorial on Support Vector Regression", Statistics and Computing, Aug. 1, 2004, vol. 14, Issue 3, pp. 199-222.
Sumner et al., "Deformation Transfer for Triangle Meshes", Proceedings of ACM SIGGRAPH 2004, 23(3), Aug. 8, 2004, pp. 399-405.

(56) References Cited

OTHER PUBLICATIONS

Szegedy et al., "Going deeper with convolutions", 2015 IEEE Conference on Computer Vision and Pattern Recognition (CVPR), Jun. 7-12, 2015, pp. 1-9.
Szliski et al., "Matching 3D Anatomical Surfaces with Non-rigid Deformations Using Octree-Splines", International Journal of Computer Vision, May 1, 1996, vol. 18, No. 22, pp. 171-186.
Taylor et al., "Modeling Human Motion Using Binary Latent Variables", Proc. of Advances in Neural Information Processing Systems (NIPS), 2007, vol. 19, 8 pgs.
Tena et al., "Interactive region-based linear 3d face models", ACM Transactions on Graphics (TOG), vol. 30, No. 4, ACM, Aug. 7, 2011, 9 pgs.
Thies et al., "Face2Face: Real-time Face Capture and Reenactment of RGB Videos", 2016 IEEE Conference on Computer Vision and Pattern Recognition (CVPR), Jun. 27-30, 2016, 9 pgs.
Trigeorgis et al., "Mnemonic descent method: A recurrent process applied for end-to-end face alignment", 2016 IEEE Conference on Computer Vision and Pattern Recognition (CVPR), Jun. 27-30, 2016, 11 pgs.
Tung et al., "Topology Matching for 3D Video Compression", IEEE Conference Computer Vision and Pattern Recognition, Jun. 17-22, 2007, 8 pgs.
Vasilescu et al., "Multilinear Analysis of Image Ensembles: Tensorfaces", European Conference on Computer Vision (ECCV), first online Apr. 29, 2002, 15 pgs.
Viola et al., "Fast multi-view face detection", Proc. of Computer Vision and Pattern Recognition, Jul. 15, 2003, 8 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vlasic et al., "Face Transfer with Multilinear Models", ACM Transactions on Graphics 24(3), Jul. 31, 2005, pp. 426-433.
Vlasic et al., "Multilinear Models for Face Synthesis", SIGGRAPH Research Sketch, 2004, 1 page.
Von Luxburg, "A Tutorial on Spectral Clustering. Statistics and Computing", arXiv:0711.0189, Nov. 1, 2007, pp. 1-32.
Wang et al., "Multi-weight Enveloping: Least Squares Approximation Techniques for Skin Animation", ACM SIGGRAPH Symposium on Computer Animation, Jul. 21, 2002, 11 pgs.
Weise et al., "Face/off: Live facial puppetry", Proceedings of the 2009 ACM SIGGRAPH/Eurographics Symposium on Computer animation, Aug. 1, 2009, 10 pgs.
Weise et al., "Realtime performance-based facial animation", ACM Transactions on Graphics (TOG) 30.4, Aug. 7, 2011, Article No. 77, 9 pgs.
Wikipedia, Morph target animation, Last Modified Aug. 1, 2014, Retrieved from http://en.wikipedia.org/wiki/Morph_target_animation on Jan. 16, 2015, 3 pgs.
Xiao et al., "Control of motion in character animation", Proceedings of the Eighth International Conference on Information Visualization, IEEE Computer Society, Jul. 16, 2004, 8 pgs.
Zordan et al., "Dynamic Response for Motion Capture Animation", ACM Transactions on Graphics—Proceedings of ACM SIGGRAPH 2005, vol. 24, Issue 3, Jul. 31, 2005, 5 pgs.
Zulqarnain et al., "Shape-based automatic detection of a large number of 3D facial landmarks", In Proceedings of the IEEE conference on computer vision and pattern recognition 2015, 1 page.

\* cited by examiner

Thick  Average  Thin

Cleft     No Cleft

Input Photo — Average Template-based Solve — Taxonomy-based Solve

SYSTEMS AND METHODS FOR GENERATING COMPUTER READY ANIMATION MODELS OF A HUMAN HEAD FROM CAPTURED DATA IMAGES

CROSS REFERENCED APPLICATIONS

This Invention claims priority to U.S. Provisional Patent Application 62/767,393 and is a continuation-in-part of U.S. patent application Ser. No. 15/885,667, which is a continuation of U.S. patent application Ser. No. 15/632,251, which claims priority to U.S. Provisional Patent Application 62/353,944 titled "Accurate 3D Animatable Facial Models for Human Faces from Photographs and Video" filed on Jun. 23, 2016 and U.S. Provisional Patent Application 62/367,233 titled "Systems and Methods for Providing an Animation Model of a Head from Captured Images" filed on Jul. 27, 2016. The content of both of these applications is hereby incorporated by reference as if set forth herewith.

FIELD OF THE INVENTION

This invention relates to generating a 3D avatar including a face based upon captured image data of a user's face. More particularly, this invention relates to animating the 3D avatar based upon received audio content.

BACKGROUND OF THE INVENTION

The creation of computer generated 3D content is becoming popular. Computer generated 3D content typically includes one or more animation controls. A 3D model of an object can be specified using a mesh of vertices and polygons that define the shape of the object in 3D. The 3D model can also have a texture applied to the mesh that defines the appearance of the mesh. 3D models used for animation can also include a rig that defines the articulated portions of the mesh and/or define the deformation of the mesh of the model as a function of the motion of the rig. The process of defining the rig is often referred to as rigging a 3D model. The animation of a rigged 3D model involves applying motion data to the model's rig to drive the model's mesh. The generation of animation can be technically challenging and is often performed by artists with specialized training.

SUMMARY OF THE INVENTION

Systems and/or method for generating computer ready animation models of a human head from captured data images in accordance with some embodiments of the invention are performed by one or more processes performed by one or more processors in the following manner. A captured image in which a face is visible is received and a customized static 3D model of a head from the captured image is generated by a 3D model generation process. The 3D model generation process determines a geometry component of the face visible in the captured image. Texture components of the face visible in the captured image are determined by the generation process. The process also determines lighting components of the face visible in the captured image and camera properties of the image. The geometry component, texture components, lighting components, and camera properties are applied to a generative model to generate a customized static 3D model of a head based on the image and the customized static 3D model is optimized using a gradient-based optimization framework by the process.

In accordance with some embodiments, the optimizing includes enforcing smoothness between neighboring vertices of customized 3D model during the optimizing of the customized static 3D model using a gradient-based optimization framework by regularization of terms. In accordance with many embodiments, a texture regularization term imposes a penalty for vertex color difference between neighboring vertices on a mesh of the customized 3D model and a shape regularization term imposes an edge-smoothness penalty for a deviation for undeformed edge lengths of the mesh.

In accordance with some embodiments, an additional captured image in which the face is visible is received and the customized static 3D model is optimized based upon the additional captured image.

In accordance with many embodiments, a segmentation process is performed to identify a hair region of the face in the captured image. In accordance with a number of embodiments, the segmentation process is performed by: projecting the captured image onto a determined geometry of the face to generate a 3D static model of the face, pixels of the face belonging to textured regions are identified, the pixels of the face are clustered by projected color, regions of pixels of the face that are skin identified, a hairline on the face is determined from the clustered pixels, and a facial boundary for the face is constructed based on the hairline. In accordance with a few embodiments, the segmentation process may also construct a hairline halo by expanding outward from the facial boundary and determine regions that image hair and that do not image hair in the hairline halo. In accordance with some particular embodiments, the hairline halo is constructed by performing a morphological dilation of a skin region of the face and differencing a dilated skin region with a non-skin region of the face. In accordance with some other particular embodiments, the hairline halo is constructed by performing an erosion of a non-skin region of the face and differencing an eroded non-skin region with a skin region of the face.

In accordance with some embodiments, empty portions of the customized static 3D model are filled. In accordance with many embodiments, the empty portions are filled by: generating a visibility mask indicating portions of the face represented in the captured image from the captured image and the determined geometry of the face, calculating a boundary of the visible region, smoothing a boundary curve of the visibility region, generating a new visibility mask, identifying each non-visible region of the face based upon the new visibility mask, determining a matching visible region of each of the identified non-visible regions, extrapolating a skin color for each visible region, determining an extrapolated skin color for each matching visible region, and filling in each non-visible region with the extrapolated skin color determined for a corresponding matching visible region. In accordance with several of embodiments, high frequency details to each of the filled-in non-visible regions of the image. In accordance with a few embodiments, the high frequency details are added using a Laplacian pyramid of a template texture.

In accordance with some embodiments, the one or more processes determine a position for each of a plurality of facial landmarks in the image by performing a Mnemonic Descent Method (MDM) using a Convolutional Neural Network (CNN) and a Recurrent Neural Network (RNN) that are jointly trained. In accordance with many of these embodiments, the determining of the position of each of a plurality of landmarks is performed by: aligning each of the landmarks at positions aligned to a center of the face in the image, and iteratively re-calculating the position of each of the plurality of landmarks until a threshold value is met. The re-calculating being performed by: obtaining a patch of pixels of a predetermined size surrounding the position of each of the plurality of landmarks, applying the patch for each of the plurality of descriptors to the CNN to generate an N length descriptor describing each patch, concatenating the N length descriptors of each patch to generate a descriptor encapsulating all of the patches, projecting the descriptor encapsulating all of the patches through the RNN to determine an adjustment amount for each of the plurality of landmarks, and updating the landmarks based on the current position of each of the plurality of landmarks and the adjustment amount of each of the plurality of landmarks. In accordance with some embodiments, the CNN includes a global average pooling after a final convolution layer of the CNN to obtain a fixed output size that is invariant with size of an input patch. In accordance with many embodiments, the CNN includes an additional convolutional layer that is not included in the global average pooling to retain spatial information.

In accordance with some embodiments, the one or more processes generate a customized rig for the customized static 3D model from the captured image. In accordance with many embodiments the customized rig is generated by receiving video images that include the face, fitting a model rig to blend shapes of the customized static 3D model, tracking a 3D surface of the face in the received videos, and re-computing the blend shapes of the face to best fit the tracked 3D surface of the face from the video images. In accordance with a number of embodiments, the tracking of the 3D surfaced is performed on a per pixel basis.

In accordance with some embodiments, the one or more processes receive video images synchronized to audio data, track a 3D surface of the face in the frames of the video images to generate a set of rig parameters for a portion of the video images, and map the set of rig parameters for each portion of the video images to a corresponding synchronized portion of the audio data. In accordance with many embodiments, the tracking of the 3D surface to at least one of generating the set of rig parameters and mapping to the audio data is performed using a temporal model including a recurrent neutral network. In accordance a number of embodiments, the tracking of the 3D surface to generate the set of rig parameters and the mapping to the audio data is performed using a time series model including a convolutional neural network.

In accordance with some embodiments, the one or more processes receive an input of audio data and generate an animation playlist from input audio data from the mapping of the sets rig parameters to corresponding synchronized portions of the audio data.

In accordance with some embodiments, a generative adversarial network is for at least one of mapping the set of rig parameters for each portion of the video images to a corresponding synchronized portion of the audio data and generating an animation playlist from input audio data from the mapping of the sets rig parameters to corresponding synchronized portions of the audio data.

One embodiment includes a method for generating a three dimensional (3D) head model from a captured image. The method includes steps for receiving a captured image, identifying taxonomy attributes from the captured image, selecting a template model for the captured image, and performing a shape solve for the selected template model based on the identified taxonomy attributes.

In another embodiment, the set of taxonomy attributes includes a set of one or more local taxonomy attributes and a set of one or more global taxonomy attributes.

In yet another embodiment, the method performs a texture synthesis based on one or more of the local taxonomy attributes.

In a further embodiment, selecting a template model comprises identifying a set of global attributes from the captured image, and selecting the template model based on the set of global attributes.

In still another embodiment, identifying the set of global attributes includes using a classifier model to classify the captured image.

In a still further embodiment, the set of global attributes includes at least one of an ethnicity and a gender.

In yet another embodiment, identifying taxonomy attributes comprises using a single encoder model to generate an embedding of the captured image, using a set of one or more terminal models to analyze the generated embedding, and identifying taxonomy attributes based on the classifications of the terminal models.

In a yet further embodiment, taxonomy attributes includes one or more of head shape, eyelid turn, eyelid height, nose width, nose turn, mustache, beard, sideburns, eye rotation, jaw angle, lip thickness, and chin shape.

In another additional embodiment, each terminal model of the set of terminal models produces a score for an associated taxonomy attribute, wherein performing the shape solve for a given taxonomy attribute is based on the score calculated for the taxonomy attribute.

In a further additional embodiment, the method further includes steps for training an encoder and a plurality of terminal models, wherein each terminal model is trained to classify a different taxonomy attribute.

In another embodiment again, training the encoder comprises generating an embedding from the encoder, calculating a first loss for a first terminal model based on the generated embedding, back propagating the first calculated loss through the encoder, calculating a second loss for a second terminal model based on the generated embedding, and back propagating the second calculated loss through the encoder.

In a further embodiment again, receiving the captured image includes capturing an image with a camera of a mobile device, wherein performing the shape solve is performed on the same mobile device.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

DETAILED DESCRIPTION

Figure 1:
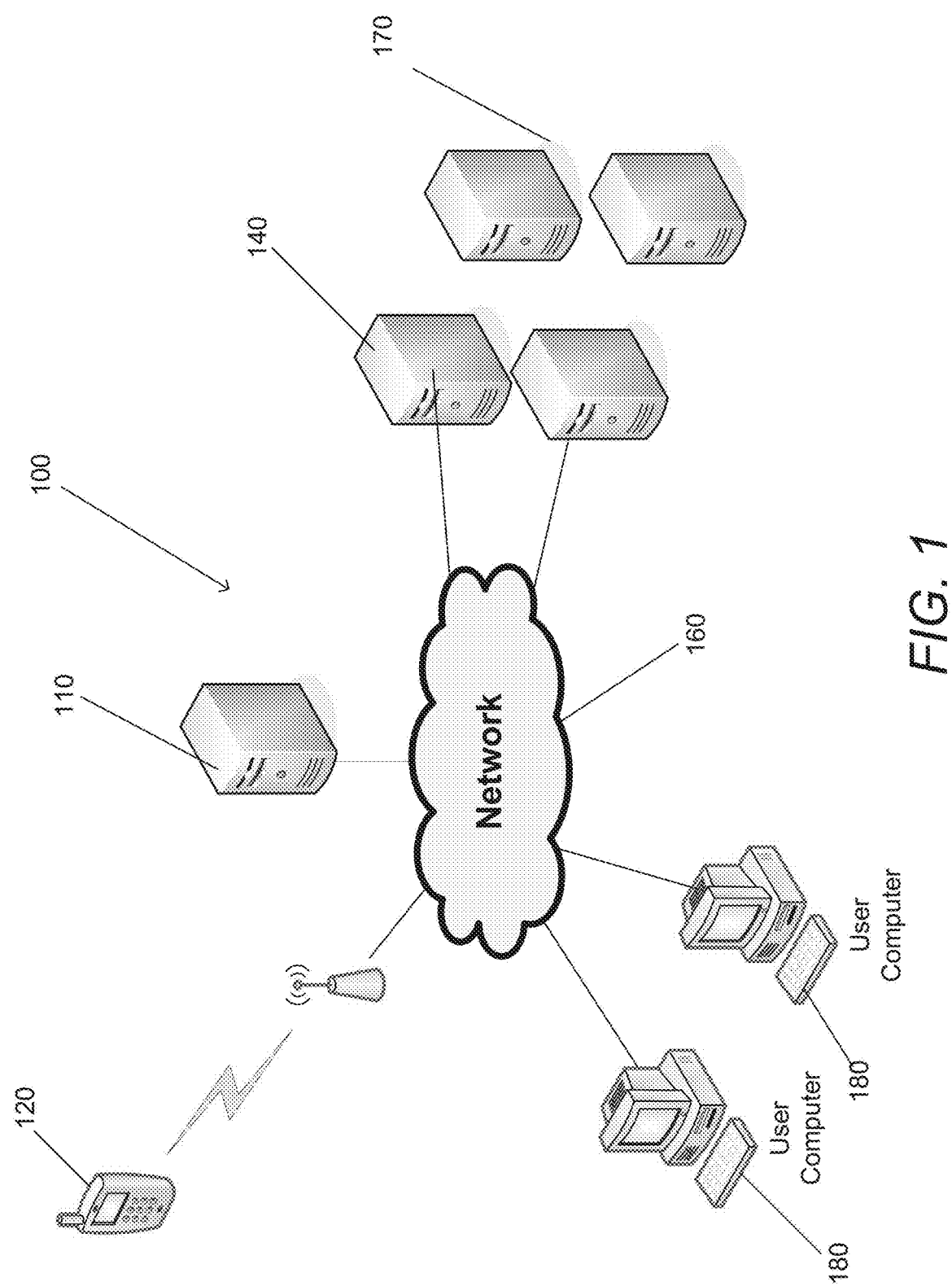
FIG. 1 illustrates a system for performing one or more processes to provide an animation-ready 3D model of a head in accordance with various embodiments of the invention.

Turning now to the drawings, systems and methods for generating animations of customized 3D models from received audio and/or video content in accordance with various embodiments of the invention are illustrated. Systems and processes in accordance with many embodiments of the invention provide a multi-scale multi-stage process for optimizing a customized 3D model and a rig and control curves for the rig to animate the customized 3D model. Systems in accordance with many embodiments of this invention can perform processes that can generate a static 3D model of a head from captured image data of the head and a customized rig for the 3D model. The term static 3D model typically refers to an unrigged 3D mesh. When the 3D mesh is rigged for animation, the 3D model can be referred to or animation ready. In several embodiments, the system can also animate the rigged or orientation-ready 3D model of the head mapping to rig parameters audio samples and/or video data. In accordance with the some other embodiments, the processes are performed by a "cloud" server system, a user device, and/or combination of devices local and/or remote from a user.

A process for generating a customized static 3D model of a head is performed in the following in manner in accordance with some embodiments. Image data including an image of a face is captured using an image capture device on a user device. In accordance with several of these embodiments, an application executed by the user device controls the image capture device to capture the image data. In accordance with many embodiments, the application determines whether the image of the face in the captured image meets certain criteria for further process and may require subsequent images to be captured until an image with a facial image that meets the criteria for further processing is captured. In a number of embodiments, the application may read the image from a memory of the user device. In many embodiments, the captured image is a 3D image capturing an image of a human face. In many embodiments, the captured image data includes depth measurements obtained from a depth sensor including (but not limited to) a time of flight camera and/or a structured light camera. In a number of embodiments, the image data includes images captured by multiple imagers captured using a plenoptic camera and/or images captured using a coded aperture from which depth information concerning distances to objects within a scene may be determined. The image data including the image of the face is transmitted to a server system for further processing in accordance with some embodiments. In many embodiments, the image is provided to a static 3D model generating process performed by the user device.

A static 3D model generating process in accordance with some embodiments of the invention generates a static 3D model of a face or head from the image data that includes an image of a face. In accordance with several embodiments, the process is performed by a server system that receives the captured image from an execution on a user device. In a number of embodiments, the process is performed by the user device that captured or received the data image. In some embodiments, the static 3D model generating process generates a static 3D model of a head from the image of the face in the captured image. In many embodiments, the process uses a generative animation model to model the face in the captured image. In accordance with embodiments, the generative animation model is based upon internal camera parameters, the shape of the face, the texture of the face and a translation vector.

To determine the texture of the face, the appearance of the face is factorized in accordance with some embodiments. In accordance with many embodiments, the appearance is factorized as a product of the skin albedo parameterized with a texture map and a low-frequency environmental lighting. In accordance with some embodiments, a Lambertian reflectance model of the face is used to model the low-frequency lighting and the lighting is represented as a combination of point light sources and/or spherical harmonic sources.

The shape of the face can be parameterized using deformers in accordance with some embodiments of the invention. The deformers can include a blend shape deformer, a corrective deformer and/or a free-form deformer. A blend shape deformer can include blend shape vectors that may be pre-computed using PCA on a data set of several hundred static 3D facial models in accordance with some embodiments. In accordance with many embodiments, the Facial Action Coding System (FACS) blend shapes may be constructed by an artist using 3D modelling tools. In several embodiments, the FACS blend shapes may be synthesized using muscle-based physical simulation systems. In accordance with many embodiments, a mean dataset is used for each different ethnicity. A corrective deformer can be a rigid-as-possible deformer algorithm to model the corrective deformer. A free-form deformer can allow each vertex to deform independently in accordance with many embodiments.

The static 3D model of the head generated from the captured image can be optimized in accordance with any of a variety of appropriate optimization criteria. In accordance with many embodiments, the optimization is a gradient-based optimization. The optimized static 3D model can be stored in memory and/or provided to a software application for use. In accordance with some embodiments, an application executing on a user device receives the 3D static model from a server system that generated the model via a network.

In accordance with some embodiments, a rig is generated for the static 3D model. The rig can be generated by applying a standard set FACS blend shapes to a mesh of the static 3D model of the head. The motion of one or more landmarks and/or 3D shapes in visible video can be tracked and the blend shapes of the static 3D model video recomputed based on the tracked landmarks and/or to provide a customized rig for the 3D model.

In many embodiments, a process for determining rig parameters, which may also be referred to as control curves that can be used to animate a 3D model of a face in response to sounds in audio samples is performed. In several embodiments, the process receives video of a face captured while speaking sequence and synchronized audio segment of the user speaking to determine user specific facial movements performed during speech. In certain embodiments, the user is prompted to recite specific text to capture facial movements that can be generalized to all speech. In accordance with a number of embodiments, the input image may be compared to a 3D static geometry and surface retargeting performed on the 3D static geometry to generate a customized rig for the static 3D model. The process can track the shape position in each frame of video associated with a particular sound to determine the specific parameters (i.e., motion data) that can move the 3D model of the face in a similar motion to the face visible on the video sequence. The rig parameters associated with each particular sound can be stored and may be used to generate computer animations using the 3D model based on received audio and/or text.

In accordance with some embodiments, by one or more software applications, the 3D model is animated based on received audio and/or text in the following manner. An input containing audio content can be received. If the input is audio data, the audio is sampled at a specified rate and the sound in each sample can be determined. If the audio content is text, the sounds of the words in the text is can be determined and used. The rig parameters associated with the sound(s) in the sample can be determined from the stored mapping and added to a playback queue. The rig parameter for each of the sounds can be determined from the stored mappings and used for playback. In accordance with a number of embodiments, an input text may be received. Each word in the input text indicates a particular expression to be animated and a map of words to expressions can be used to obtain the set(s) of rig parameters to add to a playlist based upon the works.

The above and other features and advantages of systems and methods in accordance with various embodiments of the invention that can generate animation-ready 3D models of human faces and computer animation using the 3D models are discussed below.

Systems that Provide Animation of a 3D Model of a Head from Received Audio Data

A system that provides animation of a 3D model of a head from received audio data in accordance with some embodiments of the invention is shown in FIG. 1. Network 100 includes a communications network 160. The communications network 160 is a network such as the Internet that allows devices connected to the network 160 to communicate with other connected devices. Server systems 110, 140, and 170 are connected to the network 160. Each of the server systems 110, 140, and 170 is a group of one or more servers communicatively connected to one another via internal networks that execute processes that provide cloud services to users over the network 160. For purposes of this discussion, cloud services are one or more applications that are executed by one or more server systems to provide data and/or executable applications to devices over a network. The server systems 110, 140, and 170 are shown each having three servers in the internal network. However, the server systems 110, 140 and 170 may include any number of servers and any additional number of server systems may be connected to the network 160 to provide cloud services. In accordance with various embodiments of this invention, processes for generating a 3D model and animating the 3D model based upon audio data are provided by executing one or more processes on a single server system and/or a group of server systems communicating over network 160.

Users may use personal devices 180 and 120 that connect to the network 160 to perform processes for receiving, performing and/or interacting with a deep learning network that uses systems and methods that provide supervised learning systems in accordance with various embodiments of the invention. In the illustrated embodiment, the personal devices 180 are shown as desktop computers that are connected via a conventional "wired" connection to the network 160. However, the personal device 180 may be a desktop computer, a laptop computer, a smart television, an entertainment gaming console, or any other device that connects to the network 160 via a "wired" and/or "wireless" connection. The mobile device 120 connects to network 160 using a wireless connection. A wireless connection is a connection that uses Radio Frequency (RF) signals, Infrared signals, or any other form of wireless signaling to connect to the network 160. In FIG. 1, the mobile device 120 is a mobile telephone. However, mobile device 120 may be a mobile phone, Personal Digital Assistant (PDA), a tablet, a smartphone, or any other type of device that connects to network 160 via a wireless connection without departing from this invention. In accordance with some embodiments of the invention, the processes for generating a 3D model of a head and/or animating the 3D model based upon audio data are performed by the user device. In many embodiments, an application being executed by the user device may capture or obtain image data including a face image and transmit the captured image data to a server system that performs additional processing based upon the received image data.

Processing Systems

Figure 2:
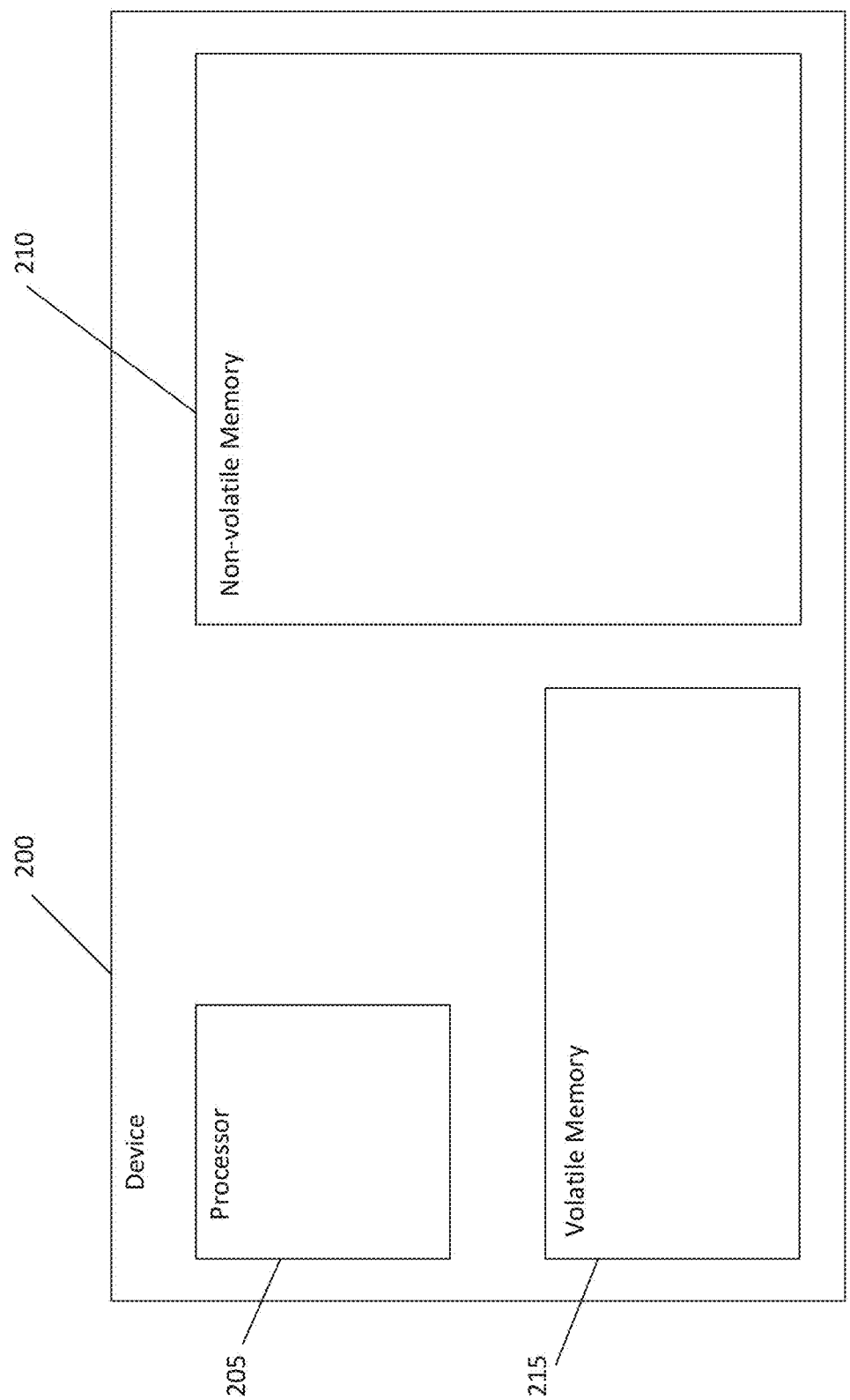
FIG. 2 illustrates components of a processing system in a device that executes one or more processes to provide an animation-ready 3D model of a head in accordance with various embodiments of the invention.

An example of a processing system in a device that executes instructions to perform processes that provide interaction with other devices connected to the network as shown in FIG. 1 and/or to provide animation of a 3D model of a face based upon received audio data in accordance with various embodiments of the invention is shown in FIG. 2. One skilled in the art will recognize that a particular processing system may include other components that are omitted for brevity without departing from this invention. The processing device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or the non-volatile memory 210 to manipulate data stored in the memory. The non-volatile memory 210 can store the processor instructions utilized to configure the processing system 200 to perform processes including processes in accordance with certain embodiments of the invention and/or data for the processes being utilized. In other embodiments, the processing system software and/or firmware can be stored in any of a variety of non-transient computer readable media appropriate to the requirements of a specific application. A network interface is a device that allows processing system 200 to transmit and receive data over a network based upon the instructions performed by processor 205. Although a processing system 200 is illustrated in FIG. 2, any of a variety of processing systems can be utilized within one or more to perform processes similar to those described herein as appropriate to the requirements of specific applications in accordance with embodiments of the invention.

Generating and Animating 3D Models

In accordance with some embodiments of the invention, an animation-ready 3D model of a face is generated from image data containing at least a two-dimensional (2D) image of a face and the generated 3D model may be animated by input audio data. In accordance with some of these embodiments, the generated 3D model of the face is animated-ready mappings of generating specific sets of rig parameters based upon to samples of audio data, video data, and/or text data. In many embodiments, a user device executes an application that obtains a captured 2D image of a face and transmits the image to a server system that performs processes that generate an animation-ready 3D model and animate the generated model using mappings of sets of rig parameters. The user device (or another user device) can receive the 3D model and necessary mappings of sets of rig parameters from the server systems and can use this information to display computer animations. In several embodiments, the user device only receives the generated animation-ready 3D model from the server system. In a number of embodiments, the server system renders a video sequence based upon the computer animation and user devices receive the rendered video sequences for decoding and display. In certain embodiments, a user device sends audio data to a server system that uses the audio data to generate mappings in the form of a playlist of sets of rig parameters. The user device can receive the playlist and apply the playlist to the 3D model to generate an animation synchronized to the audio data that may be played back at the same time. In several embodiments, the user device may perform some or all of the processes for generating the animation-ready 3D model of the face and/or producing the mapping of sets of rig parameters to audio samples. Processes for generating animation-ready 3D model from a user provided data including at least a captured 2D image of a face, mappings of sets of rig parameters, the generated 3D models, and the generation of playlists of sets of rig parameters based on received audio content in accordance with various embodiments of the invention are discussed further below.

Generation of Static 3D Models of a Head from 2D Captured Images of Faces

In accordance with some embodiments of the invention, 3D static models of head can be generated from 2D captured images of faces. In many embodiments, a 2D image is captured by a user device. An application executing on the user device can capture a 2D image of a face. In a number of embodiments, the application may determine whether the image of the face in the captured 2D image meets certain criteria for generating an animation-ready 3D model of the head and may require additional images of the face to be captured until an image that meets the criteria for generation of a 3D model or additional data can be met. In a number of embodiments, the application may also obtain camera characteristics of the image captured device and/or image information including, but not limited to depth information to provide to animation and mapping processes for use in generating the animation 3D model.

Figure 3:
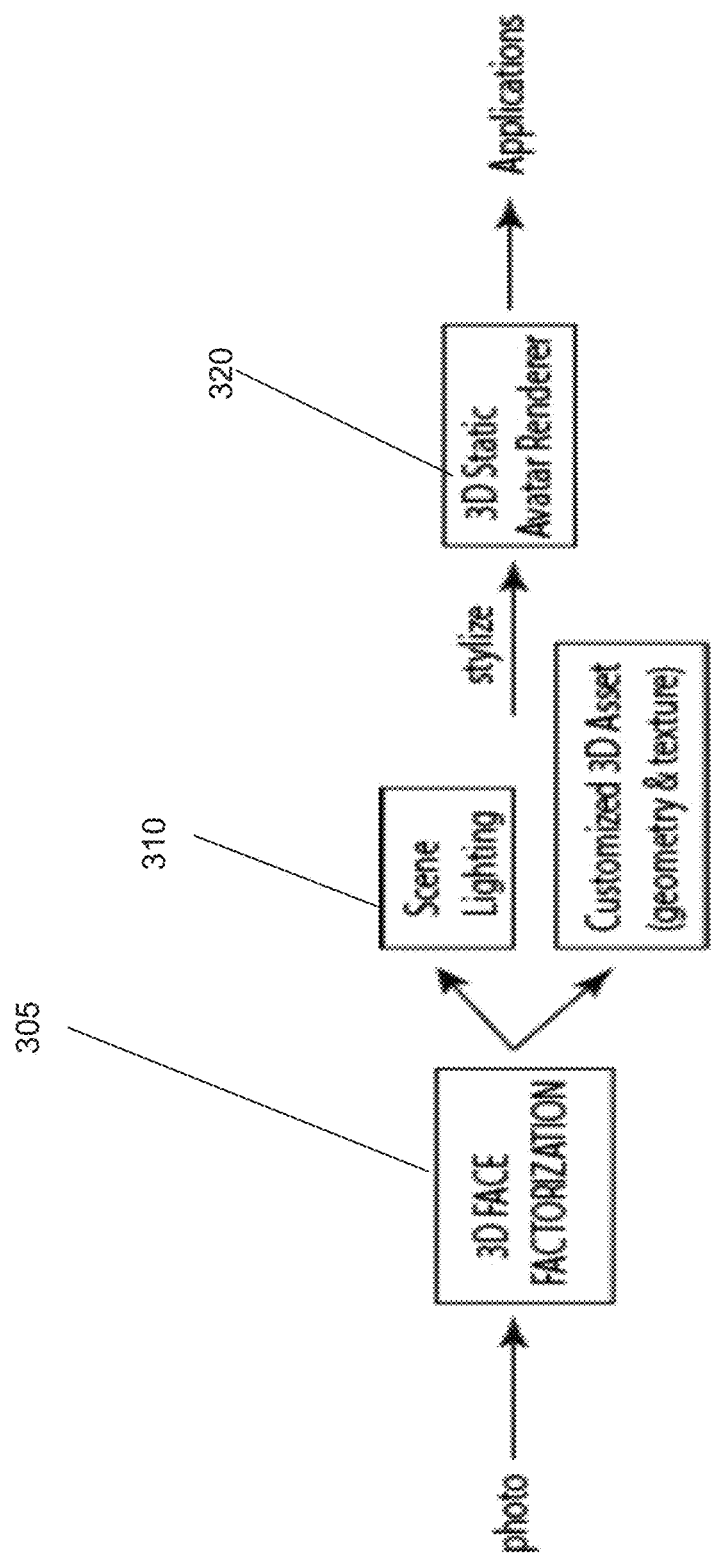
FIG. 3 is a conceptual diagram of a processing pipeline for generating a static 3D model of a head from a captured image of the head in accordance with an embodiment of the invention.

A captured 2D image containing an image of a face can be provided to an animation system. The animation system can generate a customized static 3D model of the face. A conceptual diagram of a processing pipeline for generating a customized static 3D model of a head from the captured 2D image of a face in accordance with an embodiment of the invention is shown in FIG. 3. As can readily be appreciated, the customized static 3D model for a head can be integrated into a larger 3D model such as, but not limited to, a complete 3D model for an avatar. In processing pipeline 300, a captured 2D image containing image data of a face is provided to a 3D face factorization process 305 that provides a 3D factorization of the face. The 3D factorization of the face can be used to determine scene lighting factors 310 from the image and a customized 3D asset 315 that includes, but is not limited to, a texture and geometry of the face. In accordance with a number of embodiments, the customized 3D asset may also include other information useful for animation of a 3D model and/or for altering the look of the generated 3D model. The information provided may include, but is not limited to, hair identification, skin tone information and other identified facial features and/or accessories (e.g. facial hair, glasses). The texture and geometry of the face, in turn, can be stylized to generate a customized 3D model 320 of a head that has features of the face in the captured 2D image that may be used in various applications including, but not limited to, generation of an animation-ready 3D model and/or the generation of a 3D avatar that incorporates features of the face in the captured 2D image. Although, a specific processing pipeline is described with reference to FIG. 3, other processing pipelines for generation of a customized static 3D models from 2D captured images of faces may be used in accordance with some other embodiments without departing from this invention including, but not limited to, processes that utilize captured depth information and/or synthesized depth information to better capture the shape of the face visible within the 2D images.

Figure 4:
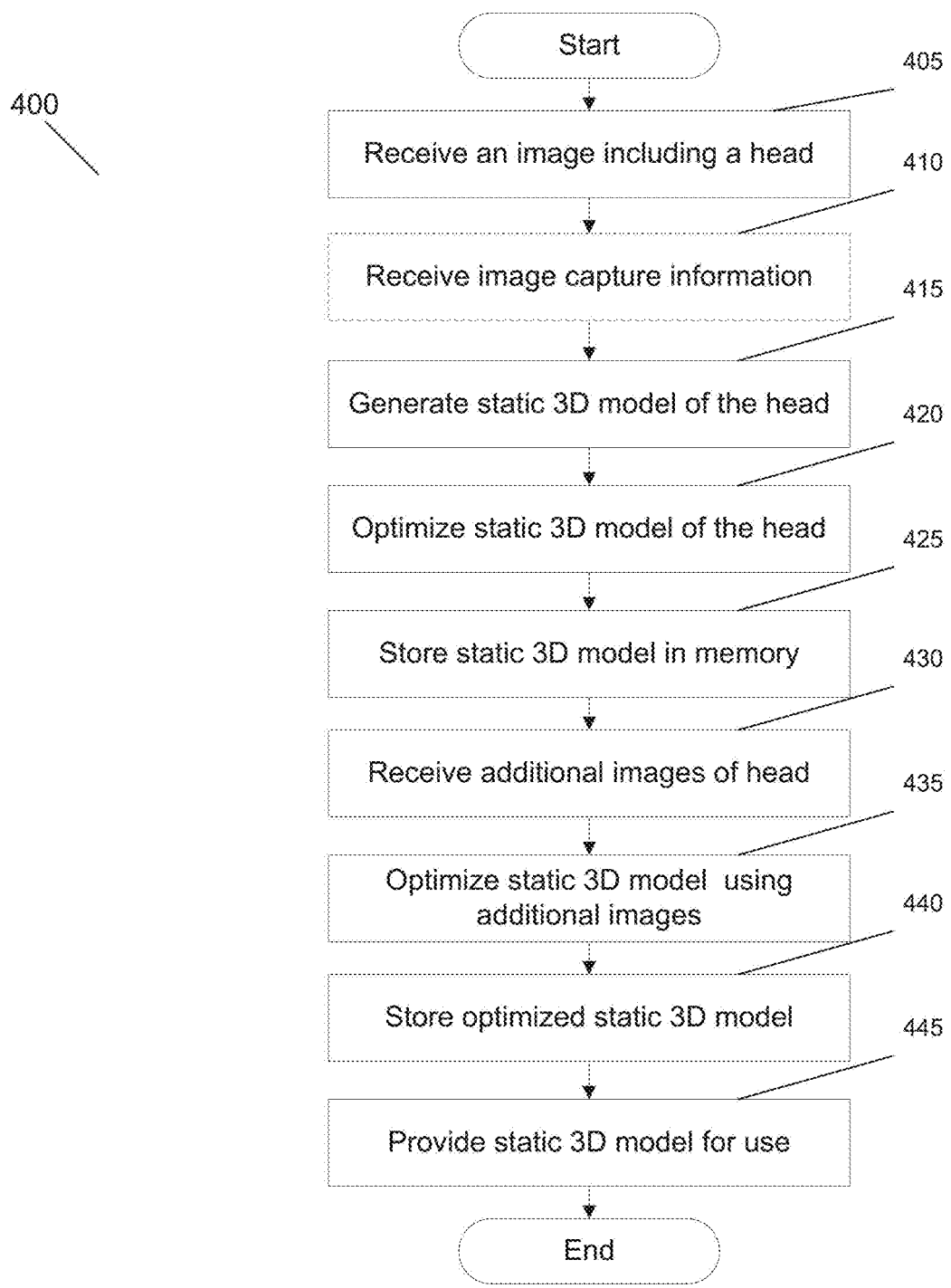
FIG. 4 illustrates a flow chart of a process for generating a static 3D model of a head from a captured image of the head in accordance with an embodiment of the invention.

A process that generates a customized 3D model from a 2D captured image including an image of a face that uses a processing pipeline shown in FIG. 3 in accordance with an embodiment of the invention is shown in FIG. 4. Process 400 includes receiving a 2D image that includes an image of a face (405). In accordance with some embodiments, the image is read from memory. In accordance with some other embodiments, the image may be received from another device via a communication network. Optionally, image capture information such as depth information, focal length and/or other camera information may be received (410) with the captured image. In several embodiments, the make and/or model of the image capture device is received and used to look-up camera parameters stored in a table or other data structure in memory.

Figure 11:
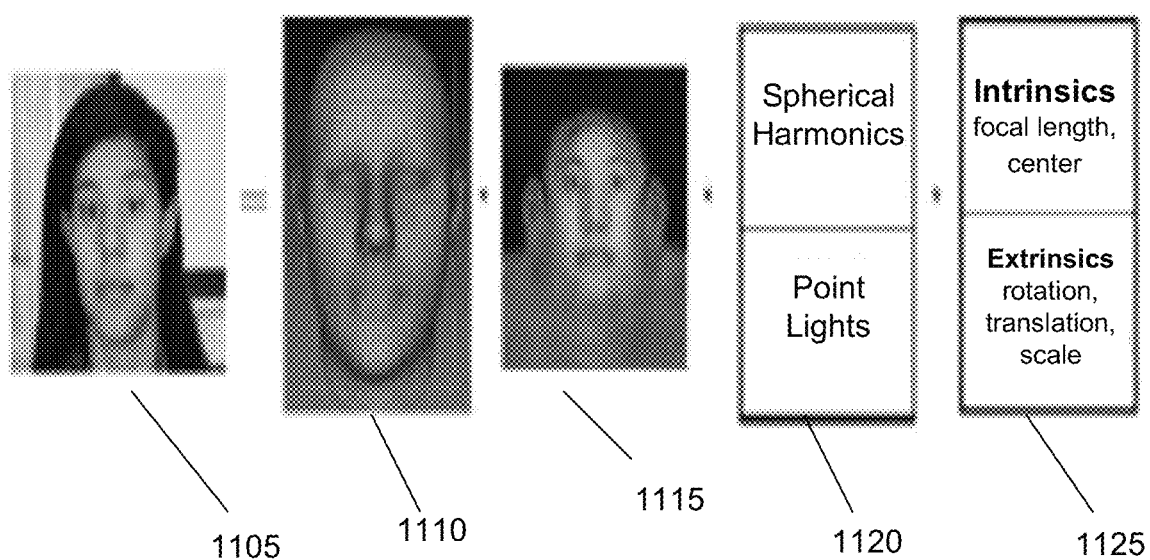
FIG. 11 illustrates various components used to generate an animation-ready 3D model of a human head in accordance with an embodiment of the invention.

A customized static 3D model of a head based on the face image in the 2D captured image and possibly the image capture information, if the information is available, is generated (415). In accordance with some embodiments, the captured images are divided into various components to generate a static 3D model of the head from the image of the face. Various components of a 2D image used to generate 3D model of a head in accordance with some embodiments of the invention are shown in FIG. 11. In the illustrated embodiment, the image 1105 is divided into a geometry or shape component of the face 1110, a texture of the face 1115, lighting components of the image 1120, and camera properties 1125. In other embodiments, any of a variety of components can be identified and used in the generation of a 3D model as appropriate to the requirements of a given application. 3D models in accordance with a number of embodiments of the invention can be generated using various machine learning techniques. Further details on generating a 3D model in accordance with numerous embodiments of the invention are described below.

Returning to FIG. 4, a customized static 3D model can be generated in the following manner in accordance with some embodiments of the invention. The face in the image can be modeled using the following generative model:

$$I_g = \Pi(R \times G + t)$$

where $\Pi$ is a 3×3 matrix of camera internal parameters including, but not limited to, focal length and center of projection; R is a three-parameter rotation matrix, G is matrix representing of the geometry of the face, and t is a three parameter translation vector.

In accordance with some embodiments, Π is derived from the rowed image capture information. In many embodiments, the received image capture information and/or an assumed model of the image capture device that captured the image can be used to generate Π. In several embodiments, a pinhole projection model of a camera is used to generate Π.

In a number of embodiments, G is factorized into two components (the shape and appearance) as expressed in the following equation:

$$G(\overline{\alpha}, \overline{\omega}, \overline{v}) = S(\overline{\alpha}, \overline{v}) \times A(\overline{\omega}, \overline{v})$$

where $S(\overline{\alpha},\overline{v})$, is a parametric model of the shape of the face and $A(\overline{\omega},\overline{v})$ is an appearance model of the face. In many embodiments, $\overline{v}$ is the vectors of vertex positions of a mesh for the face.

In accordance with some embodiments, the shape model, $S(\overline{\alpha},\overline{v})$, is parameterized using a combinations of deformers in accordance with the following equation:

$$S(\overline{\alpha v})=B(\overline{\alpha}_{blend}) \times C(\overline{\alpha}_{corr}) \times F(\overline{v})$$

where $B(\overline{\alpha}_{blend})$ is a blend shape deformer, $C(\overline{\alpha}_{corr})$ is a corrective deformer, and $F(\overline{v})$ is a free-form deformer.

In accordance with some embodiments, the blend shape deformer computes the shape as a linear combination of basis vectors with blending weights, $\overline{\alpha}_{blend}$. In accordance with some embodiments, the blend shape vectors are pre-computed using PCA on a dataset of static 3D models of faces from multiple subjects. The blend shape deformer can include blend shape vectors that are pre-computed using PCA on a data set of several hundred static 3D facial models in accordance with some embodiments. In several embodiments, the FACS blend shapes may be constructed by an artist using 3D modelling tools. In many embodiments, the FACS blend shapes may be synthesized using muscle-based physical simulation systems. One skilled in the art will appreciate the greater the number subjects, the better the computation of the blend shape vectors. In accordance with a number of embodiments, the dataset may be initialized with a mean dataset for a specific ethnicity. An as-rigid-as-possible deformer algorithm can be used to model the corrective deformer in accordance with some embodiments. The free-form deformer can allow each vertex to deform independently in accordance with some embodiments.

In many embodiments, the appearance model, $A(\overline{\omega}\ \overline{v})$, is a product of skin albedo parameterized with a texture map, T, and low-frequency lighting model, L, where a Lambertian reflectance model for the faces is assumed in accordance with the following equations:

$$A(\overline{\omega},\overline{v})=T(\omega_{tex},\overline{v}) \times L(\omega_{light},\overline{v})$$

$$L(\omega_{light},\overline{v})=S(\omega_{spherical},\overline{v})*P(\omega_{point},\overline{v})$$

where $S(\omega_{spherical},\overline{v})$, represents spherical light sources and $P(w_{point},\overline{v})$ represents point light sources.

The customized static 3D model can be optimized (420). In accordance with some embodiments, the optimization can be performed using a gradient-based optimization framework applied to the generative model based on the following equation:

$$\underset{\overline{\alpha},\overline{\omega},v}{\arg\min} \|E_{data} + \beta_{shape} \times E_{reg}^{shape} + \beta_{tex} \times E_{reg}^{texture}\|_2^2$$

where the data term, $E_{data}$, measures the dissimilarity between the image produced by the generative model and the source image, $I_{src}$. $E_{data}$ includes two terms one for the difference in image colors, $E_{data}^{color}$, and a second for the difference in primary contours, $E_{data}^{edge}$. Examples of contours include, but are not limited to eye contours, lip contours, nostrils, eyebrows, and overall silhouette. The two data terms can be expressed in the following equations:

$$E_{data}^{color}=I_g-I_{src}$$

$$E_{data}^{edge}=\nabla I_g-\nabla I_{src}$$

In accordance with some embodiments of the invention, one feature of the data term formulation is that correspondence between points on the generative model and the source images can change over the course of optimization. The regularization of terms can enforce smoothness between neighboring vertices. The texture regularization term can impose a penalty for vertex color differences between neighboring vertices on the mesh and the shape regularization term can impose an edge-smoothness penalty for any deviation for the undeformed edge lengths of the mesh.

In accordance with a number of embodiments, the generation and/or optimization of the customized 3D model is performed in stages. In accordance with many of these embodiments, a first stage can solve for the camera properties. The camera properties may include, but are not limited to, camera rotation, camera translation, Field of View (FOV), and focal length. In a second stage, the blendshape weights may be solved. In a third stage, a free-form deformation of the model is solved. In a fourth stage, the texture and light and lighting components may be solved. Finally, in a fifth stage, eye details are solved. In accordance with some embodiments, the eye details may include, but are not limited to, iris shape and eyelid folds. In accordance with a number of embodiments, different resolution meshes may be used in the different stages of the optimization process. In accordance some particular embodiments, a low-resolution mesh may be used for the first three stages and a high-resolution mesh is used in the fourth and fifth stages. In accordance with many particular embodiments, a transfer process is performed to transform the lower resolution mesh to a high-resolution mesh between the various stages.

Although, an optimizing process in accordance with the illustrated embodiment is described above, other optimizing processes in accordance with other embodiments of the invention may be used depending on the requirements of the particular system implemented.

Returning to FIG. 4, the generated customized 3D static model can be stored in a memory for use (425). Optionally, process 400 may receive one or more additional images that include the face image (430). The customized static 3D model of the head can be optimized using each of the one or more additional images in the manner described above and/or in accordance with any of a variety of best fit criteria appropriate to the requirements of a given application (435). The optimized static 3D model can be stored in memory for future use. In addition, the 3D static model may be provided to other applications for use. In accordance with some embodiments, the customized 3D model may be transmitted to an application on a user device via a communications network or may be provided to another application executing on the same device.

Although various processes for generating static 3D models of heads from captured images that include images of faces are discussed above with reference to FIG. 4, other generation processes that add, omit, and/or combine steps may be performed in accordance with other embodiments of the invention.

Other Processes for Generating Information for Customized 3D Assets

Processing pipelines generate customized 3D assets that may include geometry texture information for a face as well as other information utilized within the computer animation systems in accordance with the various embodiments that may be useful for altering the customized static 3D model, animating the customized 3D model, and/or other applications use the customized static 3D models. In some embodiments, a factorization process is utilized that involves reforming processes that generate the information used in 3D segmentation. These processes may include (but are not limited to) a segmentation process, a hole filling process, a facial landmark identification process, an iris geometry determining process and an iris color information process are described in more detail below.

Segmentation Process

Figure 12:
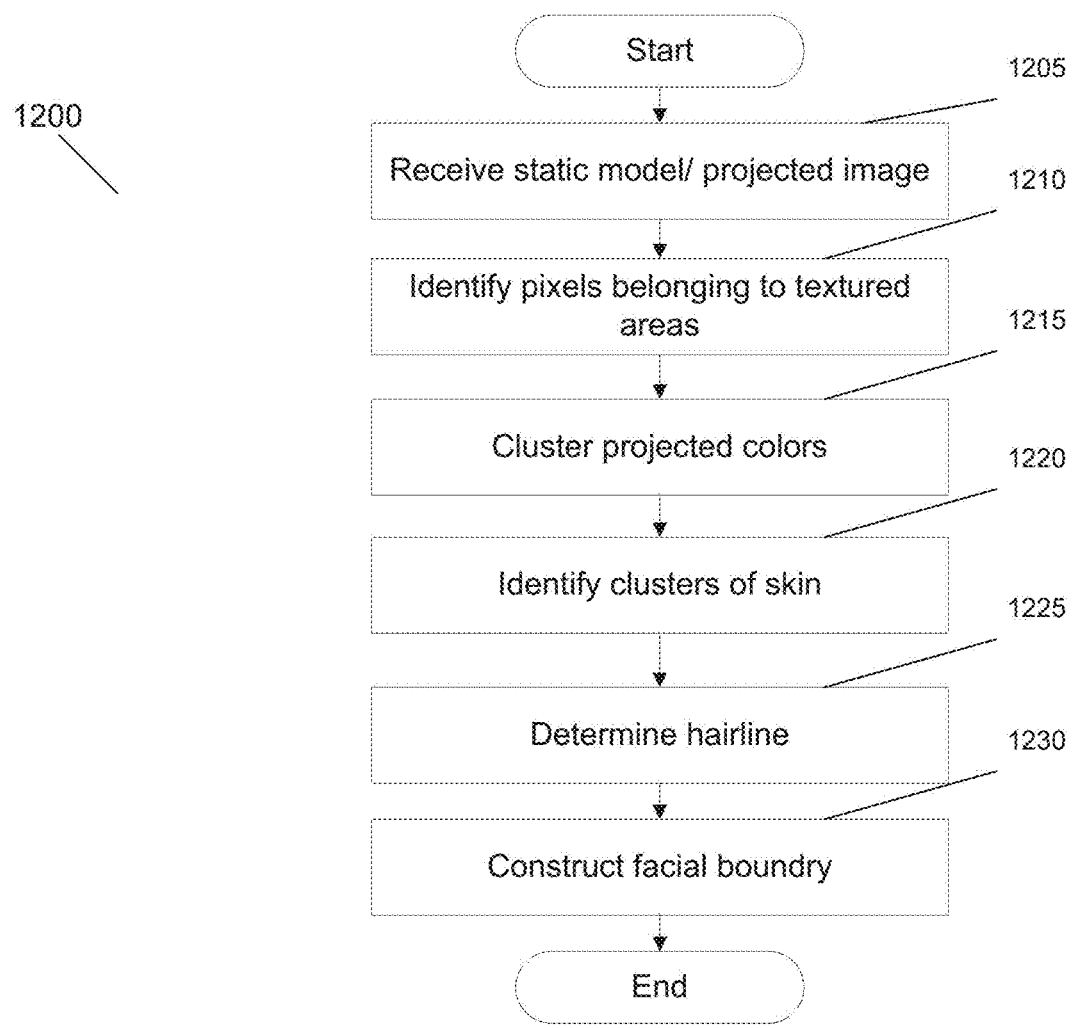
FIG. 12 illustrates a flow diagram of a process for performing segmentation to identify a hair portion of a facial image in accordance with an embodiment of the invention.

Processes for identifying features of a head in an image may be used to provide useful information including, but not limited to, an estimation of a color spectrum, an estimation of a hairstyle visible within the image, an estimation of skin tone, and/or a determination of skin texture. A segmentation process that detects facial features in accordance with the many embodiments of the invention labels pixels in an image of a face according to a determination of specific pixels related to each facial feature that are visible with the image. Examples of features that may be represented by the pixels include, but are not limited to, skin, hair, eyes, mouth, and/or background. Although there are many conventional segmentation processes for features in images, a segmentation process for facial images can encounter particular problems including, but not limited to, wisps of hair across an uncovered portion of a face, light variation across a face that can make portions of the skin appear dissimilar, and/or texture variation across a face. A segmentation process for identifying skin and hair regions of a face from a 3D model in accordance with an embodiment of the invention is shown in FIG. 12. In accordance with some embodiments, the segmentation process may be performed on the resulting customized 3D model. In several embodiments, the segmentation process may be performed as an intermediate step in the generation of a customized static 3D model.

Figure 13:
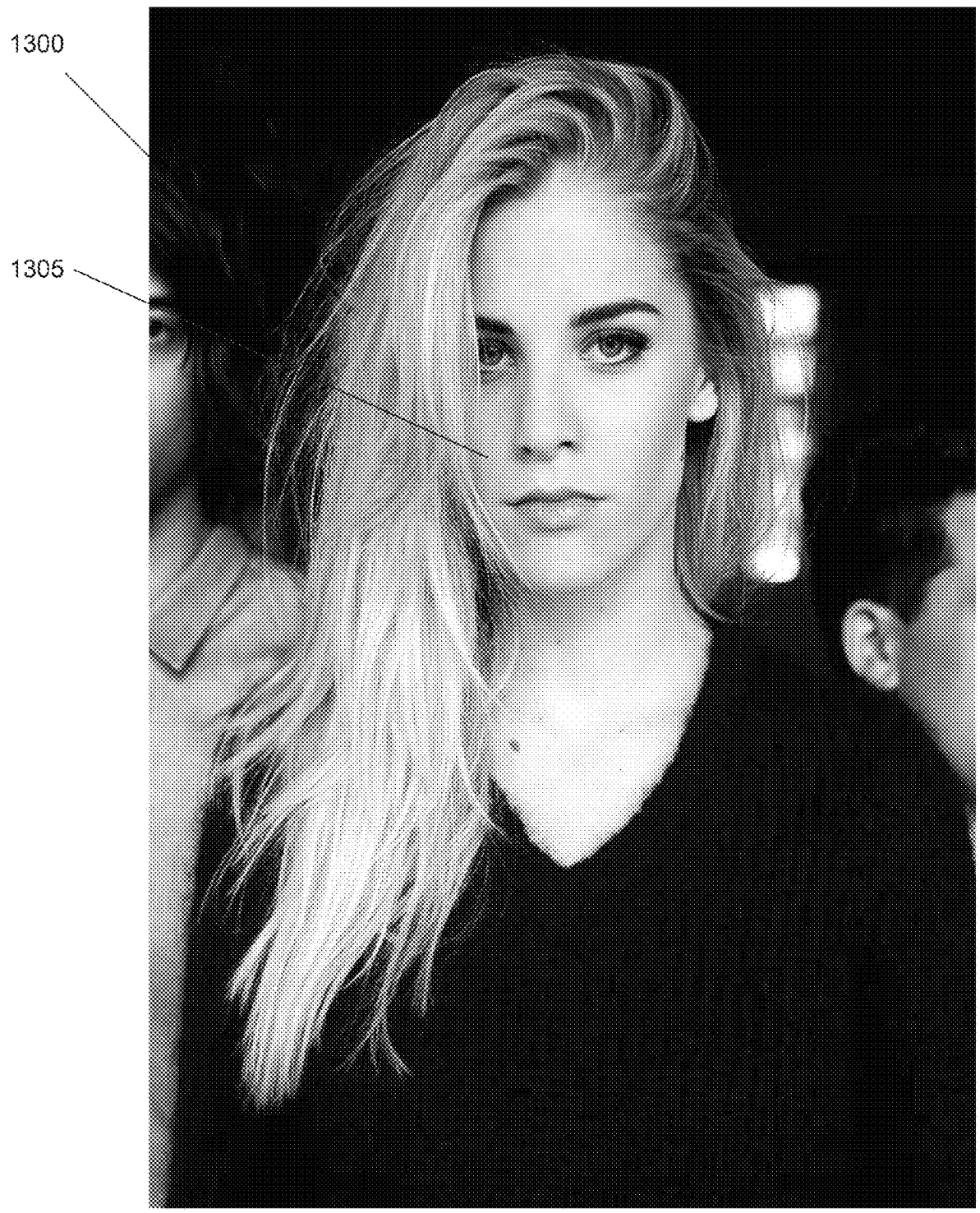
FIG. 13 is an example facial image upon which segmentation processing can be performed in accordance with an embodiment of the invention.
Figure 14:
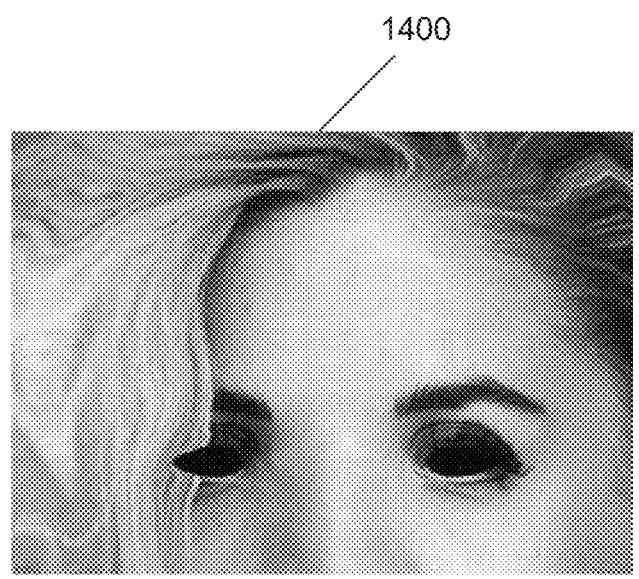
FIG. 14 is a cropped image of the facial image shown in FIG. 13 projected onto a determined geometry determined during segmentation processing in accordance with an embodiment of the invention.

In process 1200, a 3D projection of a head is obtained (1205). In several embodiments, the customized static 3D model generated by process 400 may be obtained and used to generate the projection. In a number of embodiments, the process receives the image of a face, estimates a geometry of a head from the image of the face, and projects the image of the face onto the estimated geometry to create a 3D static model. During the projection, pixels landing on a visible portion of the geometry are facial skin and hair; and the remaining pixels can be categorized as background pixels and eliminated. The projection can also place identified facial features at standardized locations on the model. An example of an input image is shown in FIG. 13 where image 1300 includes a face 1305. The face 1305 can be projected onto the determined geometry. A cropped image 1400 of the face 1305 from the image 1300 in FIG. 13 being projected onto the determined geometry in accordance with an embodiment of the invention is shown in FIG. 14.

Referring again to FIG. 12, the pixels of the 3D static model that belong to particular textured regions can be identified (1210). In several embodiments, edge detection and morphological filling processes can be used to identify the textured regions of the image. In accordance with many embodiments, one or more regions of skin containing regions are identified. The strip of skin across the bridge of the nose of the face beneath the eyes may be used in accordance with a number of embodiments. More than one region may be used in accordance with some embodiments to avoid the problem of hair covering the skin in one of the regions.

Figure 15:
FIG. 15 illustrates a mask of canny edges over the cropped image from FIG. 14 generated during segmentation processing in accordance with an embodiment of the invention.
Figure 16:
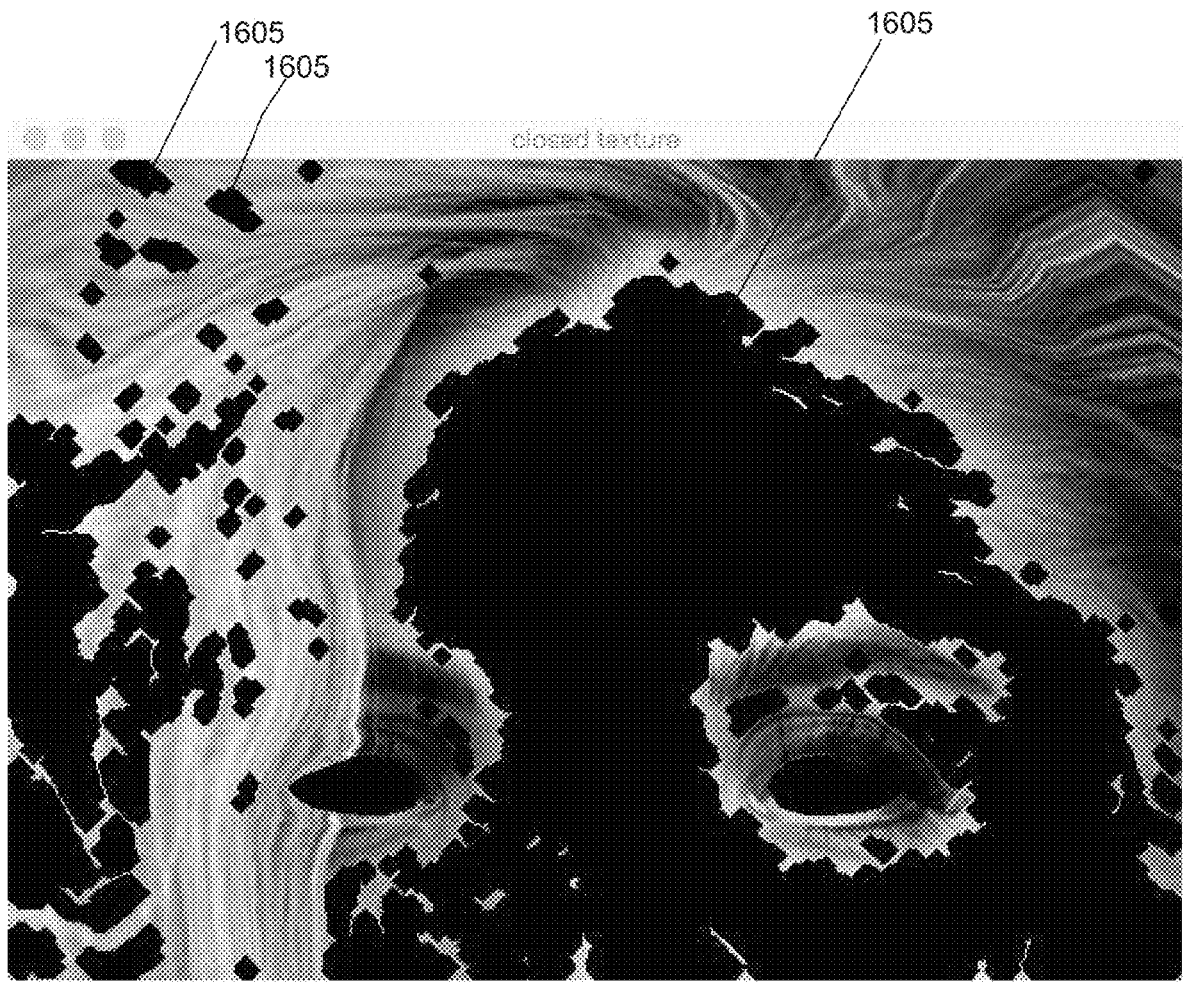
FIG. 16 is an image showing morphological close of the edges as a mask generated during a segmentation process shown over the cropped facial image in FIG. 14 in accordance with an embodiment of the invention.
Figure 17:
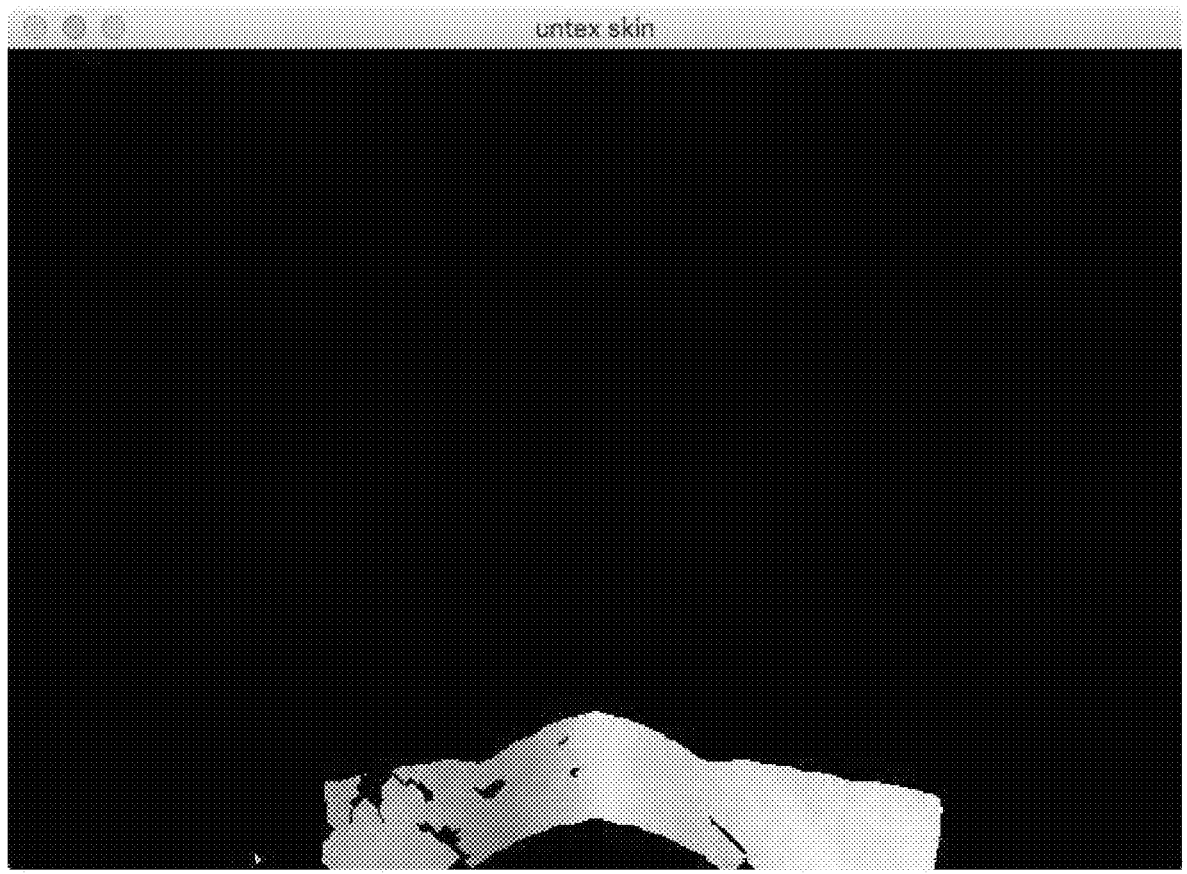
FIG. 17 is an image of a region of the facial image with texture removed as part of segmentation process performed in accordance with an embodiment of the invention.

Edges may be found and used as a proxy for texture in accordance with many embodiments. In accordance with a number of embodiments, edges may be determined by applying a Canny edge detector to the image to generate a mask. An image of Canny edges displayed over the example image 1300 as a mask is shown in FIG. 15. In the resulting mask, strands of hair will tend to produce edges separated by a textured region having a small number of pixels between edges (i.e., strands of hair). These textured regions can be filled by performing a morphological close process of a width comparable to the width of the separation between strands. The width may be determined using a training set of images in accordance with several embodiments. An image showing application of a morphological close of the edges as a mask over the example image 1300 is shown in FIG. 16 where regions 1605 are texture free. The process can reduce non-strand image noise by performing a morphological open of the same width to erase small islands within the region. The number of nonzero pixels in the skin regions can be counted and compared to a threshold. In accordance with some embodiments, the threshold can be determined from a training set of images. If the minimum region count is above the threshold, the detection process can be repeated with a greater level of blur to gradually reduce small-scale features and noise. This process can calibrate the texture detection to a level of detail in which skin is largely clear, while strands of hair continue to be detected. Thus, at the discovered level, very little texture will appear on the skin except where hair falls across the region. An example of a resulting mask is shown in FIG. 17. In FIG. 17, skin on either side of the nose has textured pixels removed.

In accordance with some embodiments of the invention, a clear skin patch can be used to estimate a range of skin tones in the image. The bridge of the nose can be used, because the position of this region generally captures a range of light levels and different skin shade and/or other embodiments, any of a variety of regions appropriate to the requirements of a give application is to be utilized. Furthermore, the determined textured areas are likely candidates for hair. However, these textured areas may include some skin that is removed in subsequent steps as discussed below.

Figure 18:
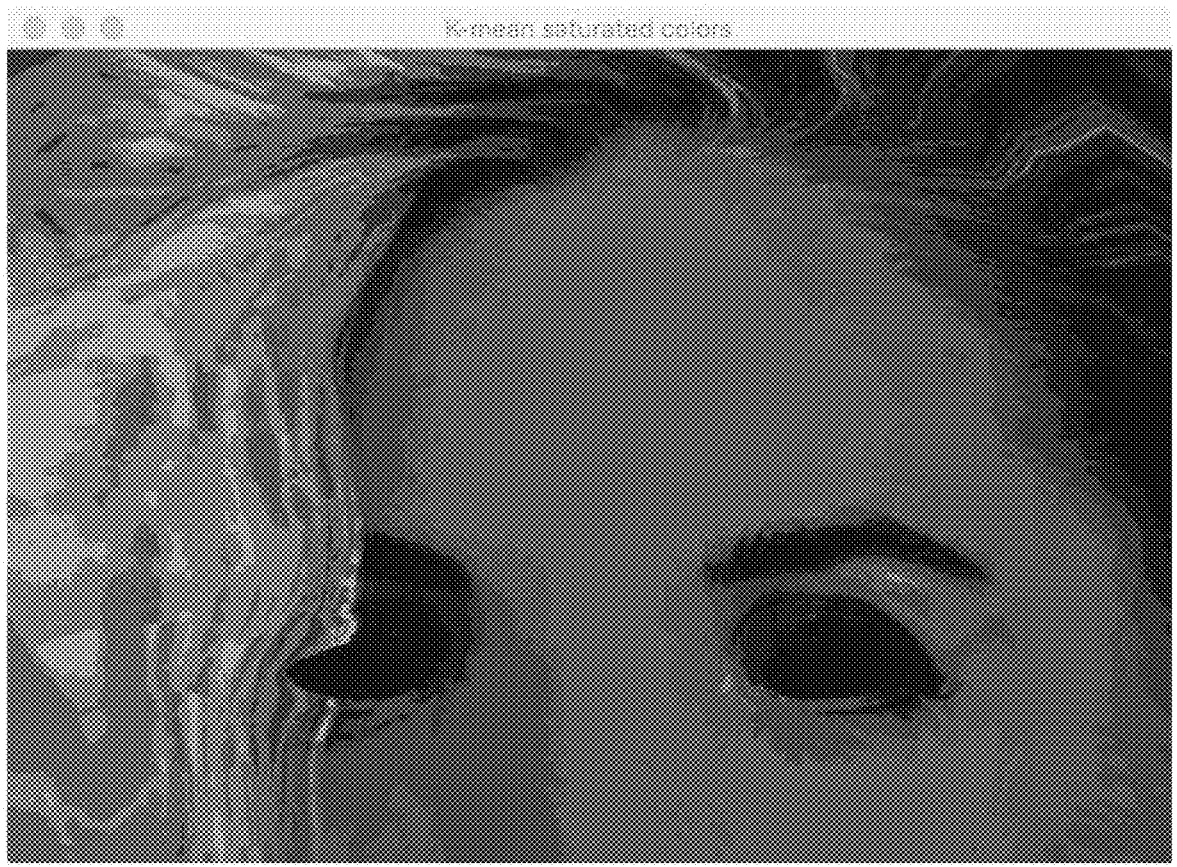
FIG. 18 is a resulting RGB image resulting from the conversion of a hue/saturation/value image of the cropped example facial image shown in FIG. 14 to a RGB image during segmentation processing in accordance with an embodiment of the invention.

Returning to FIG. 12, the pixels can be clustered by color (1215). In accordance with some embodiments, the clustering of the pixels is performed using a K-means or Median Shift algorithm operating on the RGB pixels of the image to partition the image into regions of similar color. 5 to 10 color bins can be used to partition the regions in accordance with a number of embodiments. In accordance with several embodiments, the color image can be converted into a hue/saturation/value image with the saturation channel written to 100%. The hue/saturation/value image can then be converted back to a RGB image. An example of the image that results when this process is applied to the cropped example image from FIG. 14 is shown in FIG. 18.

Figure 19:
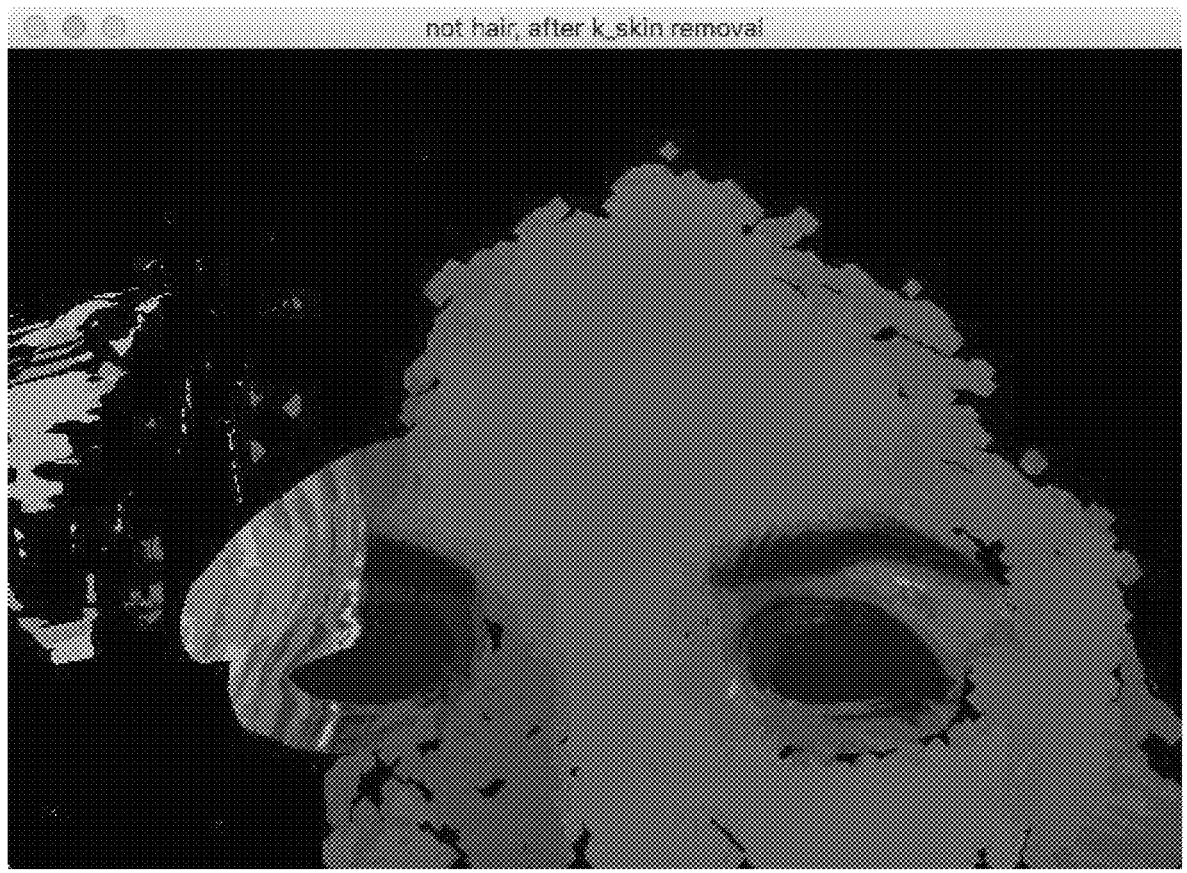
FIG. 19 is an image of regions of the image labelled as skin during segmentation processing of the example cropped facial image as shown in FIG. 14 in accordance with an embodiment of the invention.

The regions of skin are identified (1220) and texture pixels can be removed from the skin regions of the image leaving the pixels having varying color and illumination. These remaining pixels can be labeled as one or more categories of skin. An image of the skin in cropped example image from FIG. 14 after labeling is shown in FIG. 19. In FIG. 19, the skin is a colored area that is untextured and matches the color found in the skin patch. In the particular example in FIG. 19, a peculiar shape around the hair-covered left eye is from a 'raccoon mask' that removes the eye area from being labeled.

Figure 20:
FIG. 20 is an image of a hairline halo of the example facial image shown in FIG. 14 in accordance with an embodiment of the invention.
Figure 21:
FIG. 21 is an image of the cropped example facial image shown in FIG. 14 resolved into hair and not hair based on the presence of texture during segmentation processing to create a halo in accordance with an embodiment of the invention.

Referring again to FIG. 12, the hairline can be determined from the clustered pixels (1225) and a facial boundary determined (1230). Typically, a strong texture is present at the transition from skin to hair along the hairline; and skin color labeled pixels are often present with near-skin color labeled pixels arising from shadowed skin at the hairline. To disambiguate the hair and skin at the hairline, a hairline halo may be constructed in accordance with many embodiments. The hairline halo may be constructed by expanding outward from the boundary of the skin labeled area(s). An image of a hairline halo for the cropped example image from FIG. 14 is shown in FIG. 20. In accordance with some embodiments, the expansion is completed by performing a morphological dilation of the skin area and differencing the dilated skin area with the non-skin area. Alternatively, an erosion of the non-skin area and differencing the eroded non-skin area with the skin area may be performed. In accordance with a number of these embodiments, the width of the dilation and/or erosion can be determined from a training set of images. Any nontextured pixels within the halo can be marked as skin and the textured pixels marked as hair. In accordance with several embodiments, the pixels marked non-textured pixels may be provided to classifiers and determined to be skin. An image of a halo region resolved into hair and not hair based on the presence of texture in accordance with an embodiment of the invention is shown in FIG. 21.

Although various segmentation processes for a head in a captured image are discussed above with reference to FIG. 12, other segmentation processes that add, omit, and/or combine steps may be performed in accordance with other embodiments of the invention depending on the exact requirements of the system.

Hole Filling Process

Figure 22:
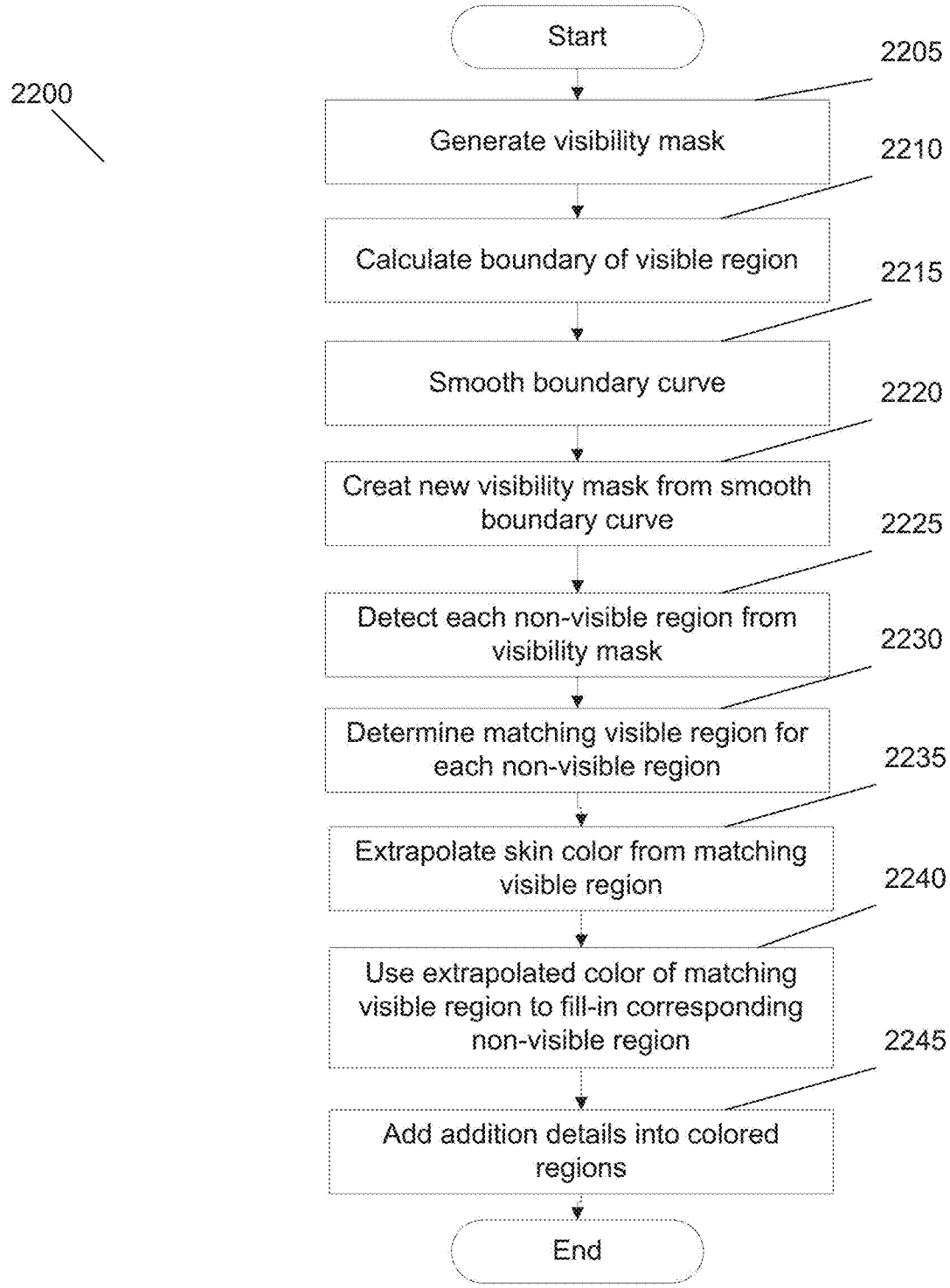
FIG. 22 illustrates a flow diagram of a hole filling process performed by one or more devices during the generation of a static 3D model in accordance with an embodiment of the invention.
Figure 23:
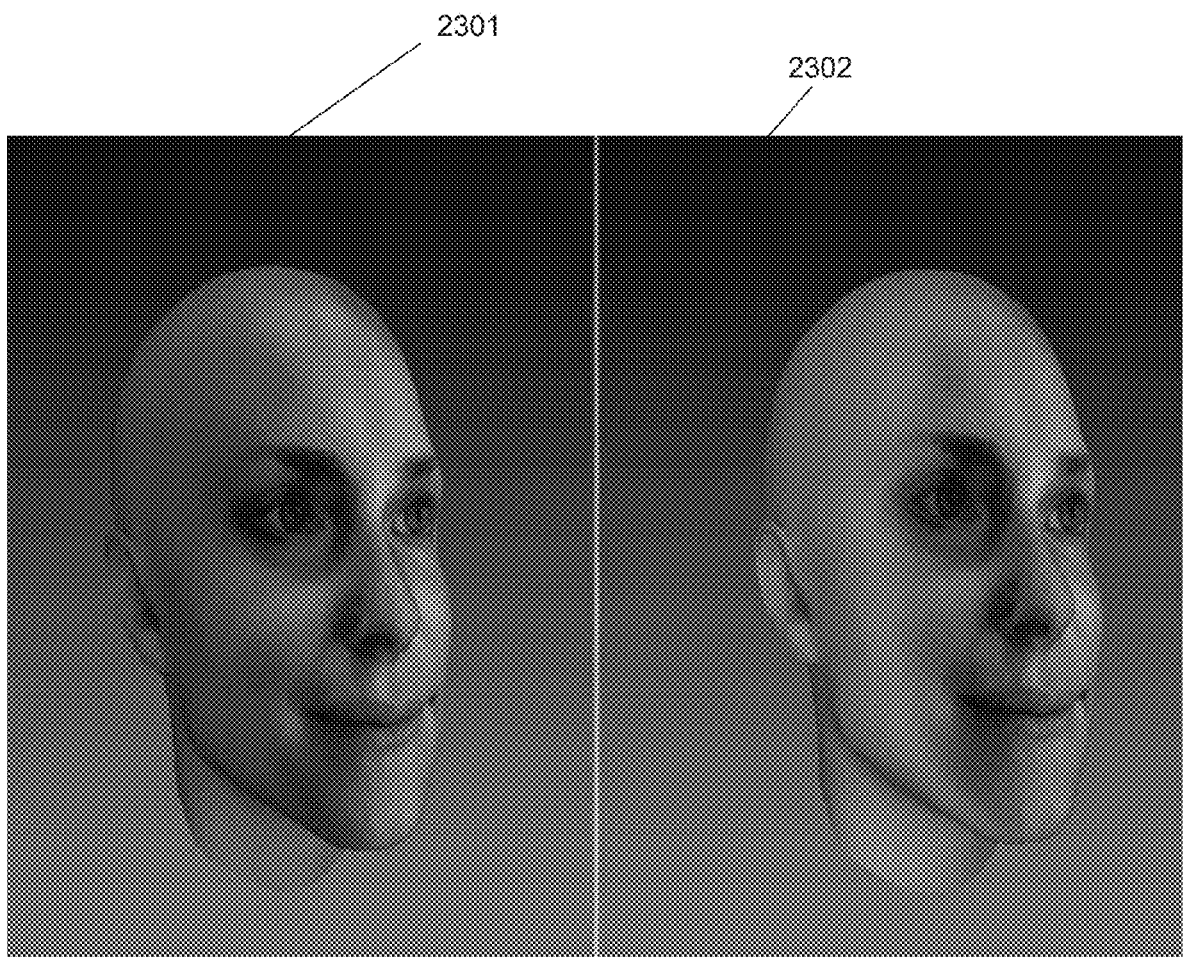
FIG. 23 illustrates a comparison between an image having a final texture solved with a single tone and an image having a determined skin tone with smooth variations generated by a hole filling process in accordance with an embodiment of the invention.

A problem in generated a 3D static model of a head from a captured image is occlusion in the image. Many features that a user would like to represent in a 3D model may be missing in a captured image due to occlusion in the image. Examples of features that may not be seen in the image of a face include, but are not limited to, the inside of a nostril, the back of an eyelid and a side of a cheek. To make a complete 3D static model of a head, these missing features can be "filled in" to allow the head to be viewed from any arbitrary viewpoint. To do so, processes in accordance to some embodiments of the invention perform a "filling" process to "fill in" holes left in the model. In order to "fill in" missing regions of the face, a skin tone for the region can. However, skin tone cannot simply consist include a single global tone that "fills in" the missing region. Instead, the determined skin tone ideally includes variations that exist in the original image caused by lighting/shadowing effects as well as the natural variation that occurs typically in a person's unique skin tone. The determined skin tone ideally also varies smoothly across the entire face to avoid creating jarring artifacts to a viewer when the final texture is projected to a 3D geometry to generate a 3D static model. A comparison between projecting an image 2301 having a final texture solved with a single tone and an image 2302 having a determined skin tone with smooth variations is shown in FIG. 23. A process for "filling in" missing regions of an image using variations of skin tone in accordance with an embodiment of the invention is shown in FIG. 22.

Figure 24:
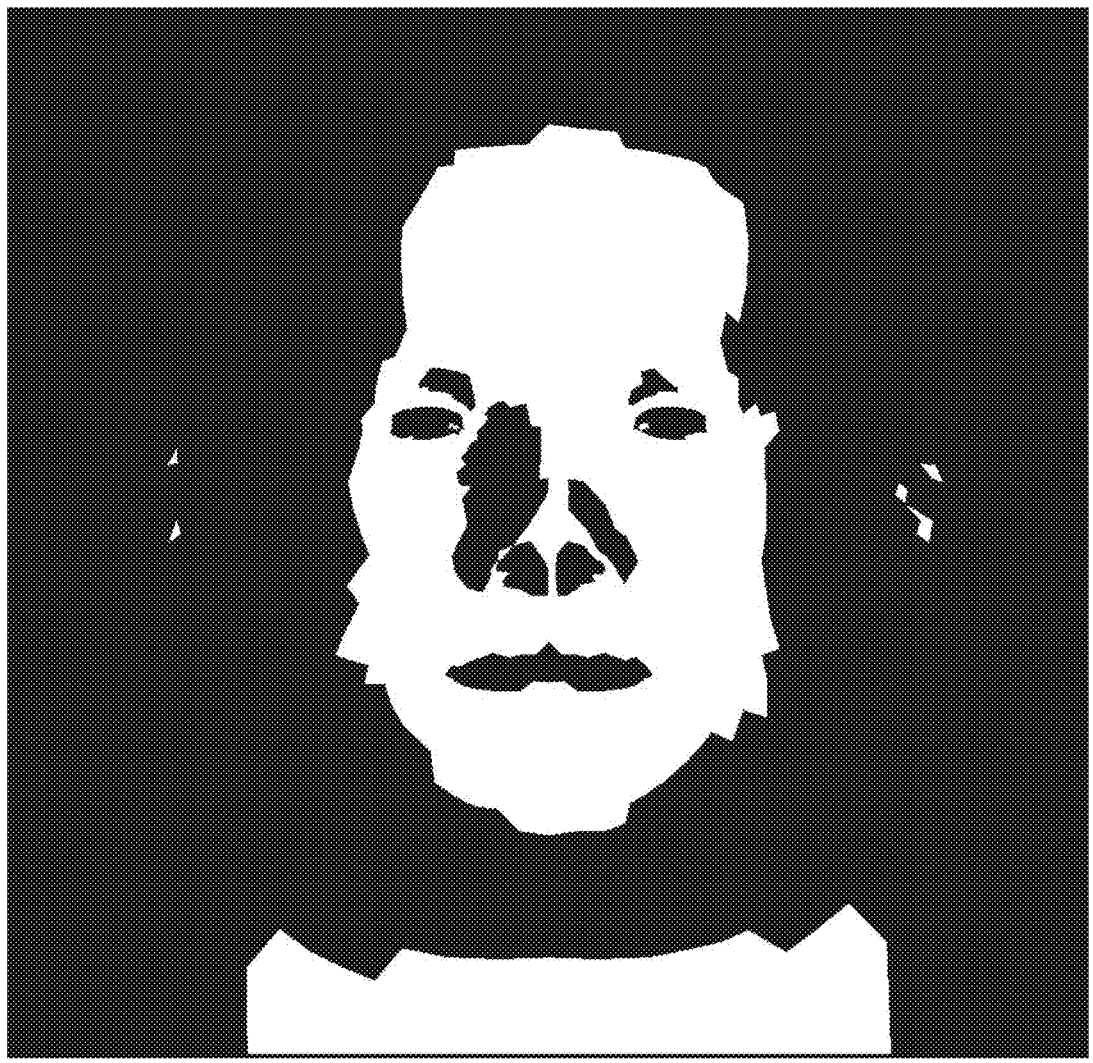
FIG. 24 is an image of a visibility mask generated during a hole filling process in accordance with an embodiment of the invention.

Process 2200 includes generating a visibility mask (2205). A visibility mask is a binary mask that determines regions in the image from which information may be borrowed. An image of a visibility mask in accordance with an embodiment of the invention is shown in FIG. 24. In visibility mask 2400, visible pixels are represented as white and regions of invisible pixels that can be synthesized are represented as black. The visibility mask can be computed using the following:

$$v(x_i) = \begin{cases} 1 & \text{if } C_d * n(x_i) \leq \frac{\pi}{3} \\ 0 & \text{otherwise} \end{cases}$$

where $v(x_i)$ computes the visibility of a vertex $x_i$, $C_d$ is the camera direction vector towards the solved 3D geometry, and $n(x_i)$ is the vertex normal at vertex $x_i$.

Figure 25:
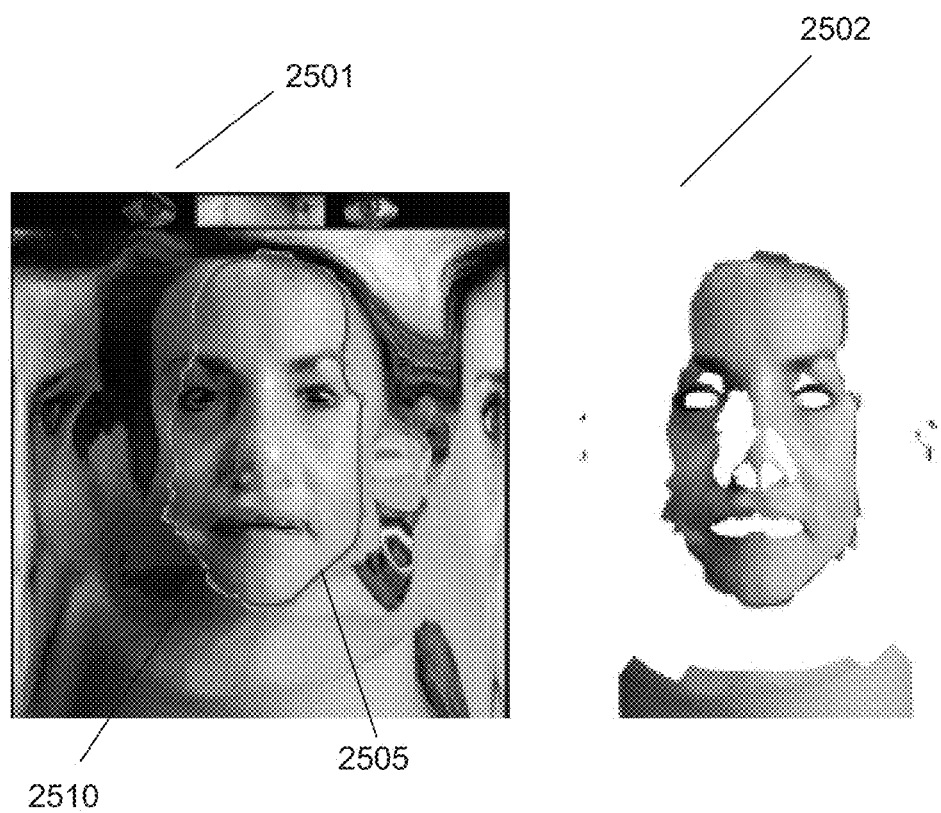
FIG. 25 conceptually illustrates a boundary of a visible region generated from a the visibility mask and a final smooth boundary determined during a hole filling process in accordance with an embodiment of the invention.

A boundary of a visible region in the image can be computed using the visibility mask (2210). The boundary can be smoothed (2215) to compute a final smooth boundary that encompasses a visible portion of the face. An image of the boundary of a visible region generated from the visibility mask and the final smooth boundary computed in accordance with an embodiment of the invention are shown in FIG. 25. In image 2501, green line 2505 shows the boundary determined from the visibility mask and red line 2510 shows the smoothed boundary. Image 2502 shows the visible texture superimposed over the visibility mask. The region within the boundary may still include holes that can be filled by a process similar to any of the processes described below. A new visibility mask can be created from the final smooth boundary (2220). The new visibility is a mask that can be used to determine a valid region of the face texture projected on a 3D geometry to use to extrapolate skin color for other regions of the facial geometry.

The process 2200 can fill-in not-visible regions of the image. A non-visible region can be identified (2225). A valid visible region for use in filling in each non-visible region can be determined using the visibility mask (2230). The skin color of each valid visible region can be extrapolated (2235). In accordance with a number of embodiments, the extrapolation of skin colors may be performed by minimizing variation among the entire 3D geometry. In other embodiments, any of a variety of processes appropriate to be the requirements of a given application can be utilized to extrapolate skin color. In accordance with several embodiments, the problem is initialized such that:

$$C(x_i) = \begin{cases} P(x_i), & \text{if } m(x_i) > 0 \\ 0, & \text{otherwise} \end{cases}$$

where, $C(x_i)$ is the color for vertex $x_i$, $P(x_i)$ is the pixel color of $x_i$ as projected onto the source image, and $m(x_i)$ is a binary function that returns 1 when $x_i$ lies within the mask and 0 otherwise.

After the colors are initialized, the following energy terms can be minimized:

$$\min C(x) = C_1(x) + C_2(x)$$

where, $$C_1(x) = \|C(x_j) - C(x_i)\|^2$$

$$C_2(x) = \Sigma_i^n \|C(x_i) - P(x_i)\|^2 \text{ if } m(x_i) > 0$$

The extrapolated colors of each visible region can be used to fill-in the corresponding non-visible region (2240).

Figure 26:
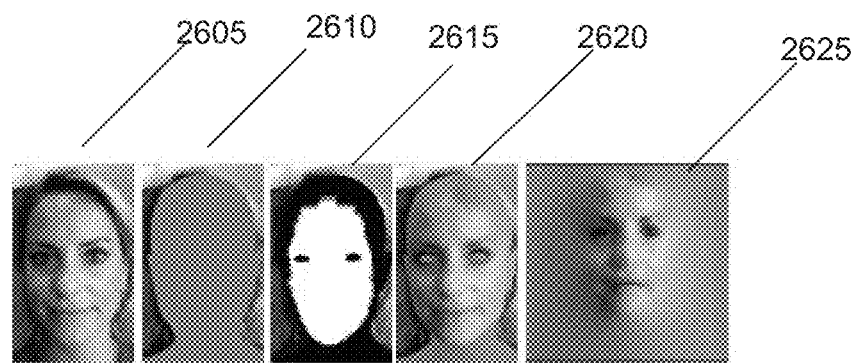
FIG. 26 conceptually illustrates the generation of a visibility mask during a hole filling process in accordance with an embodiment of the invention.

Images showing the generation of the visibility mask in accordance with an embodiment of the invention are shown in FIG. 26. In FIG. 26, image 2605 shows the original source image, the computed 3D geometry is shown in image 2610, the generated visibility mask is shown in image 2615, the colors extrapolated from the visible regions are shown in image 2620, and the final texture flattened in the texture domain is shown in image 2625. In the above extrapolation process, the colors are only computed at the vertices and the extrapolation of the colors causes smoothing of the resulting texture and removal of high frequency details from the original image.

Figure 27:
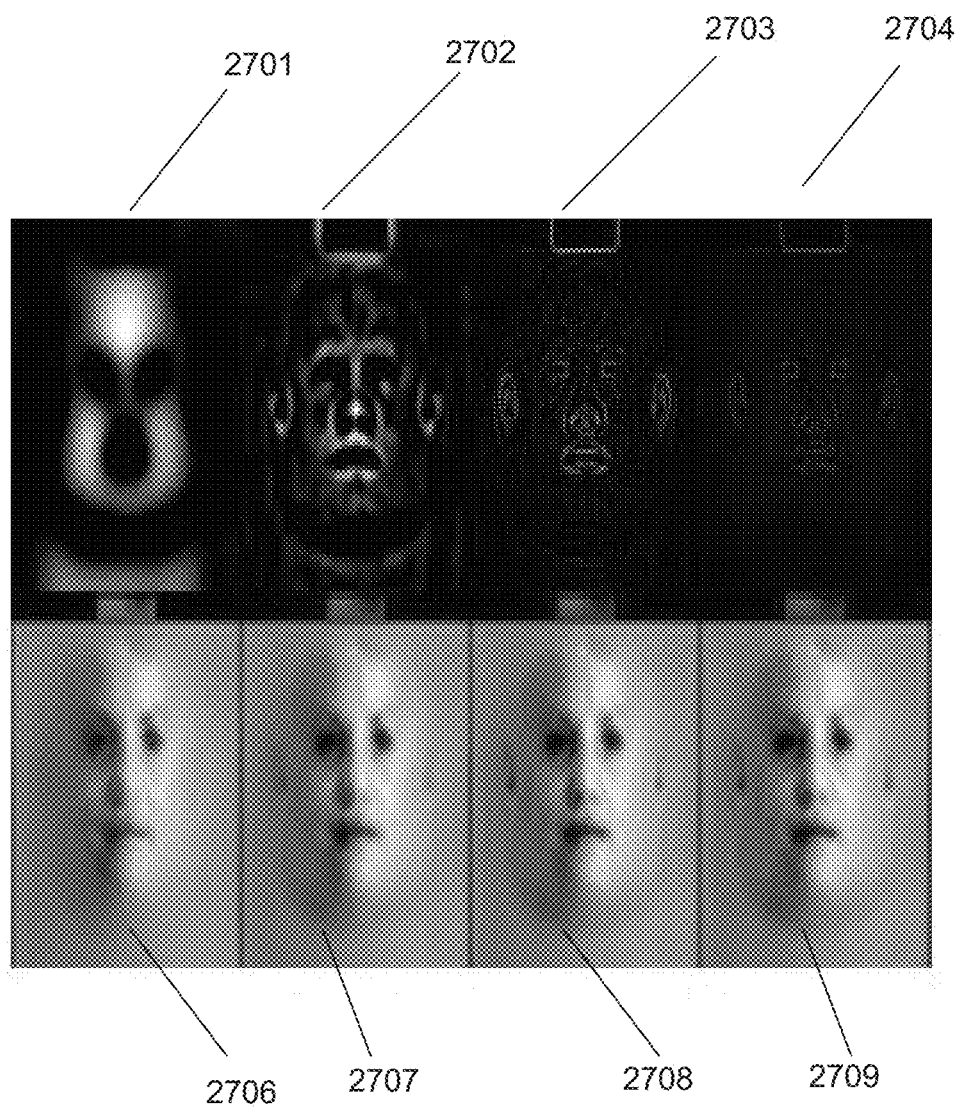
FIG. 27 conceptually illustrates levels of a Laplacian pyramid and resulting textures of a facial image derived from each level during a hole filling process in accordance with an embodiment of the invention.
Figure 28:
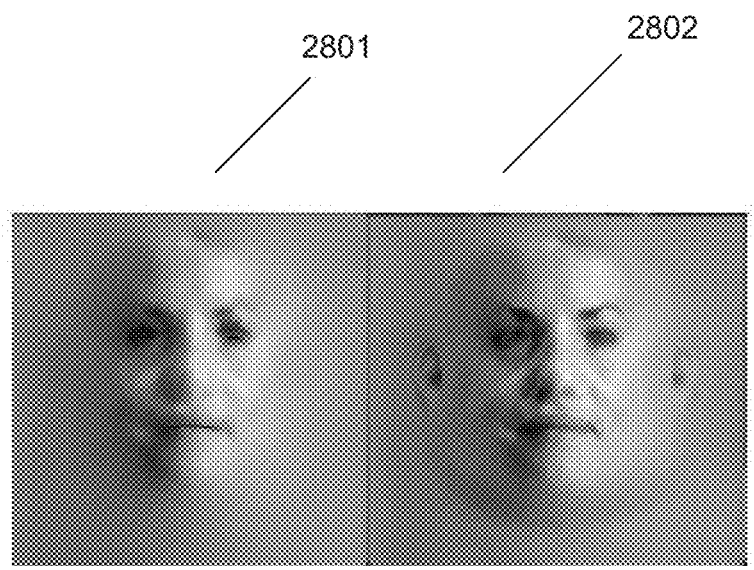
FIG. 28 conceptually illustrates addition of texture during a hole filling process in accordance with an embodiment of the invention.

To correct the smoothing and loss of high frequency details, processes in accordance with some embodiments of the invention may use a Laplacian pyramid to add high frequency details back into the original image (2245). Each level of the Laplacian pyramid computes a different frequency from a given input image. To fill empty regions of the face (regions where m(x)=0 in the visibility mask), processes in accordance with many embodiments of the invention create a Laplacian pyramid from a template texture. The template texture is chosen in accordance with several embodiments from a library based on ethnicity and gender classification of the input image. In accordance with a number of embodiments where the texture resolution is 1024×1024, 10 levels of a Laplacian pyramid are used and the lowest 4 levels of the pyramid are ignored because these lowest 4 levels correspond to low frequency details that are not used in the process. Each level of the pyramid can be added into the texture image to add high frequency details to the final textured image. The facial texture of the visible regions in the image (regions where m(x)=1 in the visibility mask) can also be added to the texture image. Images of the levels of a Laplacian pyramid and the resulting textures from each level in accordance with an embodiment of the invention are shown in FIG. 27. In FIG. 27, varying levels of the Laplacian pyramid are shown in images 2701-2704 and the resulting textures from each level of the pyramid are shown in images 2706-2709. The resulting images of the added texture in accordance with an embodiment of the invention are shown in FIG. 28. In FIG. 28, an image 2801 shows the result of adding the texture from the Laplacian pyramids to generate a texture image and an image 2802 shows the result of adding to the visible regions from the visibility to generate the final texture image.

Figure 29:
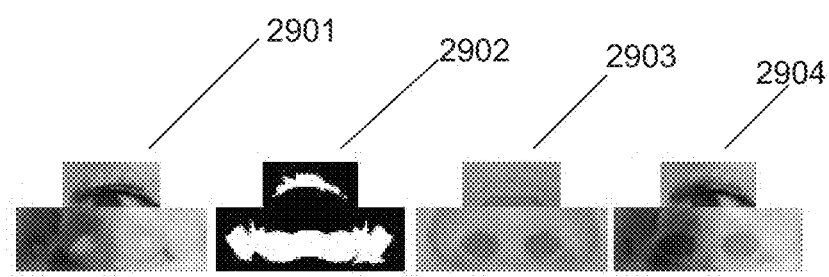
FIG. 29 conceptually illustrates steps of a hole filling process in accordance with an embodiment of the invention.

The above process can be useful for filling in regions or large areas of an image. However, the above process is often not useful for filling holes in smaller regions of the image. Thus, processes in accordance with some embodiments of the invention of fill smaller holes relying on Poisson image editing. Poisson image editing involves determining: a set of image gradients where color values are to be filled; and a set of boundary conditions. In order to fill the regions, the following image term can be minimized:

$$\min(f)^r{}_\Omega |\Delta f - v|^2 \text{ with } f|\delta\Omega = I.$$

by solving the Poisson equation with Dirichlet boundary conditions:

$$\Delta f = div\upsilon \text{ with } f|\delta\Omega = I$$

where $\upsilon$ is a guidance vector field, I, corresponds to the color values being solved and I is the boundary conditions. In accordance with some embodiments, $\upsilon$ is computed as the S, $\Delta f$, the gradient of a source template image in the region being filled. The source template may be chosen from a library based on a determined ethnicity and/or gender of the face in the image. As $\upsilon$ is the gradient of an image, div $\upsilon$ simply becomes S, $\Delta f$, the Laplacian of S in the region being filled and the Dirichelet boundary conditions are the boundary pixels of the region being filled that can be determined from the original image and/or the visibility mask. Images showing the steps of a hole filling process in accordance with an embodiment of the invention are shown in FIG. 29. In FIG. 29, images 2901 show a portion of a source image, images 2902 show a portion of the image mask that needs filling, image 2903 shows the template image, and image 2904 shows the filled-in image.

Although various processes for filling holes in images of faces are discussed above with reference to FIG. 22, other hole filling processes that add, omit, and/or combine steps may be performed in accordance with other embodiments of the invention depending on the exact requirements of the system.

Facial Landmark Identification

Figure 30:
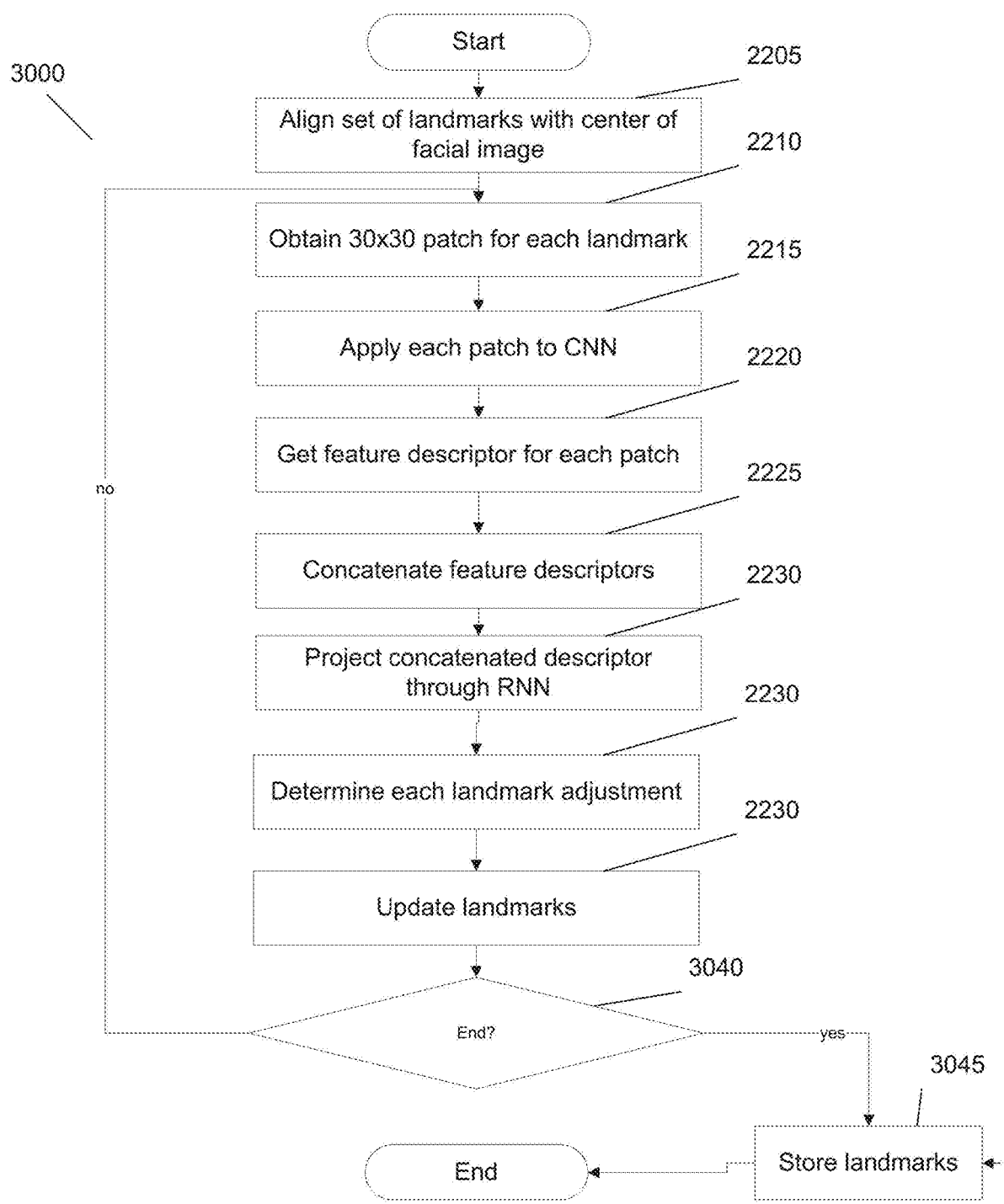
FIG. 30 illustrates a flow diagram of a process for landmark identification in accordance with an embodiment of the invention.

The identification of certain features or landmarks of a face can be useful in a variety of applications including (but not limited to) face detection, face recognition, and computer animation. In many embodiments, the identification of landmarks may aid in animation and/or modification of a face in a 3D model. In accordance with some embodiments of an invention, a Mnemonic Descent Method (MDM) is used for facial landmark tracking. The goal of tracking the facial landmarks is to predict a set of points on an image of a face that locate salient features (such as eyes, lip corners, jawline, etc.). The MDM performed in accordance with many embodiments of the invention predicts facial landmarks by jointly training a convolutional neural network (CNN) and a recurrent neural network (RNN) to refine an initial set of landmarks on the image until the landmarks are in the correct positions on the face of the subject. A process for performing MDM in accordance with an embodiment of the invention is shown in FIG. 30. In FIG. 30, the process 3000 starts with an initial reference set of 68 landmarks, $x_0$, aligned to the center of the subject's face (3005). The process 3000 (e.g. a 30×30 patch) iteratively repeats the following process. A patch of pixels around each landmark is obtained (3010.) Each obtained patch is applied to a CNN (3015) to get a feature descriptor of length N for each patch (3020). The descriptors can be concatenated together to get a descriptor encapsulating all of the patches (3025). The concatenated descriptor can be projected by an RNN to determine the amount each landmark should be adjusted, $\Delta x_i$ (3030). In accordance with some of these embodiments, the RNN includes a hidden state that begins as a zero vector that is updated at each step and passed to the next step. The landmark positions can be updated for the next step with $x_i+1 = x_i + \Delta x_i$ (3035). The process determines whether the determined positions of the landmarks are satisfactory. In accordance with some embodiments, this may be determined by passing through the iterative process a predetermined number of times. However, other thresholds may be used to make this determination. If the landmarks are satisfactory, the landmarks are stored in memory (3045) for future use. Otherwise, the iterative process is repeated.

Figure 31:
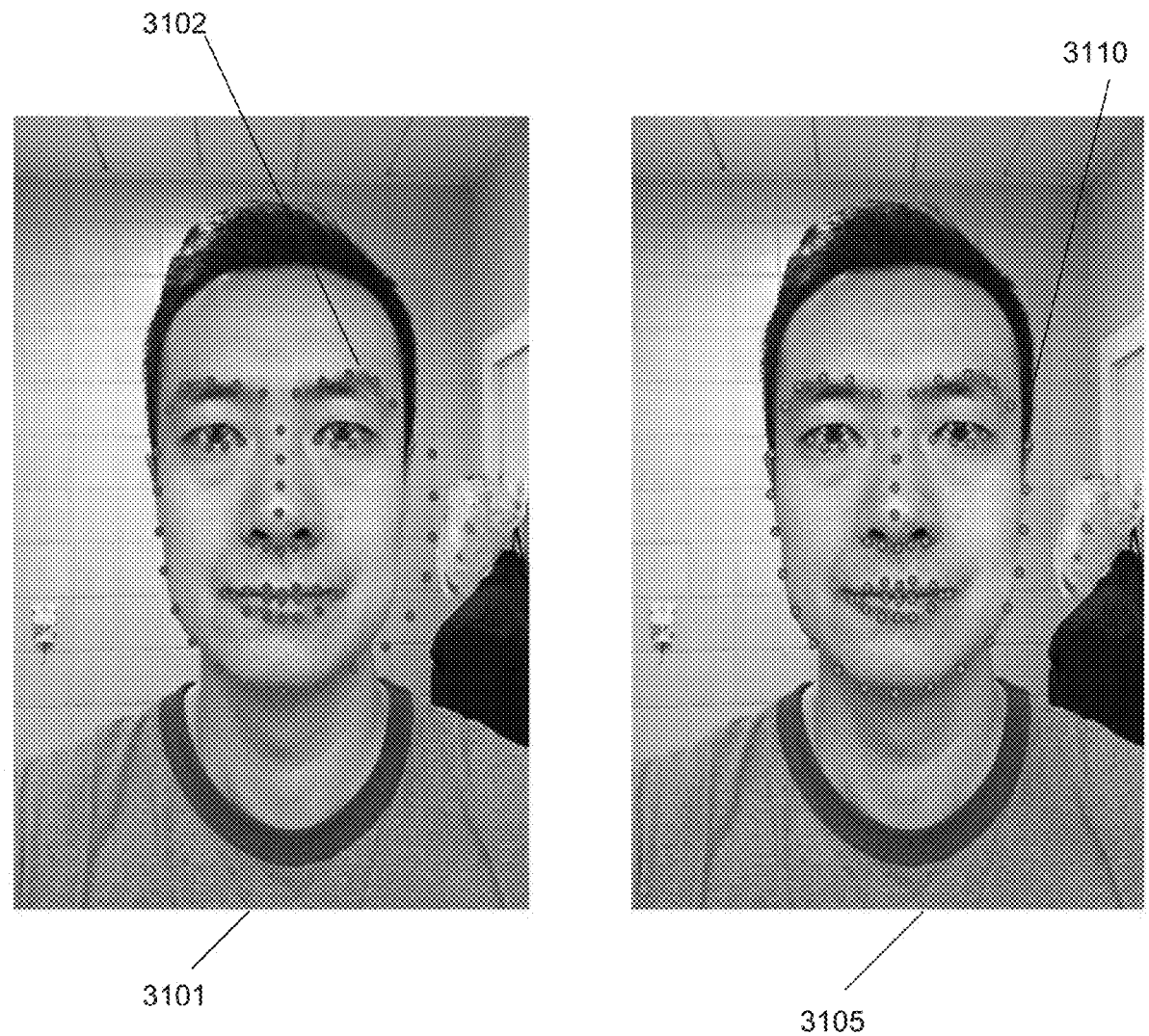
FIGS. 31-35 show comparisons of landmarks determined by a landmark identification process in accordance with an embodiment of the invention and another landmark identification process.
Figure 32:
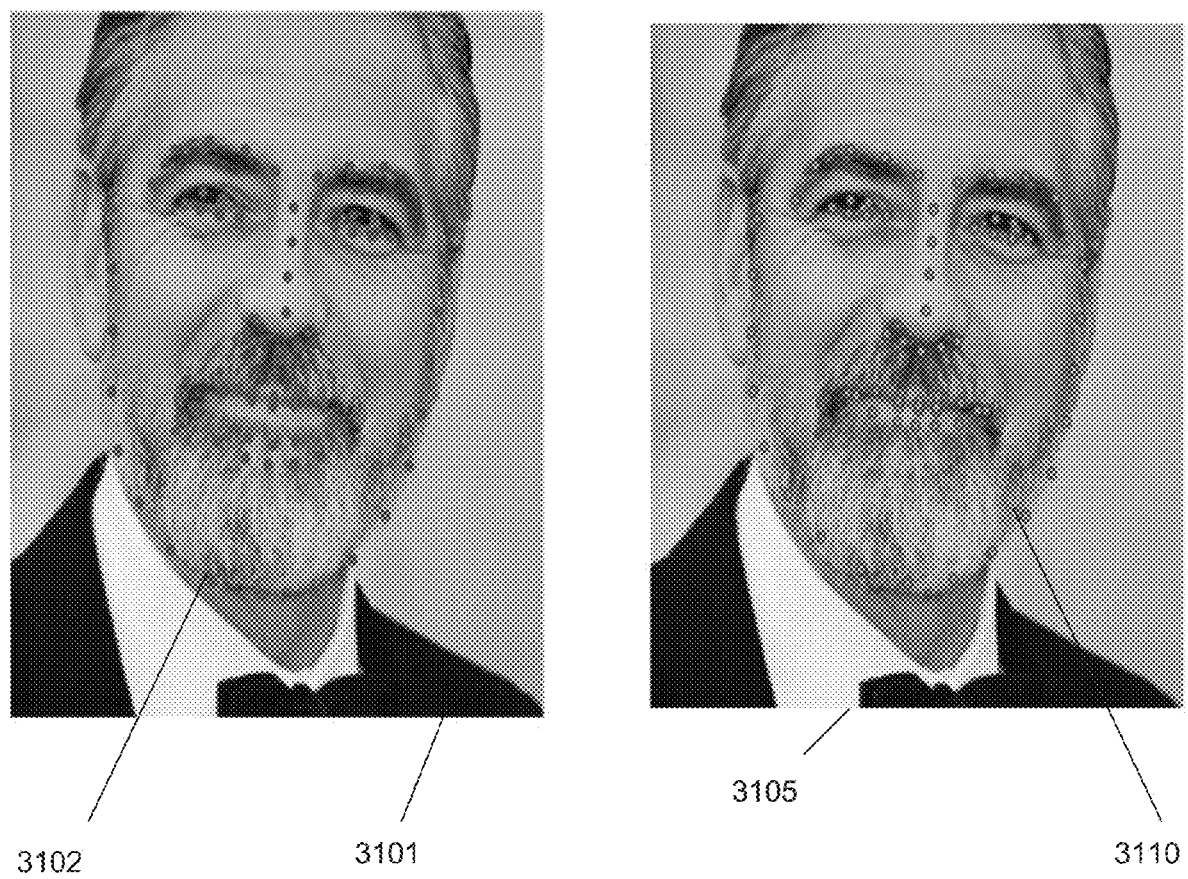
Figure 33:
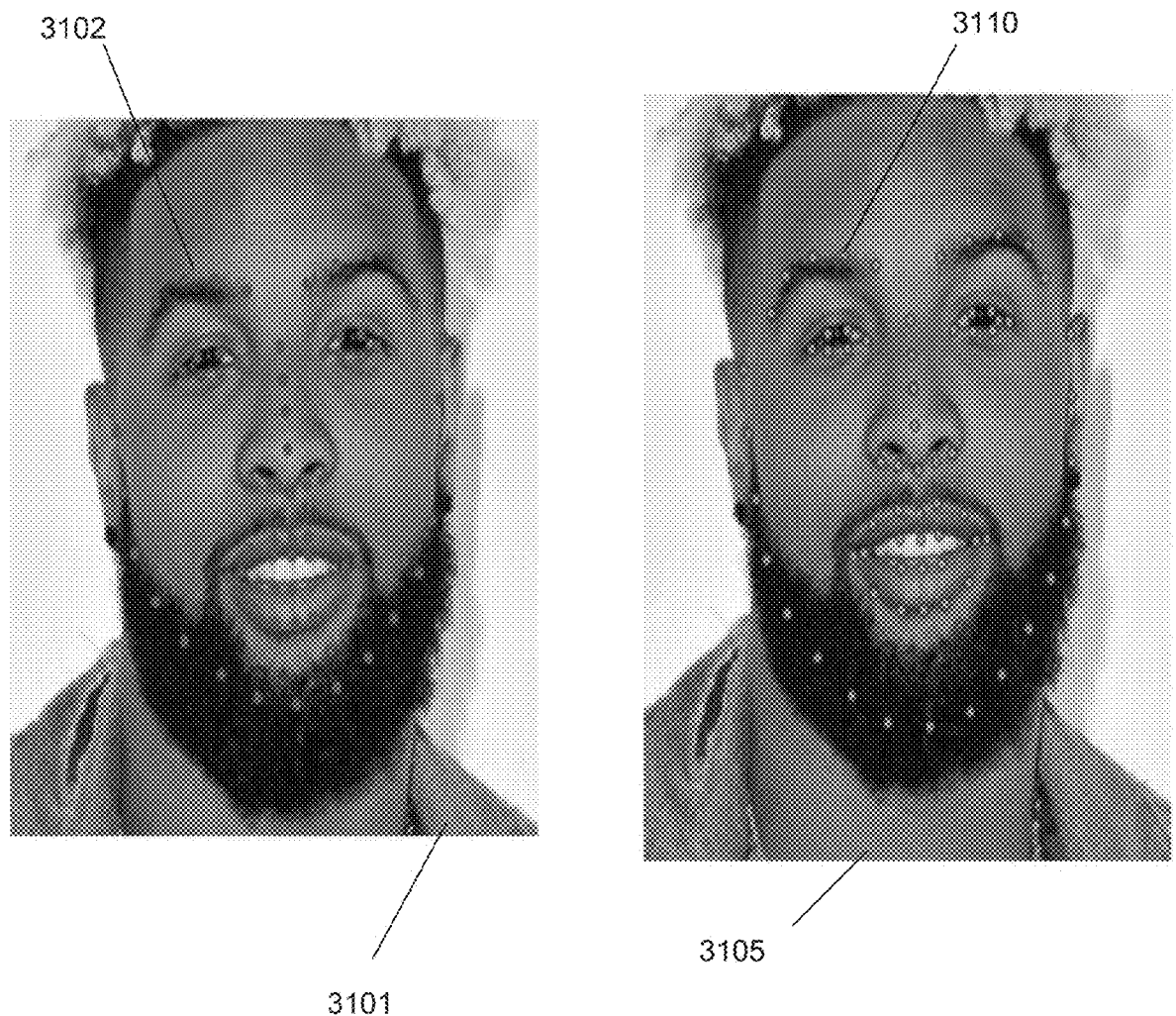
Figure 34:
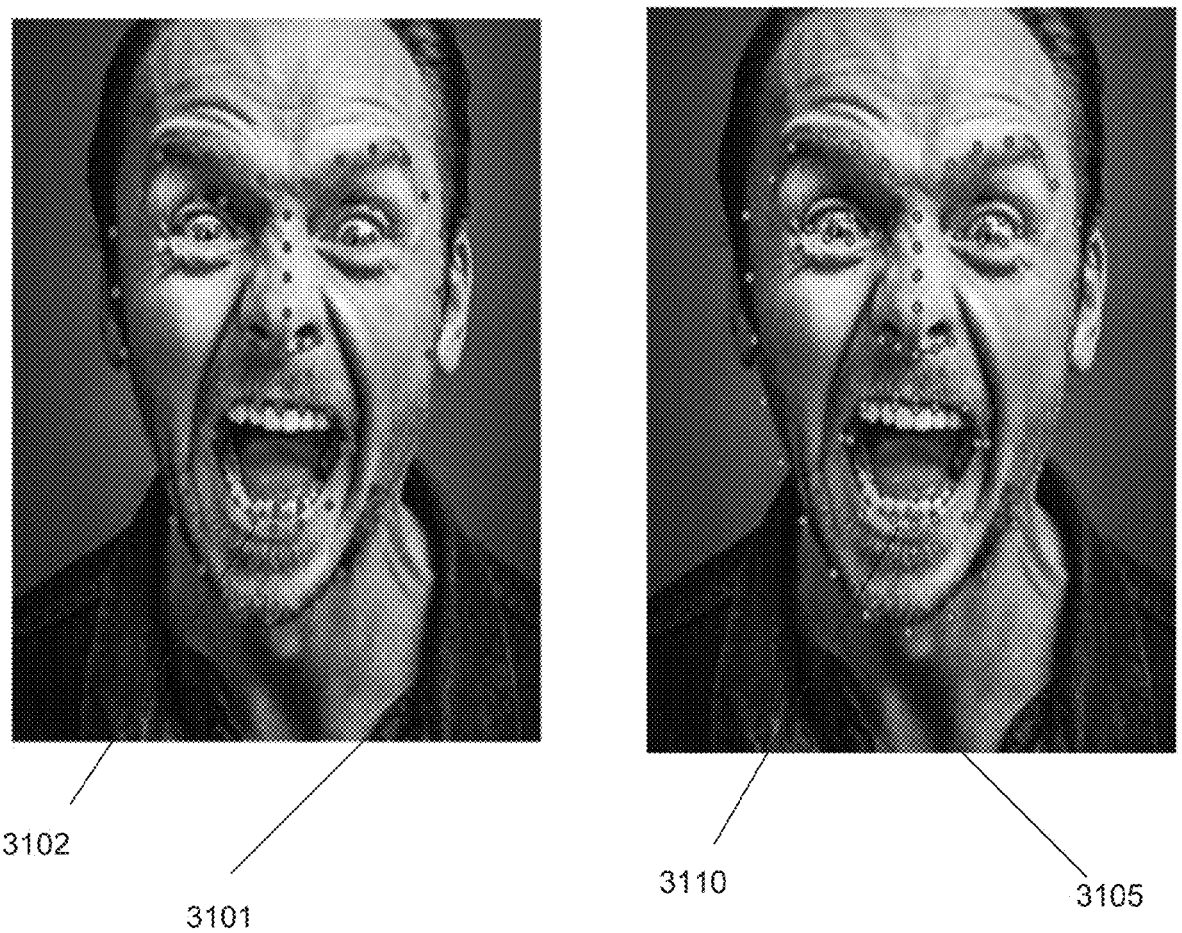
Figure 35:
Figure 35:
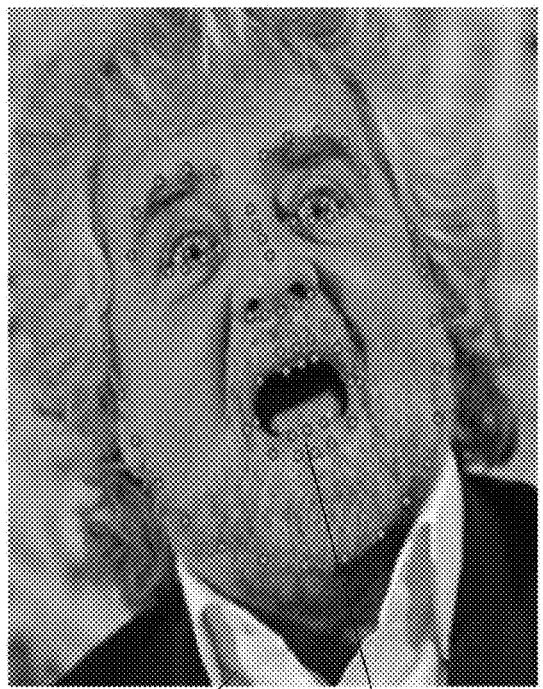

By training a CNN and a RNN to minimize the error between the predicted landmarks and the ground truth landmarks in a dataset, a MDM process in accordance with some embodiments of the invention is able to learn the best way to refine the landmarks for a given image and is more robust to head pose and image content than other landmark identification methods. Example of some comparisons of the landmarks determined by a MDM in accordance with an embodiment of this invention and the landmarks determined by a conventional landmark identification process are shown in FIGS. 31-35 and illustrate the improved performance of the MDM in accordance with an embodiment of the invention. In FIGS. 31-35, the images 3101 show the facial landmarks 3102 identified by a conventional landmark identification process and the images 3505 show the landmarks 3110 identified by a MDM in accordance with an embodiment of the invention. In FIG. 31, the landmarks 3102 in the image 3101 do not properly align with one side of the face while the landmarks 3110 in the image 3105 align with the side of the face. In FIG. 32, the landmarks 3102 in the image 3101 do not properly align with the mouth and instead are aligned with a portion of the beard while the landmarks 3110 in the image 3105 align with the mouth. In FIG. 33, the landmarks 3102 in the image 3101 do not properly align with the jawline of the face and instead align with the beard while the landmarks 3110 in the image 3105 align with jawline in the beard. In FIG. 34, the landmarks 3102 in the image 3101 do not properly align with the mouth and instead align with the teeth while the landmarks 3110 in the image 3105 align with the lips of the mouth. In FIG. 35, the landmarks 3102 in the image 3101 do not properly align with the mouth and instead aligning with the tongue inside the mouth while the landmarks 3110 in the image 3105 align with properly with the lips of the mouth.

MDM processes in accordance with some embodiments of the invention involve the use of an RNN that uses dense matrix multiplication to project image patch features and a CNN that produces a large feature vector for each patch. As a result, the size of the model can explode to over 80,000,000 parameters. This can limit the applications of MDM, since the model size is 309 MB when saved to memory and a large computational load is needed to make a prediction.

Figure 36:
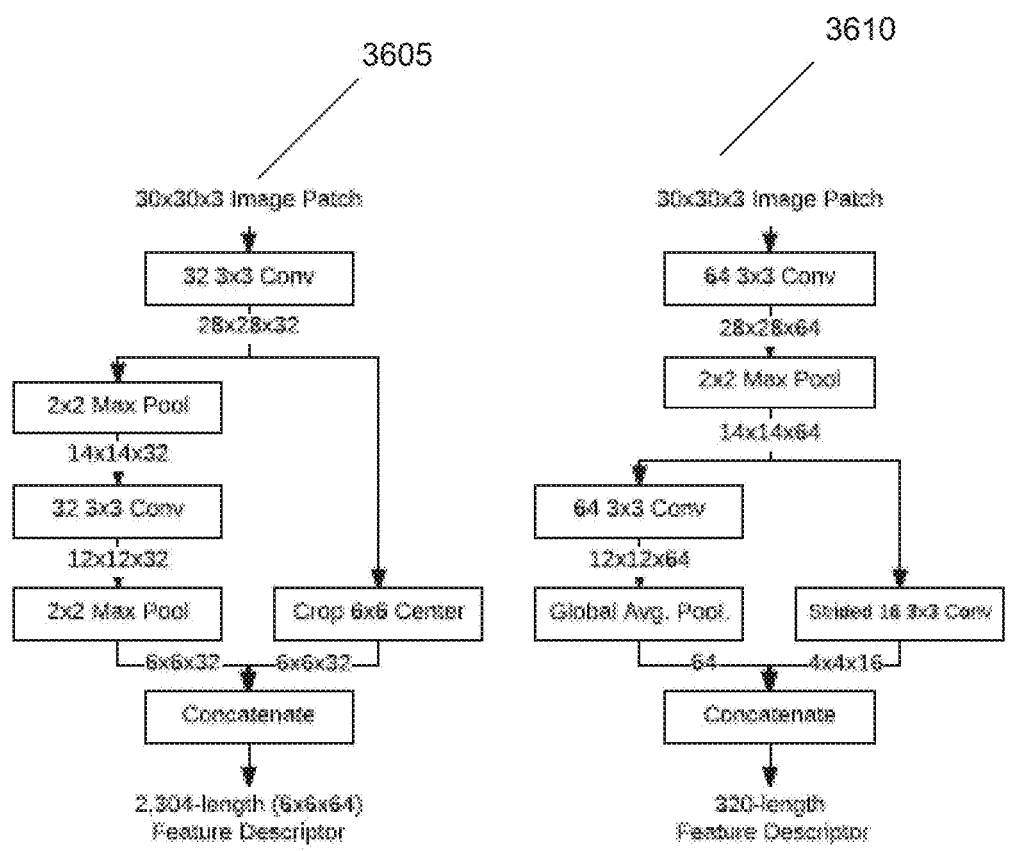
FIG. 36 illustrates an architecture of a conventional MDM compared to an architecture of a MDM in accordance with an embodiment of the invention.

To make the MDM process more lightweight, an MDM process in accordance with many embodiments of the invention may modify the architecture of the CNN to reduce the size of the feature descriptor for each patch by several magnitudes. A CNN architecture 3605 of an MDM process that does not use feature compression compared to a CNN architecture 3610 of a MDM that does use feature compression in accordance with an embodiment of the invention is shown in FIG. 36. In architecture 3610, a global average pooling is used after the final convolution layer in the CNN to obtain a fixed output size that is invariant to the size of the input patch. The fixed output size causes each feature map in the CNN kernels to correspond with a global latent feature in the image patch (as opposed to a latent feature that is dependent upon spatial location).

The global average pooling discards spatial information in the image. As such, MDM processes that utilize feature compression are able to determine the general head pose in the image but often fail to obtain the exact locations of each landmark in the image. To account of the loss of spatial information, an additional convolution layer can be added that does not get pooled, has fewer feature maps, and/or has a large stride to generate additional feature vector that is relatively small but retains spatial information give the CNN more guidance in moving each landmark. In accordance with some embodiments, these optimizations can reduce the size of the MDM network from 309 MB to 30-45 MB and/or reduce the runtime from 232 ms to 169-176 ms while maintaining a similar performance as the base model.

Although various MDM processes are discussed above with reference to FIG. 30, other landmark identification processes may be performed in accordance with certain embodiments of the invention depending on the exact requirements of the system.

Iris Geometry Determination

In accordance with some embodiments, a process may determine a geometry of the iris in one or both eyes. A process for determining iris geometry in accordance with some embodiments of the invention may segment out the visible eye in the image by fitting curves to each of the upper and lower eyelids in the image. The pixels are quantized/classified by colors. In accordance with a number of embodiments, a K-means classifier may be used to separate pixels showing the sclera/hilite, sclera/iris, iris, and pupil. Spatial clustering may be used to select pixels from these boundary colored pixels that are grouped into likely iris edge zones of the visible eye in the image. The iris center and radius are determined by fitting circles to selected iris boundaries on one and/or both eyes visible in the image. If both eyes are used, a constraint that the iris must be similarly sized may be used.

Although embodiments of iris determination processes are described above, other iris geometry determination processes may be performed in accordance with certain embodiments of the invention depending on the exact requirements of the system.

Iris Color Estimation

An estimation of the iris color in accordance with some embodiments may be useful because eyes in images are often varying shades of brown even if the color is perceived as blue, so simple color matching may not provide an accurate color of the iris. To estimate the color of an iris in an eye visible in the image, a process in accordance with many embodiments can use segmented iris and/or sclera to predict whether an iris color is pigment based (brown) or structural reflective. To do so, processes in accordance with several embodiments use hue histograms (12 bins is preferable but not required); sclera/iris contrast and lightness; and ethnicity cues as features for a classifier that predicts the perceived color of a visible eye given segmented pixels. In accordance with a number of these embodiments, a random forest classifier is used.

Although embodiments of iris color estimation processes are described above, other iris color estimation processes may be performed in accordance with certain embodiments of the invention depending on the exact requirements of the system.

Generating a Customized Rig for a Custom Static 3D Model

Figure 5A:
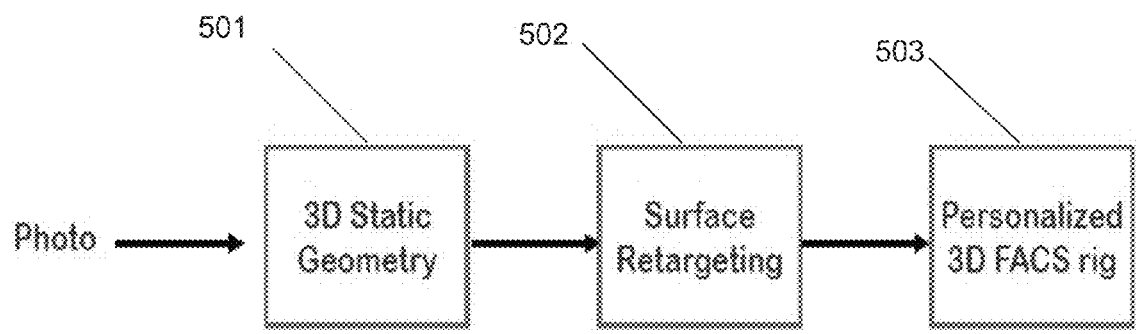
FIG. 5A is a conceptual diagram of a processing pipeline for generating a rig for a static 3D model of a head generated from a captured image of the head in accordance with an embodiment of the invention.
Figure 5B:
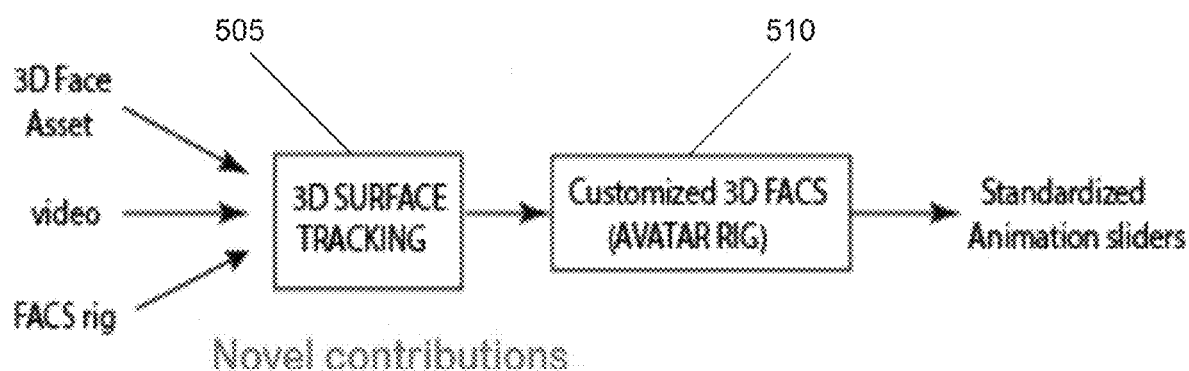
FIG. 5B is a conceptual diagram of a processing pipeline for generating a customized rig for a static 3D model of a head generated from a captured image of the head in accordance with another embodiment of the invention.

To animate a customized static 3D model, a rigging process can be performed to generate a rig that changes the features of the 3D model. The combination of the customized static 3D model and the rig form an animation-ready 3D model that may be used to generate different poses for animation. Conceptual diagrams of processing pipelines for generating rigs for customized static 3D models in accordance with two embodiments of the invention are shown in FIGS. 5A and 5B. In the rigging processing pipeline shown in FIG. 5A, an single capture image is used to generate the customized rig for the customized 3D model, In FIG. 5A, the image is used to determine a 3D static geometry 501, and surface retargeting 502 is performed on the static geometry 501 to generate the customized rig 503. In the rigging processing pipeline shown in FIG. 5B, the customized static 3D model, video of the face moving, and a generic FACS rig are used by a 3D surface tracking process 505 that determines the movements of shapes in the 3D model based upon surface tracking in received video content. A rigging process 510 sets the rig to the customized static 3D model based on the tracked motion of the shapes. The result and/or animation-ready 3D model incorporating a rig that may be manipulated with standardized animation sliders and/or parameters.

Figure 6:
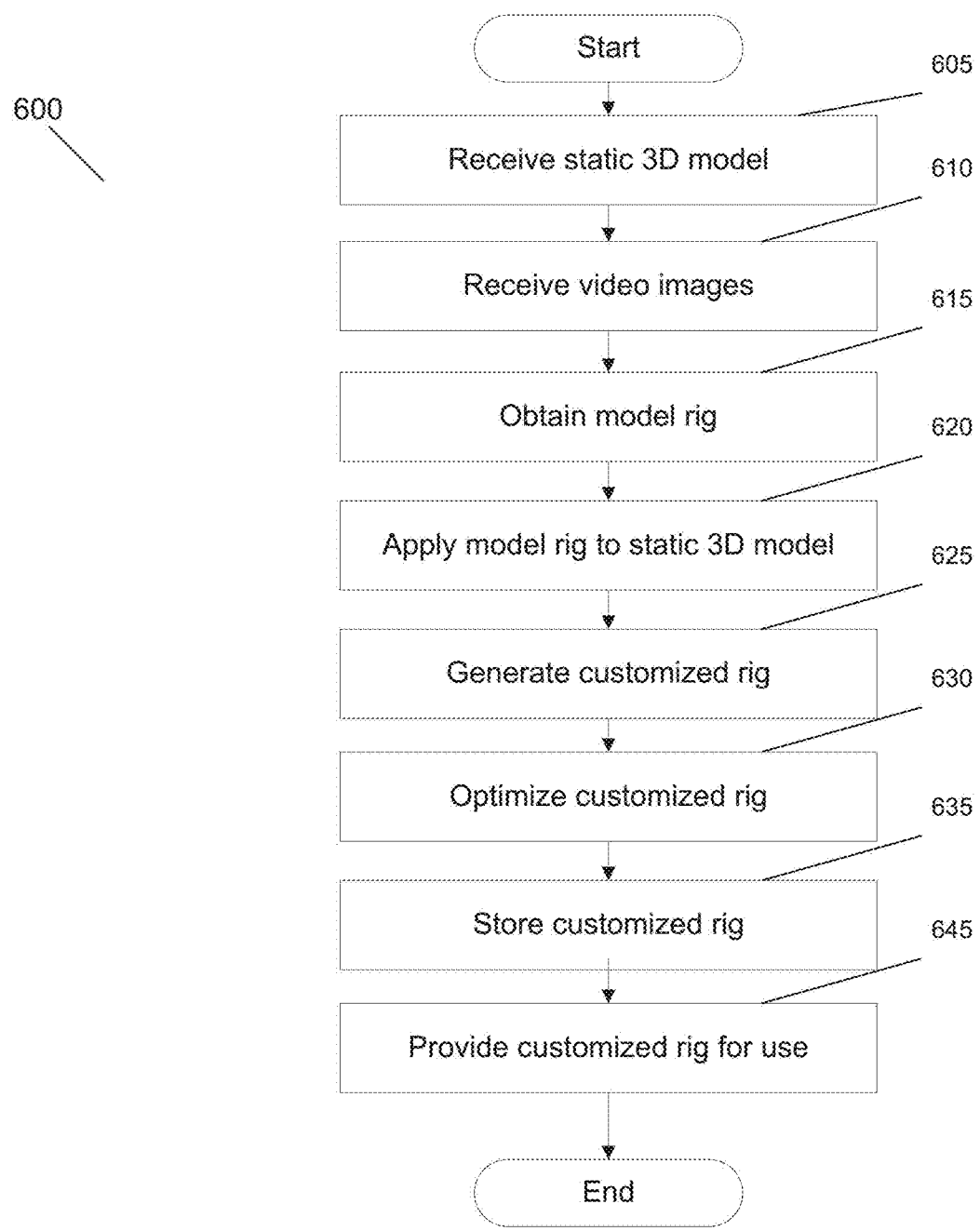
FIG. 6 illustrates a flow diagram of a process performed by one or more devices to generate a rig for a static 3D model of a head generated from a captured image of the head in accordance with an embodiment of the invention.

A flow diagram of a rigging process for generating a rig for a customized static 3D model of a head in accordance with an embodiment of the invention is shown in FIG. 6. In process 600, a customized static 3D model of a head (605) and video images of a source face (610) are received. In accordance with some embodiments, the source video has several facial gestures that allow a large variety of facial movements to be detected. In accordance with some of these embodiments, the video images are taken of the face performing pre-defined, scripted movements that highlight different facial movements. Model rig is obtained (615). In accordance with some embodiments, a previously generated model rig can be read from a memory accessible by the system performing the process. In accordance with many embodiments, the rig is a set of standard FACS blend shapes.

The rig model is applied to the customized static 3D model (620). The rig can be customized to the model using the video of the performance (625). In accordance with some embodiments, the rig model is initially fitted to the shapes of the static 3D model. The blend shapes are customized to best fit the facial motions of the face by tracking a 3D surface to the face in the received video images and re-computing the blend shapes to best fit the tracked 3D surface in the video images.

In accordance with some embodiments, the 3D surface is tracked by solving the optimizing equation shown below for each frame or image in the video images:

$$\mathop{\arg\min}_{\overline{\alpha}, \overline{\omega}, v} \|E_{data} + \beta_{shape} \times E_{reg}^{shape} + \beta_{tex} \times E_{reg}^{texture}\|_2^2$$

except that the shape is defined by a FACS blend shape basis, $B^{FACS}$, instead of the general blend shape basis used to generate the customized static 3D model as shown in the following equation:

$$S(\overline{\alpha},\overline{v}) = B^{FACS}(\overline{v}_{blend}) \times C(\overline{\alpha}_{corr}) \times F(\overline{v})$$

where $B^{FACS}(\overline{\alpha}_{blend})$ is the FACS blend shape basis. Using the above equations, the 3D surface of the face in a sequence of t video images results in a tracked surface, G (t). The final step is to resolve the FACS blend shape basis, $B^{FACS}$ to best fit the tracked surface as expressed in the following equation to optimize the rig (630):

$$\mathop{\arg\min}_{B^{FACS}} \|G(t) \ldots S(\overline{\alpha},\overline{v},t)\|_2^2$$

The customized rig can be stored in memory for use in other applications (635) and provided for use by a specific application (640). In accordance with some embodiments, the customized rig is provided by transmitting the customized rig to an application on a user device via a communications network. In many embodiments, the customized rig is provided by passing the customized rig to another application being executed by the system.

Although various processes for generating custom rigs fit to static 3D models of human faces are described with reference to FIG. 6, other processes may be used to automatically rig 3D models of human faces as appropriate to the requirements of a given system in accordance with other embodiments of the invention.

Generating a Mapping of Rig Parameters to Audio Samples

Animation that synchronizes movements of a 3D model of a face to audio data that mimics the face's speech patterns and/or other facial expressions can be achieved using a mappings between audio samples of sounds and images containing facial expressions and sets of rig parameters that form a 3D model of a face into the facial expression for making the sounds and/or captured facial expressions. For purposes of this discussion, a sample of audio is a window or frame of audio content provides audio content for a certain time period of playback. In accordance with a number of embodiment, the amount of playback time per sample of audio content is equal to the framerate of the animation being generated. In accordance with some embodiments, general sets of rig parameters may be determined by using video and/or images captured of a variety of speakers and mapped to various sounds, emotions and/or other stimuli. These general sets of rig parameters may be applied to the rig of any customized 3D generative animation model to allow a newly created 3D model to be immediately animated. However, these general sets of rig parameters may not exactly match the expression of a particular user.

Figure 7:
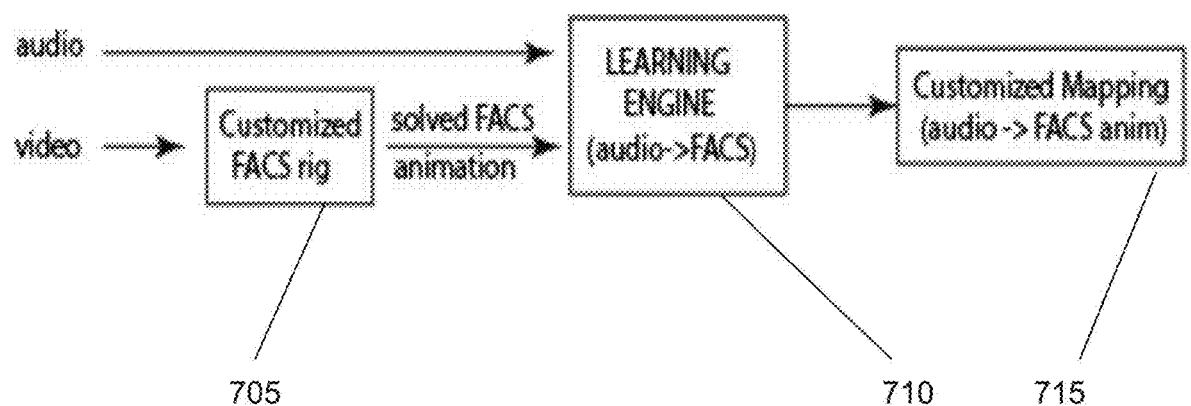
FIG. 7 is a conceptual diagram of a processing pipeline for mapping rig parameters to audio samples in accordance with an embodiment of the invention.

A conceptual diagram of a processing pipeline for generating mappings for sets of rig parameters and particular sounds in accordance with an embodiment of the invention is shown in FIG. 7. The processing pipeline for generating mappings receives video images and synchronized audio data. As discussed above, the video images may be of one or more speakers to generate general sets of rig parameters and/or from a particular user to generate customized sets of rig parameters for a customized 3D model based on the particular user. The video images can be applied to the customized rig 705 to determine a set of rig parameters for each facial expression made in the images. The sets of rig parameters and the audio can be initialized by a learning engine 710 that generates mappings 715 between each set of rig parameters and a sample of set of samples of the input audio.

Figure 8:
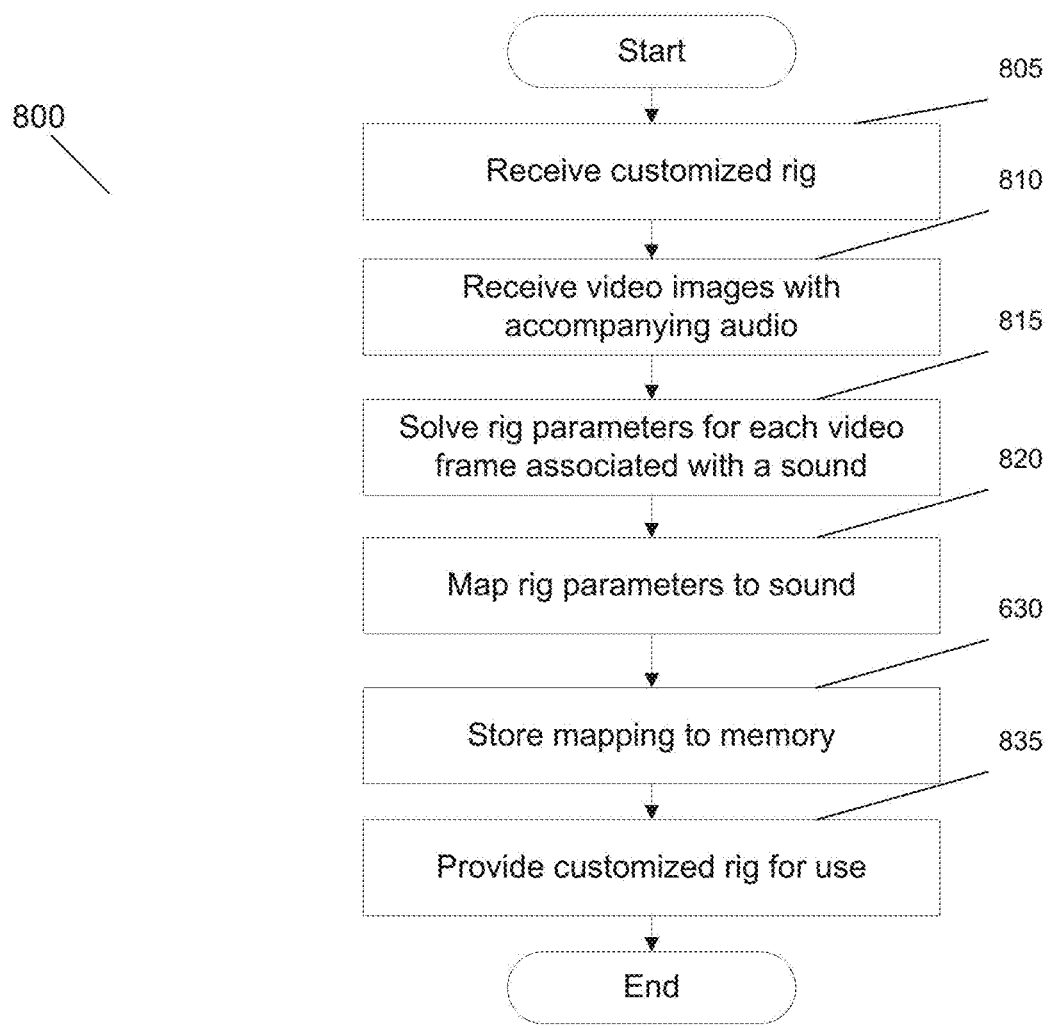
FIG. 8 is a flow diagram of a process for mapping rig parameters to audio samples in accordance with an embodiment of the invention.

A process for training the rig to animate a customized 3D model to generate facial expressions corresponding to generated sounds and show a particular expression as well as mapping the expressions to particular sounds, emotions, and/or other forms of stimulus in accordance with an embodiment of the invention is shown in FIG. 8. Process 800 receives the customized rig (805) for a customized 3D model such as a model generated using 2D captured images of a face using a process similar to any of the processes described herein. A training set of video images along with accompanying audio data is received (810). In accordance with some embodiments, the video images are of a human the face performing a pre-determined script or line of dialog that shows the facial expressions made for a number of predetermined sounds made while speaking or communicating in another manner. In accordance with many embodiments, the audio content received with the video images is synchronized to the video content for use in mapping expressions to sounds.

The rig parameters for the rig are determined for each sound (815). In accordance with some embodiments, the rig parameters, $(\overline{\alpha},\overline{v})$, are solved to match every image or frame in the video images by a process similar to the process described above with regards to generating the customized rig. In particular, a 3D surface is tracked by solving the optimizing equation shown below for each frame or image in the video images:

$$\underset{\overline{\alpha},\,\overline{\omega},\,v}{\arg\min} \|E_{data} + \beta_{shape} \times E_{reg}^{shape} + \beta_{tex} \times E_{reg}^{texture}\|_2^2$$

Using the shape is defined by FACS blend shape basis, $B^{FACS}$ as shown in the following equation:

$$S(\overline{\alpha},\overline{v}) = B^{FACS}(\overline{\alpha}_{blend}) \times C(\overline{\alpha}_{corr}) \times F(\overline{v})$$

where $B^{FACS}(\overline{\alpha}_{blend})$ is the FACS blend shape basis for the customized 3D generative animation model. Using the above equations, the 3D surface of the face in the t video images in a tracked surface G (t) are used to determine a set of rig parameters for an expression for making a particular sound. In accordance with some embodiments, the tracking may be based on identified features within the surface. In accordance with many embodiments, the tracking may be performed on a per pixel basis.

In accordance with some embodiments, the rig parameters are nonlinearly related to a rigged models shape changes. The relationship is nonlinear because nonlinear corrective shapes account for interactions between blend shapes. As such, some groups of rig parameters are mutually exclusive in order to provide plausible animation of the model. Thus, processes for determining the rig parameters in accordance with some embodiments are nonlinear guided optimizations of the parameters. In accordance with many embodiments, the determining of the rig parameters may be performed in stages over different subsets of rig parameters where each subset explains a different fraction of variation in the image. The stages in accordance with several embodiments may include, but are not limited to a rigid solve stage, a mouth solve stage, and a upper face solve stage. The rigid solve stage may determine rig parameters explaining motion of non-deforming head features as a rigid motion of the head and may be used to stabilize the geometry for other stages. The mouth solve stage may determine rig parameters for the jaw opening to match a chin position and for mouth shape networks including, but not limited to, moving of mouth corners inward and/or outwards, and rolling of the lips. In accordance to a few embodiments, complementary or exclusive shape groups may be coupled using optimizer constraints. The upper face solve stage determines the rig parameters for facial features independently of the mouth shape networks. Example of facial features that may have movement determined in the upper face solve stage include, but are not limited to, eyes, eyebrows, and nostrils.

The received audio can be divided into samples of particular sounds and each set of rig parameters for an expression is mapped to a particular sample or sound (820). In accordance with some embodiments, a machine learning system is used to generate mappings. In accordance with many of these embodiments, a supervised learning algorithm is used to compute mappings between each set of rig parameters and a particular sound or sample.

The mappings between the sets of rig parameters and sounds or samples can be stored in a table or some other data structure in memory for later use (830) and/or the mappings can be provided to another application or device for use (835). In accordance with some of these embodiments, the mappings are provided to an application on a user device via a communications network.

Although various processes for generating a between sets of rig parameters for expression of a face and sounds or samples of audio data are described above with reference to FIG. 8, other processes appropriate to the requirements of a given application may be used in accordance with other embodiments of the invention.

Providing Animation from an Input Audio

Figure 9:
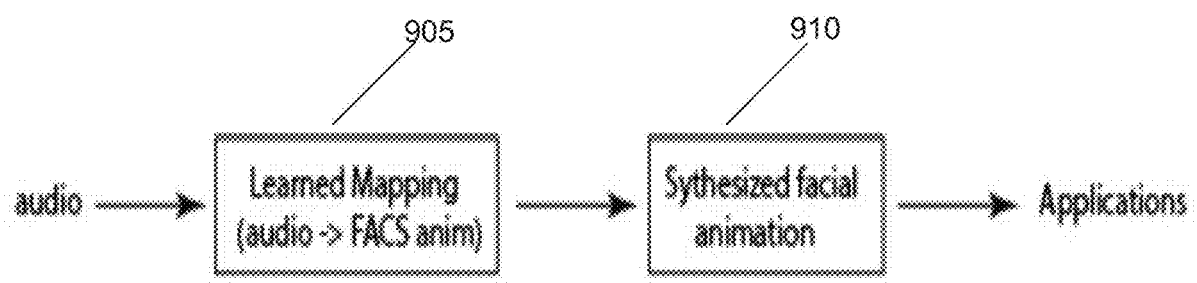
FIG. 9 is a conceptual diagram of processing pipeline for animating a 3D model of a head using the mapping of rig parameters to audio samples in accordance with an embodiment of the invention.

Mappings of the set of rig parameters for the customized rig to sounds or samples of audio content may be used to generate an animation of the head based upon received audio content. The animation preferably resembles the speech patterns of the user from which the head is modelled. A processing pipeline for generating animation of a 3D model from input audio in accordance with an embodiment is shown in FIG. 9. The audio animation pipeline receives audio content. In accordance with some embodiments, the audio content is recorded audio data. In accordance with some other embodiments, the audio content may be text that is to be converted to an audio rendition. The audio content can be applied to a mapping process 905 that uses the mappings between sets of rig parameters for the rig of the 3D model and sounds or audio samples to generate a synthetic facial animation 910. The synthetic facial animation can be represented as one or more playlists of sets of parameters that are synchronized to sounds and/or samples of the input audio content. In accordance with some other embodiments, the animation of the 3D model can be represented using a variety of techniques including, but not limited to, a sequence of motion variable as appropriate to the requirements of the invention.

Figure 37:
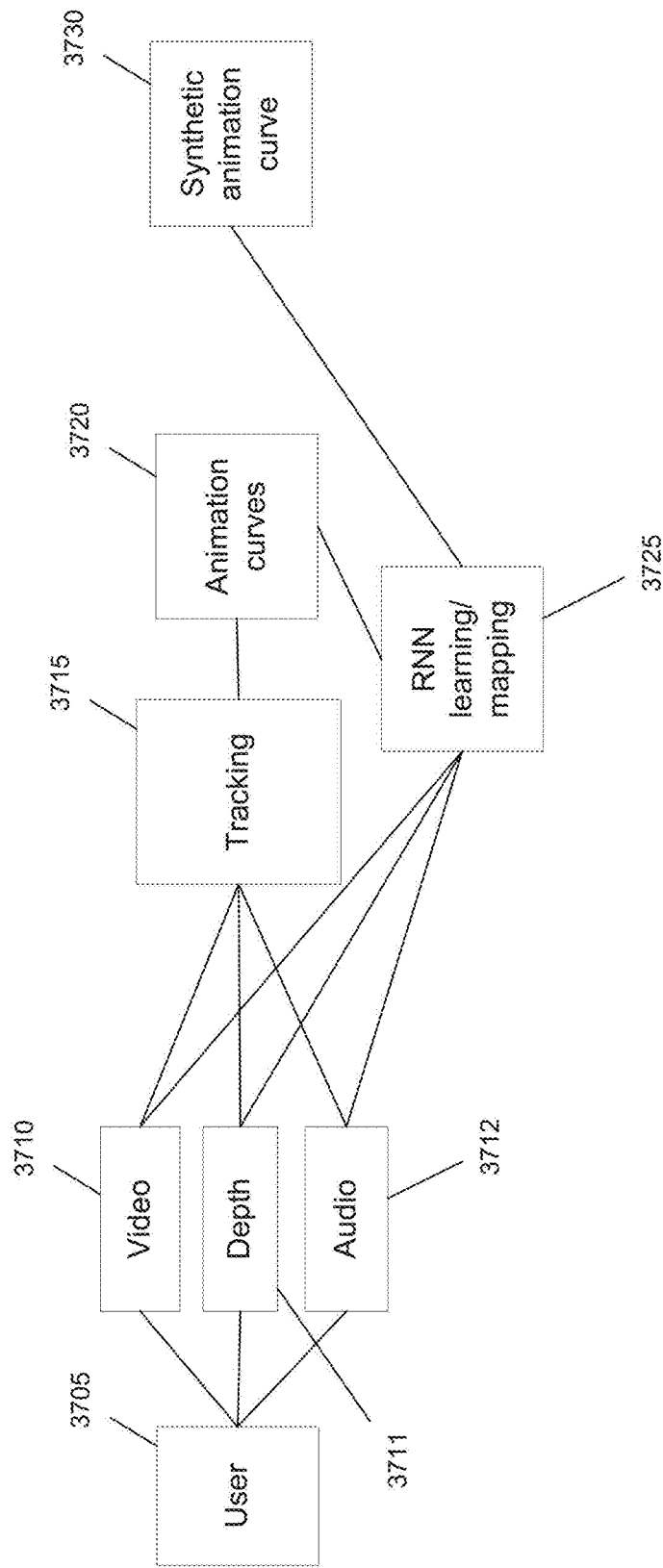
FIG. 37 illustrates a processing pipeline for using a temporal model to map sets of rig parameters to input audio and/or video in accordance with an embodiment of the invention.
Figure 39:
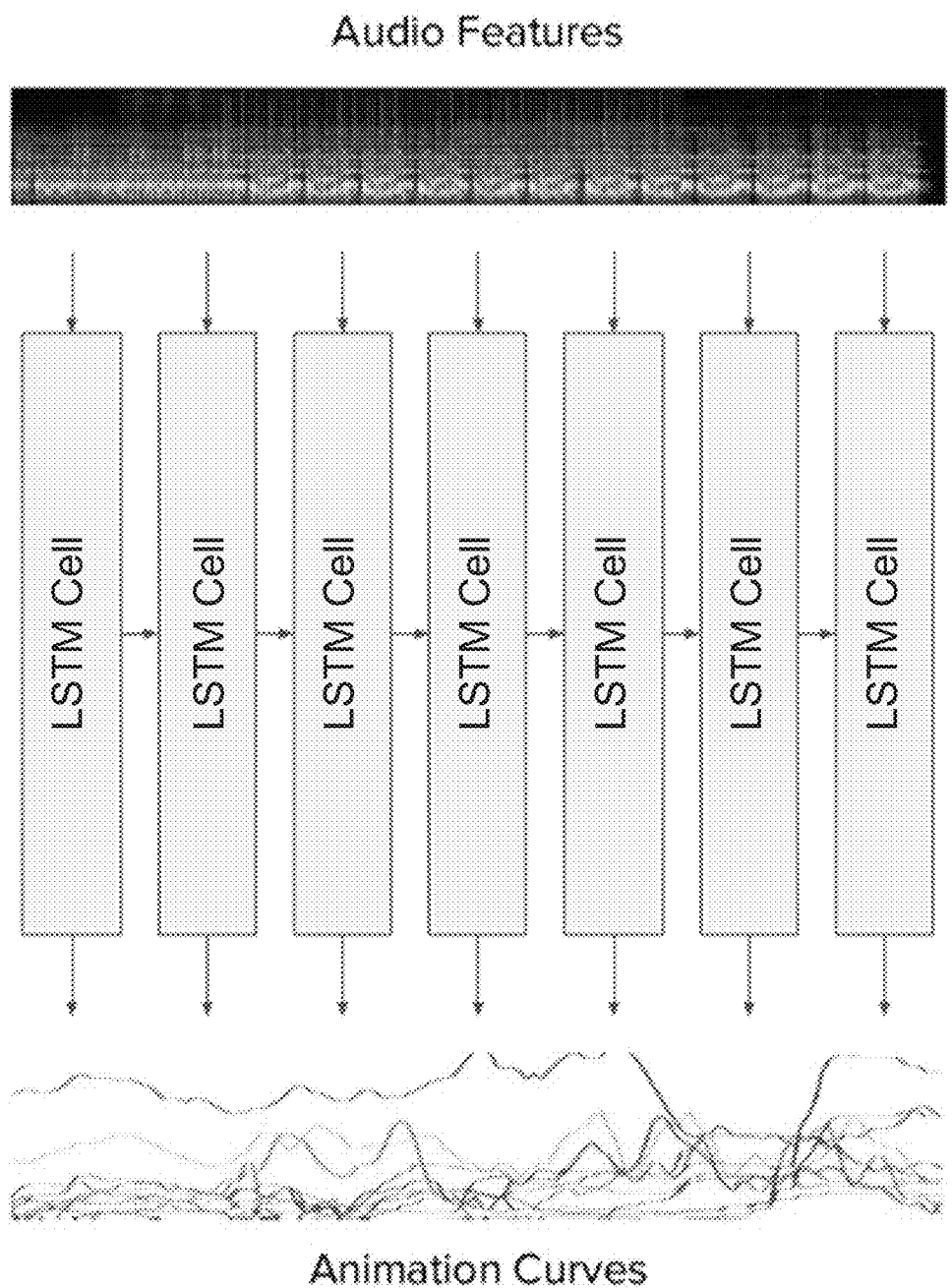
FIG. 39 conceptually illustrates a RNN providing a temporal model in accordance with an embodiment of the invention.

In accordance with some embodiments, processing pipelines for generating and mapping the set of rig parameters of customized rigs to audio sample and/or other stimulus use a temporal model to learn/map the associations. For purposes of this discussion, a stimulus is any arbitrary signal from which an animation can be derived including, but not limited to, a vide queue, depth information, and facial landmarks. A processing pipeline using an RNN in accordance with an embodiment of the invention is shown in FIG. 37. In this processing pipeline, video images 3710, depth information for the video images 3711, and/or audio data 3712 of user 3705 can be provided to a tracking process 3715. The tracking process 3715 may be a high fidelity process. In accordance with some embodiments, the tracking process 3715 may track features of the face through the video frames of the images. In accordance with many embodiments, the tracking process 3715 may track the face on a per pixel basis across the frames of the video images. The tracking process 3715 can provide sets of rig parameters, also referred to as animation curves 3720. The sets of rig parameters 3720 as well as video images 3710, depth information for the video images 3711, and/or audio data 3172 of user 3705 can be provided to a learning/mapping process 3725. In accordance with several embodiments, the learning/mapping process 3725 utilizes a temporal model in the form of a RNN that maps the sets of rig parameters to particular sounds and/or other stimulus based on the input video images and/or audio data. A conceptual example of learning/mapping process involving a RNN in accordance with an embodiment of the invention is shown in FIG. 39 where the audio data is provided to LSTM cells that map the audio to the tracked movement in the video images and return the sets of rig parameter/animation curves.

Figure 38:
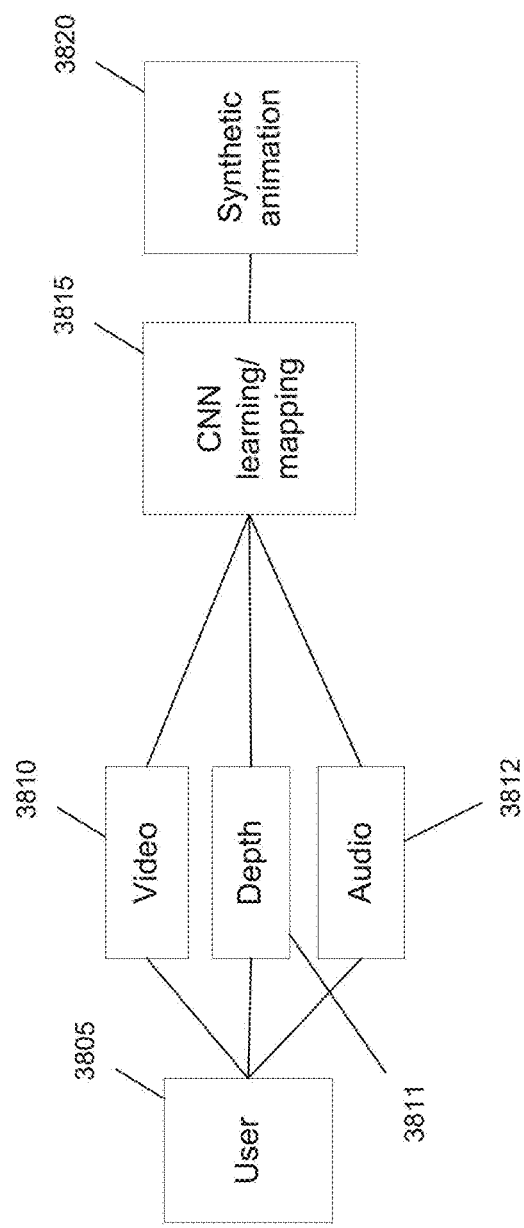
FIG. 38 illustrates processing pipeline for using a time series model to map sets of rig parameters to input audio and/or video in accordance with an embodiment of the invention.

Although various processing pipelines for mapping sets of rig parameters to audio portions and/or other stimulus using temporal models are discussed with reference to FIG. 38, other processing pipelines that provide mapping/learning using temporal models can be utilized based on the requirements of the system in accordance with other embodiments of the invention.

Figure 40:
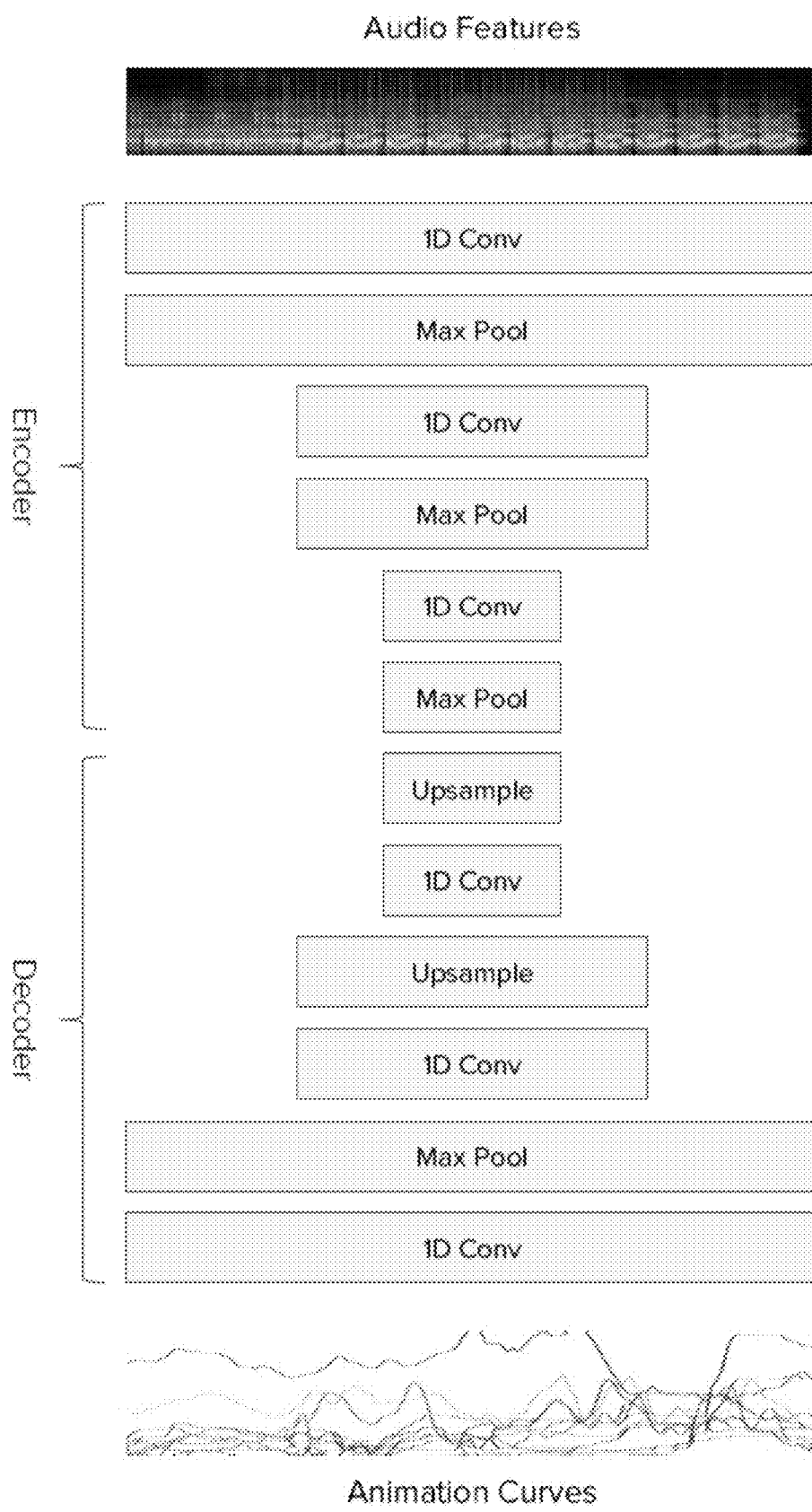
FIG. 40 conceptually illustrates a CNN providing a time series model in accordance with an embodiment of the invention.

In accordance with many embodiments of the invention, the processing pipeline uses a time series model to determine the sets of rig parameters and mapping of rig parameters to audio data or other stimulus. In the processing pipelines, a trained rig model predicts rig parameters/control curves based on the previously used input data. In accordance with some of these embodiments, the process is performed off-line (some time prior to run-time) and predicts an entire video segment at one time given the entire input stream. In accordance with a number of embodiments, the training occurs on-line (at run time) and only the previous received video and/or audio data is used to determine the set of rig parameters for a current portion of video and/or audio data. A processing pipeline using a time series model involving a CNN in accordance with an embodiment of the invention is shown in FIG. 38. In this processing pipeline, video images 3810, depth information for the video images 3811, and audio data 3812 are provided to a learning/mapping process 3815. In accordance with some embodiments, the learning/mapping process 3815 is provided by a time series model using a CNN. An example of a time series model involving a CNN for a learning/mapping process in accordance with an embodiment of the invention is shown in FIG. 40. Returning to FIG. 39, learning/mapping process 3815 returns the sets of rig parameters/animation curves mapped to particular audio segments and/or other stimulus.

In accordance with some embodiments of the invention, an additional discriminator network may be added to the pipeline to optimize the animation. The discriminator network may be a neural network that compares animation of the training video images to the generated video images to determine whether the generated animation is realistic. To do so, the animation generator in the pipeline may add a noise component to the input audio and generate the sets of rig parameters to generate less realistic animations. The optimization process then becomes a minimum-maximum game where the animation generator tries to fool the discriminator so that the generated animations are indistinguishable from the ground truth animations derived from the training video images. An optimization process in accordance with many embodiments solves ambiguity problems where an input stimulus may have multiple outputs encourages the addition of subtle details that may not be added to the animation in a means-squared error approach.

Although various processing pipelines for mapping sets of rig parameters to audio portions and/or other stimulus using above time series models is discussed above with reference to FIG. 39, other processing pipelines that provide mapping/learning using time series models based on the requirements of the system in accordance with other embodiments of the invention.

Figure 10:
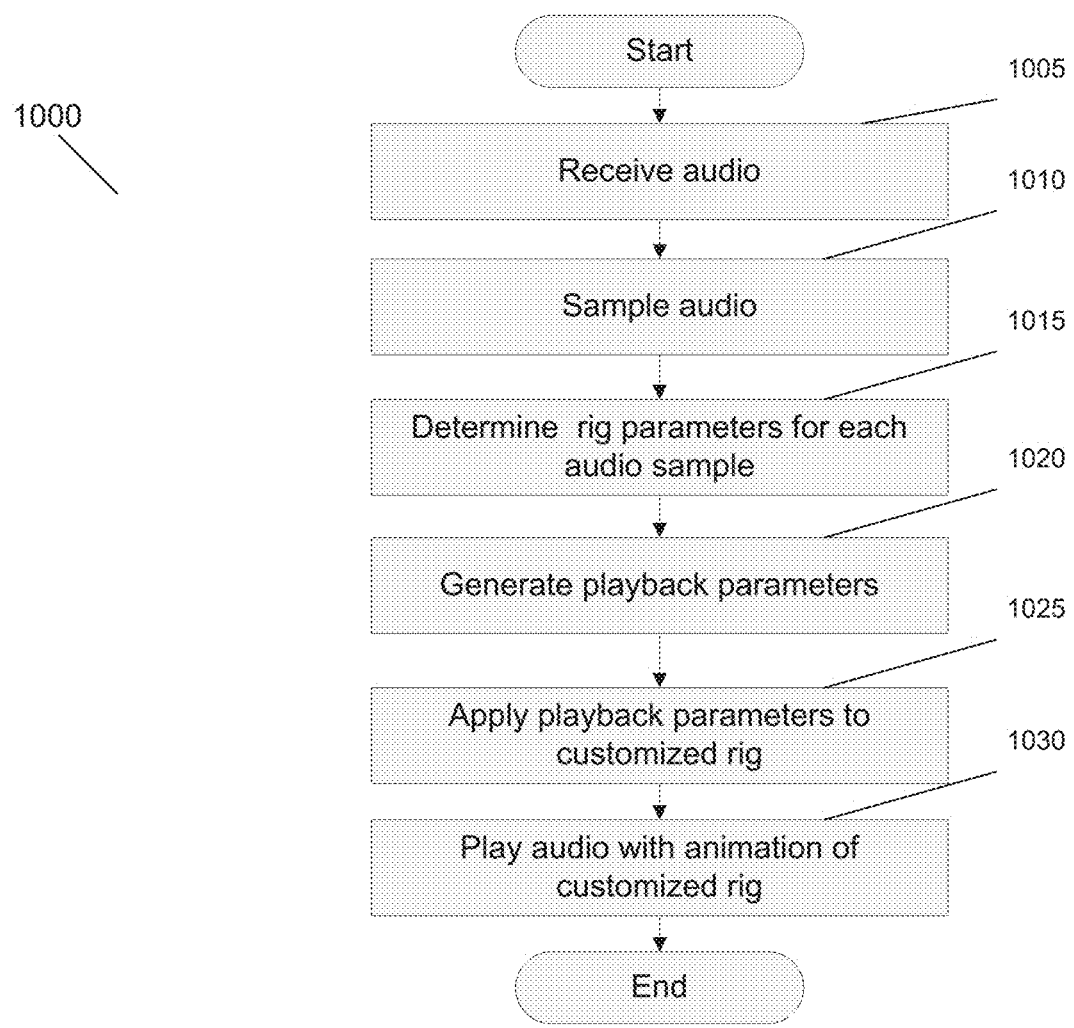
FIG. 10 is a flow diagram of a process for animating a 3D model of a head using a mapping of rig parameters to audio samples in accordance with an embodiment of the invention.

A process for generating animation for a customized 3D generative animation model from input audio content in accordance with an embodiment of the invention is shown in FIG. 10. Process 1000 receives audio content 1005. In accordance with several embodiments of the invention, the audio content may be received via an input device. In accordance with a number of embodiments, the audio content may be a file storing audio data. In accordance with still some other embodiments, the audio content may be text that is to be converted to an audio rendition. In accordance with a few embodiments, text that includes a string of one more words where each word indicates an expression can be provided.

Audio content can be divided into components (1010). In accordance with some embodiments, the audio content is broken into samples that contain an individual sound or a sufficient small clip of audio data. Each sample or piece of audio content is mapped to a set of rig parameters using the mapping between sets of rig parameters and samples. A playback list of the set of rig parameters can be generated. In accordance with some embodiments, the playback list may only include a portion of the determined sets of rig parameters. Preferably, the portion includes a sufficient number of sets to give the appearance of synchronization between the animation and the audio content when the animation and audio content are played back concurrently.

Where the text indicates expressions to generate, the process may receive the string of text, parse the text to determine words and use a mapping of words to sets of rig parameters to generate determine the set of rig parameters associated with each word and generate a playlist of the determined sets of rig parameters.

A playlist can be applied to the rig of the 3D model during playback to animate the model (1025). In accordance with some embodiments, the playlist may be provided to another application being executed by the device or may be transmitted to another device over a communication network for playback by the other device. The audio from the audio content or generated from the audio content can be played back concurrently with the animation from the playback list (1030).

Although various processes for generating computer animations of 3D models of heads from input audio content can be utilized to generate computer animations of 3D models of faces, heads, and/or avatars are described with reference to FIG. 10, other processes that generate computer animations may vary based on the requirements of the system in accordance with some other embodiments of the invention.

Generating a 3D Model Using Machine Learning

Figure 41:
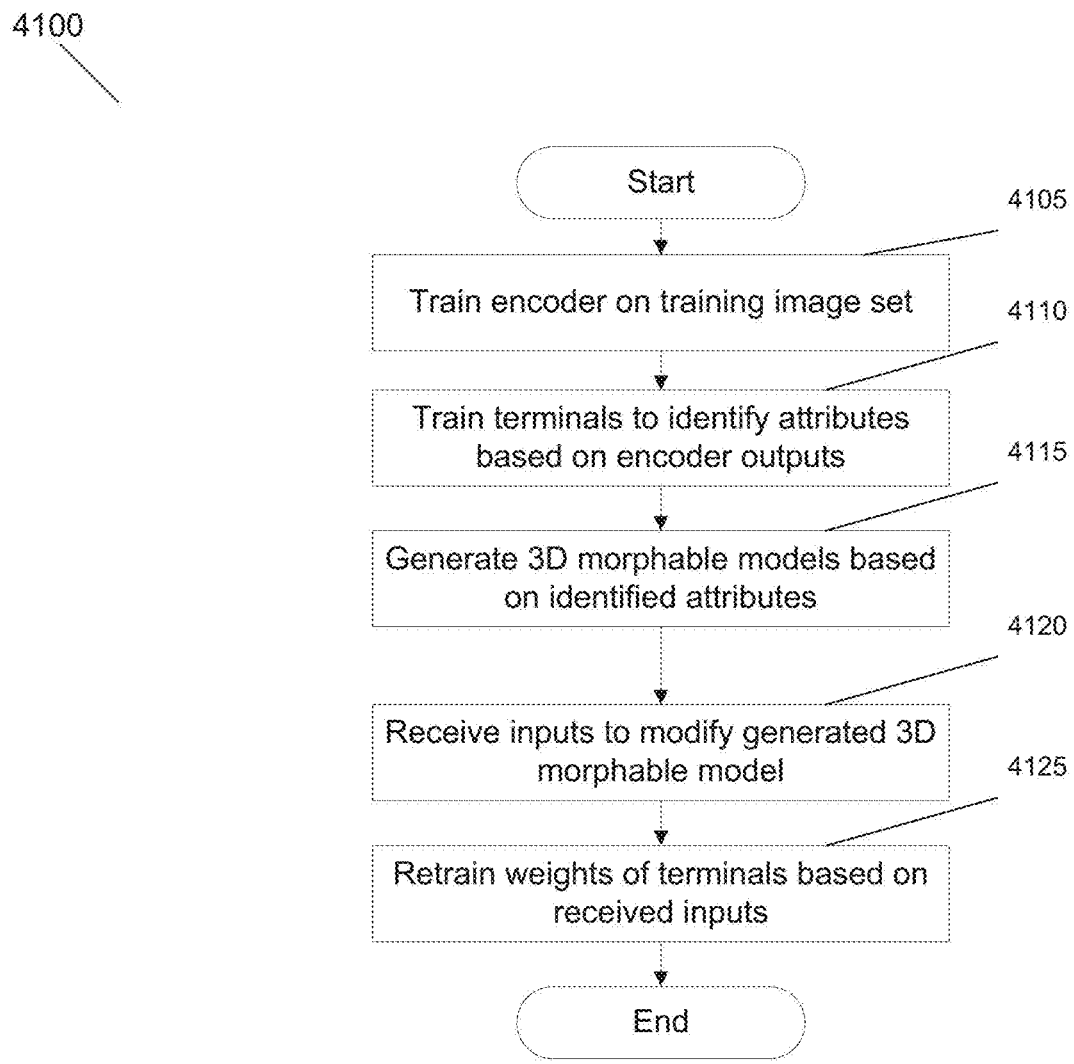
FIG. 41 illustrates an example of a process for generating customized 3D models in accordance with an embodiment of the invention.

In some embodiments, generating the customized static 3D model of a head comprises one or more optimization processes for initializing the 3D model and for identifying blend shapes to be used with the static 3D model. An example of a process for generating customized 3D models is illustrated in FIG. 41. Process 4100 trains (4105) an encoder on a training image set. In some embodiments, the encoder is trained on a large training dataset of faces (e.g., FaceNet), to learn features that are useful for distinguishing between faces. The encoder in accordance with some embodiments of the invention produces a feature vector for new input images. In certain embodiments, encoders are developed as facial recognition models because the embedding learned for face recognition can learn a useful signal for doing attribute classification.

Models can be chosen to be both flexible, and efficient. In many embodiments, taxonomy models operate on mobile devices and other constrained-compute environments. Model frameworks in accordance with a number of embodiments of the invention can share weights for encoding (e.g., from the encoder) using a mobile-compatible convolutional neural network (CNN), such as (but not limited to) DenseNet, and branches into lightweight prediction layers (terminals), consisting of one or more multiple fully connected neural network layers. Allowing all of the fully connected terminals to share a common base enables a lightweight framework that can operate on lower-power devices such as (but not limited to) mobile phones. Performance on such devices can be improved in accordance with several embodiments of the invention by sharing as many weights as possible across the classifiers for the different attributes. In some embodiments, a base encoder can be used as part of a semantic segmentation network.

Process 4100 trains (4110) set of one or more terminals. Terminals in accordance with some embodiments of the invention include classifier models, such as (but not limited to) neural networks with fully connected layers for identifying the presence of attributes within the input image based on the generated output(s) of the encoder. Terminal networks in accordance with numerous embodiments of the invention can be dynamically added and/or removed by including them in a configuration file (e.g., a YAML config file). In several embodiments, configuration files can be used while preprocessing data, during model creation, training and finally during integration of the model.

In a number of embodiments, training of terminals uses either a 'Frozen' or a 'Finetuning' method, in which the weights and/or parameters of all (or a majority) of the layers of the encoder are 'frozen,' such that training of the terminals does not affect the encoder, but forces the terminals to learn from the outputs of the encoder. This allows for new terminal models to be trained on a smaller subdataset, allowing for the production of usable results with very small datasets and in a small amount of time. In numerous embodiments, terminal models are trained using raw, cropped images of different face regions into a smaller attention-based network.

In several embodiments, terminals are trained on feature vectors (or embeddings) generated by an encoder model that is shared between multiple terminal models. In numerous embodiments, the encoder embeddings from an encoder are combined with intermediate feature maps to get even better accuracy for some attributes. In various embodiments, terminal models are trained so that each model is capable of predicting groups of attributes. By having a single "trunk" of shared weights, total model size is kept minimal.

In some embodiments, taxonomy attributes can include global and/or local attributes, where global attributes can be used for identifying a template 3D model, while local attributes can be used for shape solving individual shapes for the template 3D model. Taxonomy attributes in accordance with some embodiments of the invention provide a new facial structure standardization that can improve avatar personalization from an input image by providing a standard set of attributes that can be personalized for an individual. In some embodiments, taxonomy attributes can simplify the retargeting of features to non-human stylized faces because the attributes have semantic meaning which is intuitive to an artist.

Figure 43:
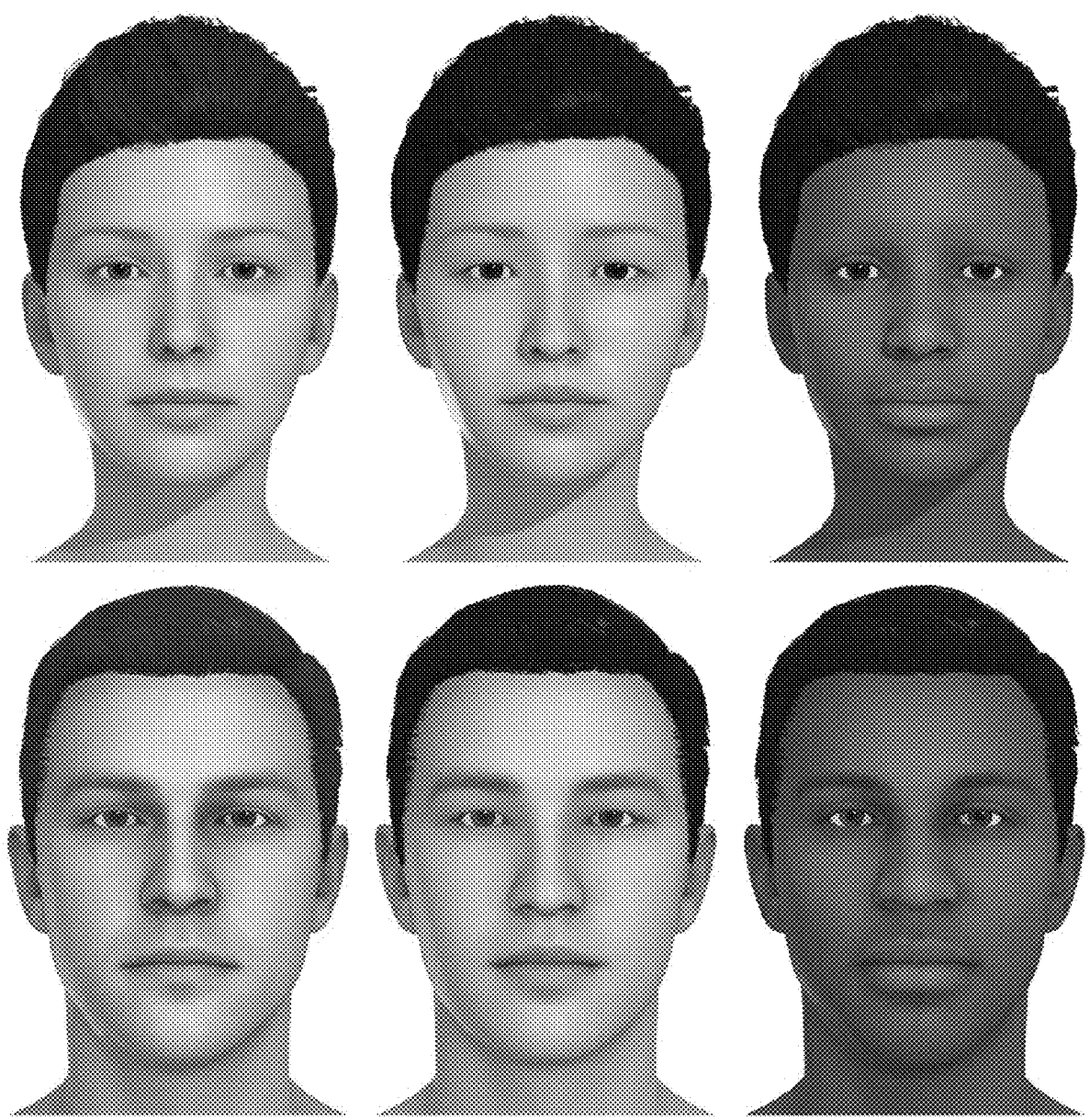
FIGS. 43 and 44 illustrate examples of different labeled ethnicities and ages in accordance with some embodiments of the invention.
Figure 44:

Process 4100 generates (4115) a 3D model based on the identified attributes. In several embodiments, a combination of deep learning and traditional optimization-based techniques are used to build a personalized avatar from an input image. An example of a process for generating a 3D model is conceptually illustrated in FIG. 42. Process 4200 receives an image (4205). Images can include (but are not limited to) images captured by a camera, images from storage or a network, and/or images from video. Process 4200 identifies (4210) taxonomy attributes from the received input image. In numerous embodiments, taxonomy attributes can include global attributes and local attributes. Global attributes in accordance with many embodiments of the invention can include (but are not limited to) age, gender, and/or ethnicity. Examples of different labeled ethnicities and ages are illustrated in FIGS. 43 and 44 respectively. Predictions (or classifications) for identifying global attributes in accordance with numerous embodiments of the invention are performed using a set of one or more classifier models, including (but not limited to) a convolutional neural network.

Local attributes in accordance with a number of embodiments of the invention can include (but are not limited to) head shape, eyelid turn, eyelid height, nose width, nose turn, mustache, beard, sideburns, eye rotation, jaw angle, lip thickness, and chin shape. In some embodiments, local attributes are identified using terminals that are trained to identify particular attributes and/or features for a face. Terminals in accordance with some embodiments of the invention can include separate terminals for attributes of different features (such as, but not limited to, eyes, ears, nose, lips, etc.). In some embodiments, multiple terminals can be used to identify multiple attributes of a single feature. For example, in some embodiments, a first terminal can be used to identify an eyelid type (e.g., monolid), while a second terminal can be used to determine a level of eyelid folding, where both attributes can contribute to the shape solving for a person's eyelids. In many embodiments, attributes can include binary attributes (e.g., monolid vs. double eyelid), or continuous attributes (e.g., lip thickness). In various embodiments, each image is labeled multiple times for any given attribute, such that ground truth may be treated as a distribution of what labelers believe the proper label to be, rather than defining attributes with a single binary value, as in the traditional one-hot vector.

Process 4200 selects (4215) a template model based on the identified global attributes. Selecting a template model in accordance with many embodiments of the invention can involve choosing from a library of template models based on the detected global attributes, where different template models have different characteristics such as (but not limited to) default solver shapes, initial meshes, etc. In some cases, the global attributes identified in accordance with some embodiments of the invention can serve as a better input to identifying shapes than other objective measures. For example, age is an attribute that can be very subjective. The use of subjective labels (e.g., how old does someone look) generated by the system, rather than objective labels (e.g., true age), can result in better performance on age classification.

Processes in accordance with a variety of embodiments of the invention employ local taxonomy shapes to allow for a more realistic and efficient computation of blend shapes for a 3D model based on one or more images. Local taxonomy shapes in accordance with various embodiments of the invention can provide improved face reconstruction from a photo with data driven solver initialization.

In some embodiments, local taxonomy attributes models (or terminals) are trained as classifiers. Portrait photographs used for training can be hand labeled for each local taxonomy attribute (chin shape, lip thickness, etc). Each local taxonomy attribute is assigned one of some set of possible labels. For example, in FIG. 1), eye height can be: narrow, average, or round. In numerous embodiments, a single global attributes model (e.g., used for predicting age, gender, and ethnicity) is also used in conjunction with fully-connected "terminals" for the new local taxonomy attributes. Models in accordance with some embodiments of the invention use or predict distributions rather than specific predictions by mapping discrete labels to a continuous space.

$$v(l) = \begin{cases} -1: & l = \text{thin} \\ 0: & l = \text{average} \\ +1: & l = \text{thick} \end{cases}$$

Arbitrary functions (e.g., the expected value) of the deep learning (DL) predicted distribution can be computed to set the taxonomy shapes (and initialize the solve) to values "between" discrete labels to reflect the fact that the model is having difficulty deciding between thin and average lips. In certain embodiments, this type of regression through classification can often be preferable to directly regressing the output with an L2 loss. In other embodiments, processes can directly regress the output with an L2 loss.

Figure 45:
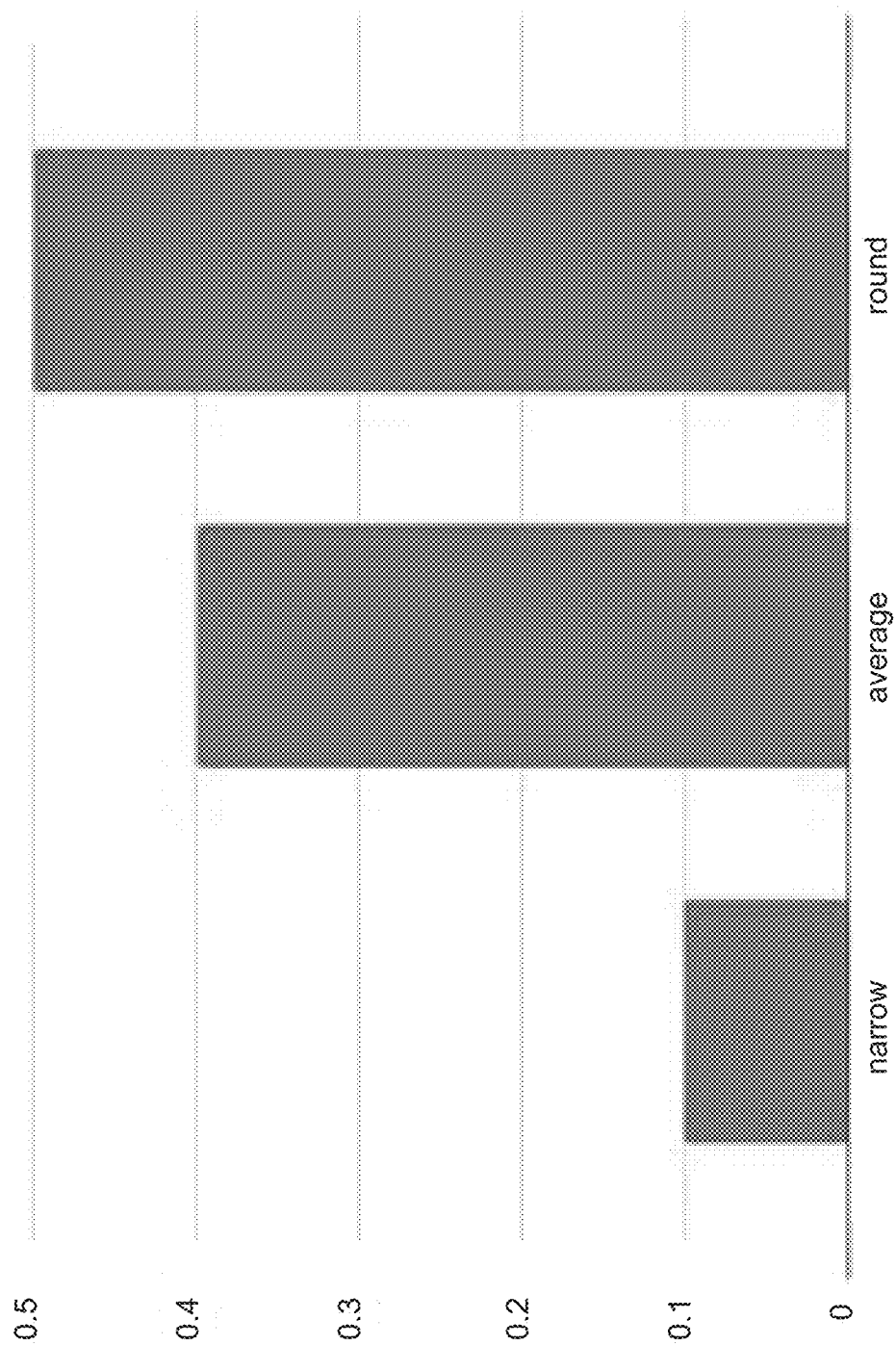
FIG. 45 illustrates an example of a softmax distribution output by an attributes classifier in accordance with an embodiment of the invention.

Given a new input image, models in accordance with a number of embodiments of the invention output a softmax distribution for each attribute which describes the probability of the input having a particular label for a given attribute. An example of a softmax distribution output by an attributes classifier is illustrated in FIG. 45. Distributions for initializing the shape parameters can be used in a variety of ways in accordance with various embodiments of the invention. In various embodiments, a label with the highest probability is used to directly set the shape parameters associated with the attribute. For example, in FIG. 45, the solver shapes could be set to those associated with the "round" label to a predetermined value of 1.0 because it has the highest probability. The optimization would then make shape adjustments anchored from here.

In other embodiments, labels can be applied as part of a continuum. In the case of eye height: narrow, average, and round may be thought of as points on a line [−1,1] where:

$$v(l) = \begin{cases} -1: & l = \text{narrow} \\ 0: & l = \text{average} \\ +1: & l = \text{round} \end{cases}$$

In many embodiments, the shape parameters can be initialized to continuous values based on the expected value of the attribute as computed from the probability distribution returned by the model, setting the associated eye shape somewhere between average and round.

$$\theta_{eye\_shape} = \sum_l p(l)v(l)$$

$l \in$ narrow, average, round

Process 4200 performs (4220) shape solves for the selected template model based on the identified local taxonomy attributes. In many embodiments, predictions for these local taxonomy attributes can extend the solver initialization beyond template selection, and provide a more precise initial parameter estimate. In certain embodiments, a data-driven initial shape, which is independent of any camera parameter estimate, can allow for better intrinsic and extrinsic camera calibration, which in turn allows for more accurate face reconstruction. Nonlinear optimization can be highly sensitive to initialization. In order to avoid local minima and unrealistic solutions, some type of regularization can be required. In some embodiments, regularization can be used to favor solutions that don't deviate from too far from the average/template, but in doing so, can artificially suppress unique facial features of the subject. For solvers which depend on some type of shape basis (e.g. 3D Morphable Models), this approach can be particularly advantageous. Extreme care can be required when designing shapes that are amenable to optimization-based fitting frameworks. In various embodiments, linearly independent bases are employed. These can be computed automatically via PCA in accordance with some embodiments of the invention, but the resulting shapes typically are global in nature and not human-describable.

Shape solves in accordance with several embodiments of the invention are performed in accordance with a shape taxonomy. In a variety of embodiments, systems use solver shapes based on human-describable features, described within a shape taxonomy, making them simpler to model. For example, a small set of local shapes which explicitly adjusts the wideness (or roundness) of the eyes without affecting the rest of the face are preferable to a potentially large set of PCA shapes which adjust the eye as well as other regions of the face.

Solver parameterization in accordance with various embodiments of the invention uses human-describable parameterization which enables simplified extension to new styles and simple customization of facial features, such as nose width, etc., by allowing a user to specify desired corrections to model predicted features. In this matter, users can edit their avatars using individual controls for different features, in a consistent way without being adversely affected by the underlying solve. In certain embodiments, blend shapes can be edited "on top of" the solve. In some such embodiments, the edited blend shapes can require some type of compensation for the underlying solve. In certain embodiments, third-party artists can generate avatar styles. They can sculpt intuitive shapes for concepts like lip thickness and jaw angle, without worrying about solver-specific issues such as orthogonality. Avatar styles in accordance with many embodiments of the invention can be stored in a standardized file format that allows for the flexible use of such shapes in animating 3D models.

Figure 62:
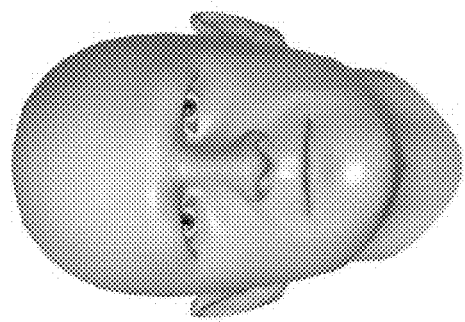
FIG. 62 illustrates an example of the results of taxonomy attribute solver initialization.
Figure 62:
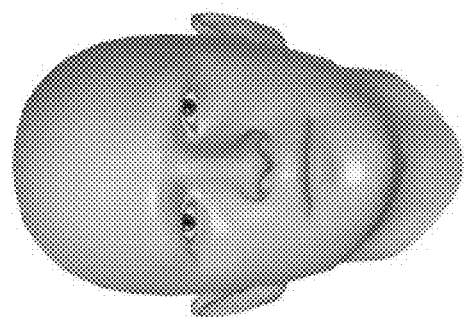
Figure 62:

In many embodiments, facial features in an image (e.g., eye shape, nose width, lip thickness) correspond to model parameters to be solved. Deep learning estimates initial values for these parameters directly from the image, and they are subsequently refined by a geometric solver. In numerous embodiments, facial landmark detection is performed to localize known landmarks L on the face such as corners of the eyes, jaw line, and lip contour. Camera parameters and face shape can be solved in accordance with various embodiments of the invention. Shape solves in accordance with numerous embodiments of the invention can involve fitting the parameterized model template to a set of sparse 2D facial landmarks. In a number of embodiments, fitting can involve computing camera parameters R, t, f as well as shape parameters Θ which minimize some energy function:

$$\min_{R,t,f,\Theta} E(R, t, f, \Theta, T_{aeg}, L)$$

where $T_{aeg}$ is the template for the predicted age/gender/ethnicity combination. In certain embodiments, the solver can be entirely responsible for computing the shape parameters which best explain the identity of the person in the input photograph given only a very course initialization consisting of the choice of template $T_{aeg}$. An example of this can be seen in FIG. 62, where the taxonomy attribute solver initialization is able to capture details, such as eye hood and nasolabial fold, with the solver, which aren't captured when the solver starts with only the average template. In this figure, in addition to the shape solve improvements, skin color predictions can help with capturing the users identity, and can be used to assist with texture generation processes in accordance with a variety of embodiments of the invention.

Processes in accordance with several embodiments of the invention allow for retargeting, which is the process of transferring the solved identity to other, potentially stylized models. This involves making deformations equivalent to those produced by the solver on a stylized template.

Figure 42:
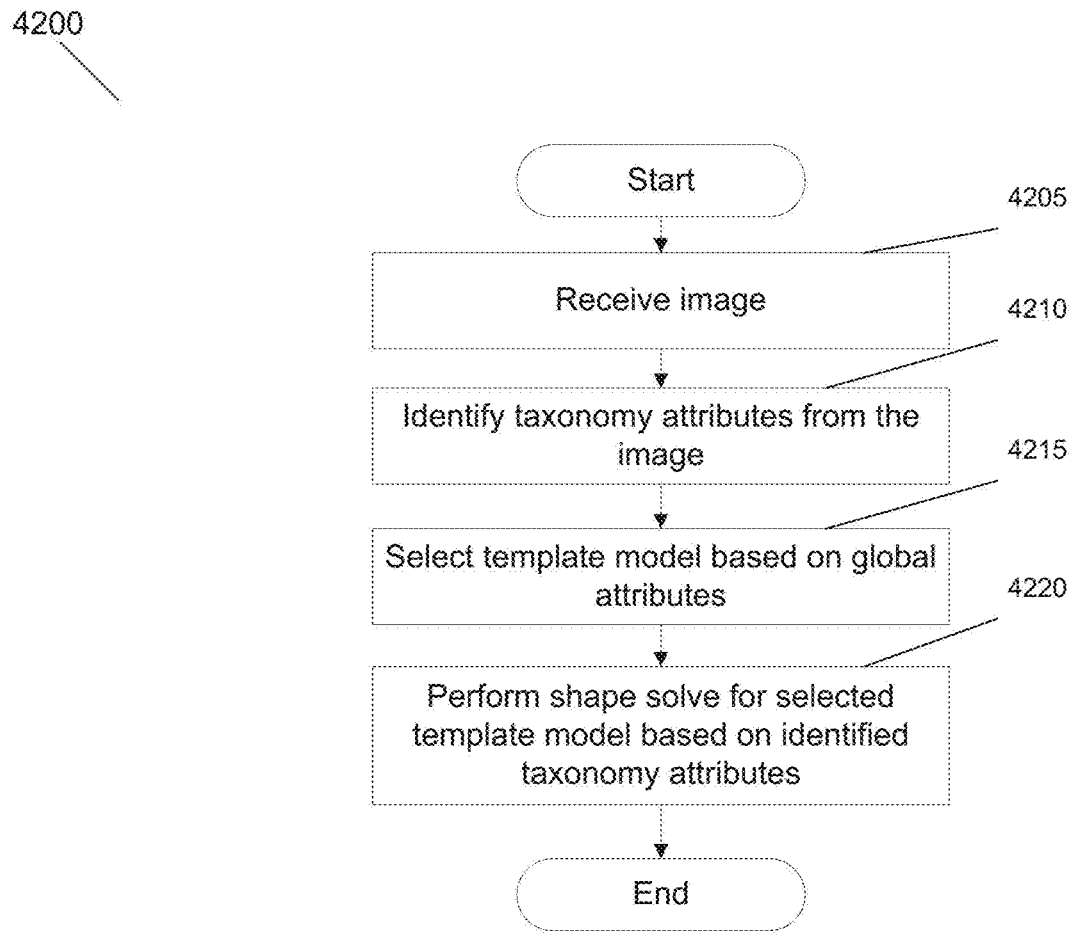
FIG. 42 illustrates an example of a process for generating a 3D model in accordance with an embodiment of the invention.

Although a specific example of a process for generating a 3D model is illustrated in FIG. 42, any of a variety of processes including (but not limited to) processes that utilize additional steps, fewer steps, and/or that perform the steps in a different order, can be utilized as appropriate to the requirements of specific applications in accordance with embodiments of the invention.

In various embodiments, solver shapes are carefully designed to work well within an optimization framework. This requires an artist to understand the structure of the human head and face in the highly unintuitive terms of nonlinear optimization. Nonlinear optimization can be highly sensitive to initialization, and a global initialization may only capture global information about a subject. In order to retarget avatar styles, an equivalent set of shapes to those used in the solver's shape parameterization can be used in accordance with a variety of embodiments of the invention. Taxonomy-based attributes can allow modelers to think in terms of higher-level facial features to improve an avatar-generators ability to scale across a range of target styles.

In certain embodiments, manual editing controls are separate from, and dependent on specific solves. For example, a control for making eyes narrower or wider (or rounder) will be sensitive to the change in eye angle resulting from a solve. A taxonomy setup in accordance with a number of embodiments of the invention can allow a system to designate different controls for different configurations. For example, systems in accordance with several embodiments of the invention can provide separate controls for handling the shape-editing of double eyelids vs. monolids.

In various embodiments, user preferences can also influence these initial estimates with prior solves. Because "taxonomy" attributes involve groups of human-identifiable features, they can more easily be used for editing avatars after the fact, and to capture a visual preference. Taxonomy-based edits can be used to directly influence initial estimates in subsequent solves, as they correspond directly to parameters to be initialized.

Returning to FIG. 41, process 4100 optionally receives (4120) inputs from a user to modify a generated 3D model and retrains (4125) weights of the terminal models based on the received inputs. Retraining allows the terminals to interpret identified features in a way to generate 3D models that are more inline with what a particular user wants. For example, if a user consistently chooses (e.g., through a user interface for modifying a generated avatar) to change an outcome such as squareness of jaw, this preference can be incorporated as a prior on the jaw shape parameter that initializes the solver, combining with other image predictions to smoothly incorporate a preference that is not present or not present in the same degree in the actual input image.

In many embodiments, a model is trained to create user-preferred avatar shapes by tracking both user customization and solver correction over time, and needs less input from the user after initial training.

Although a specific example of a process for training a generator for building a 3D model is illustrated in FIG. 41, any of a variety of processes including (but not limited to) processes that utilize additional steps, fewer steps, and/or that perform the steps in a different order, can be utilized as appropriate to the requirements of specific applications in accordance with embodiments of the invention.

Figure 46:
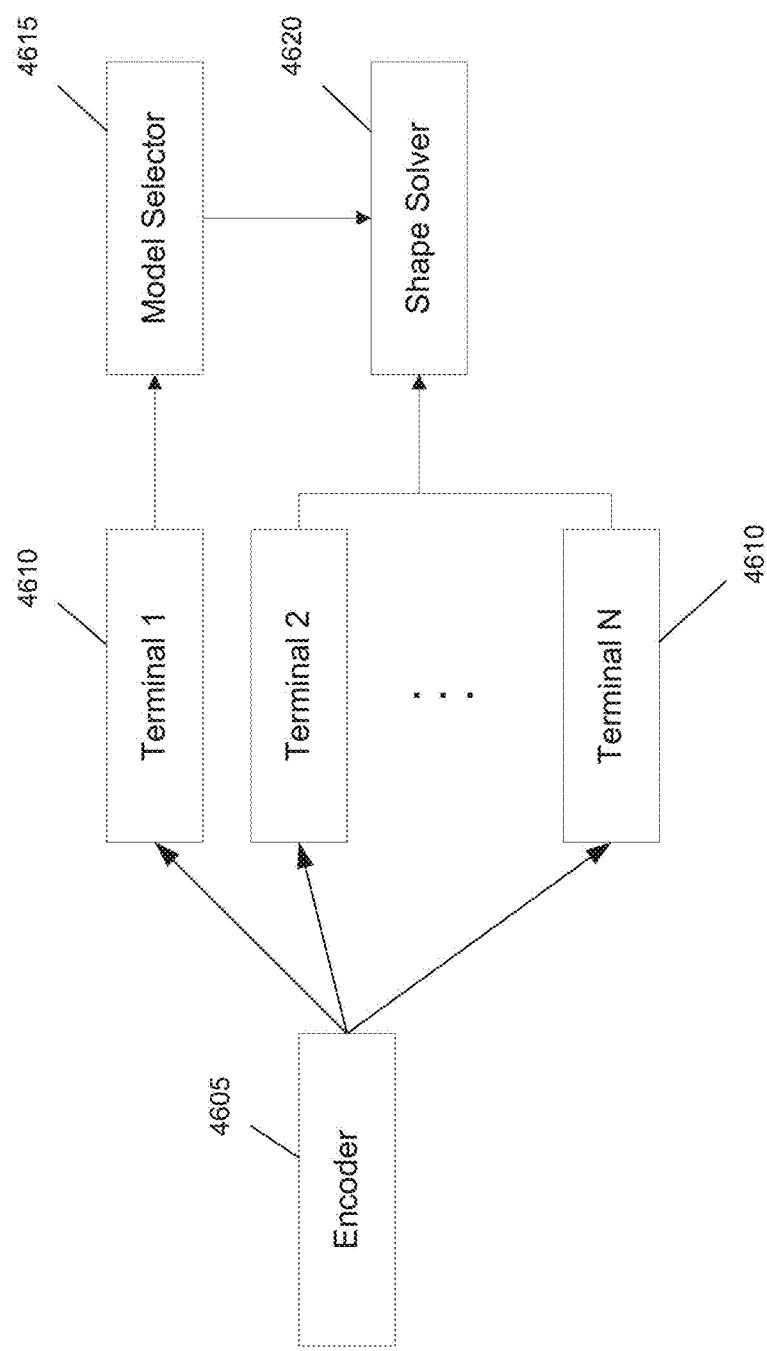
FIG. 46 illustrates an attribute classification system in accordance with an embodiment of the invention.

A taxonomy attribute classification system in accordance with an embodiment of the invention is illustrated in FIG. 46. Taxonomy attribute classification systems in accordance with several embodiments of the invention can include an encoder 4605 which computes a lower-dimension embedded from the input photograph, and a set of predictor terminals 4610 which predict labels for the various attributes. The predictor terminals 4610 can feed into one or both of a model selector 4615 and a shape solver 4620. In certain embodiments, global taxonomy attributes identified by a first set of one or more terminals is used to select an initial template model, while local taxonomy attributes identified from a different second set of one or more terminals is used to feed into a shape solver that initializes the selected model based on the identified local attributes and solves for the shapes.

The encoder network and the set of terminal networks in accordance with a variety of embodiments of the invention are independent, meaning that the terminal networks can be used with any of a variety of different encoder networks. This structure can provide flexibility in adding and training new predictors with the bulk of the model's size and runtime costs shared across terminals of the encoder, allowing the taxonomy attribute classification to run on mobile and low-compute devices, enabling human proportion character generation for AR. In many embodiments, different encoders can be swapped in and out as the base of the network. These could include networks which are pretrained on related but different face-related tasks such as recognition. Encoders in accordance with various embodiments of the invention, which have been trained for taxonomy attribute classification, can be coupled with a set of deconvolution layers to perform semantic segmentation of face parts such as eyes, eyebrows, nose, etc. In certain embodiments, dense pixel-level labeling in these segmentations may then also be used for further refinement of the shape solves.

Figure 47:
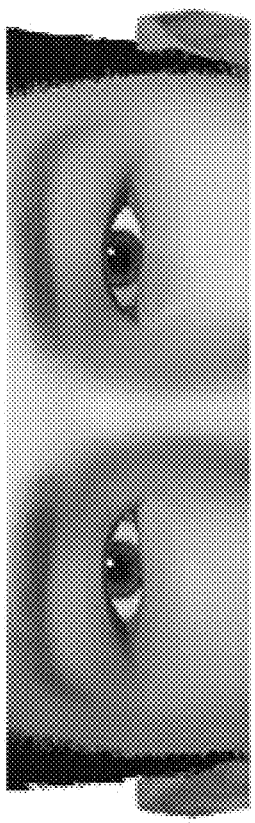
FIGS. 47-61 illustrate examples of variations in local shape attributes in accordance with some embodiments of the invention.
Figure 47:
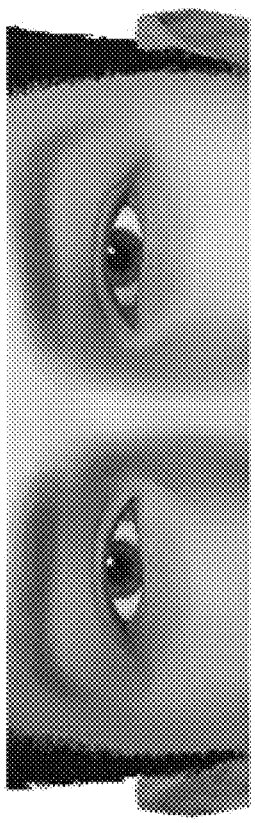
Figure 48:
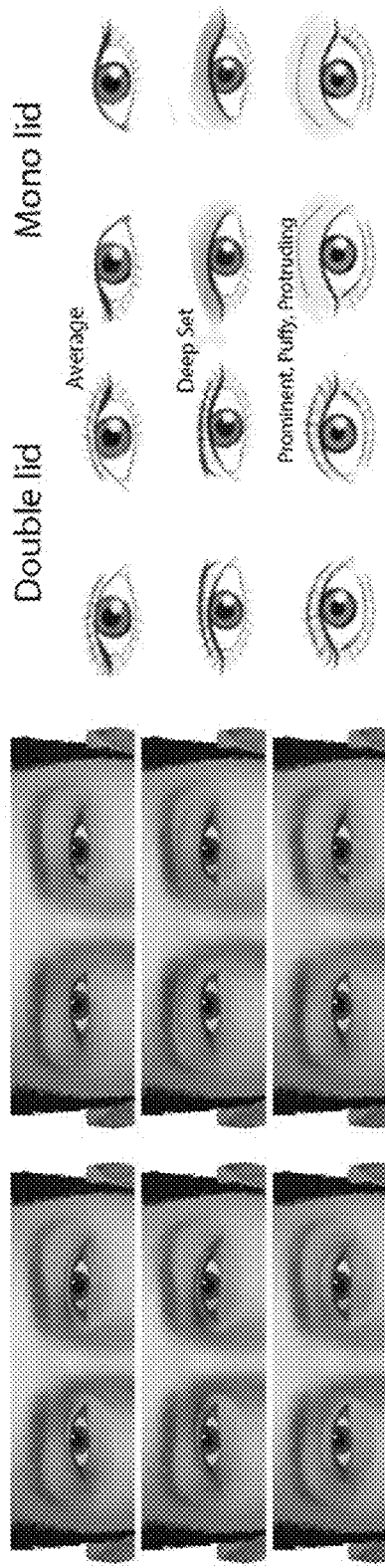
Figure 49:
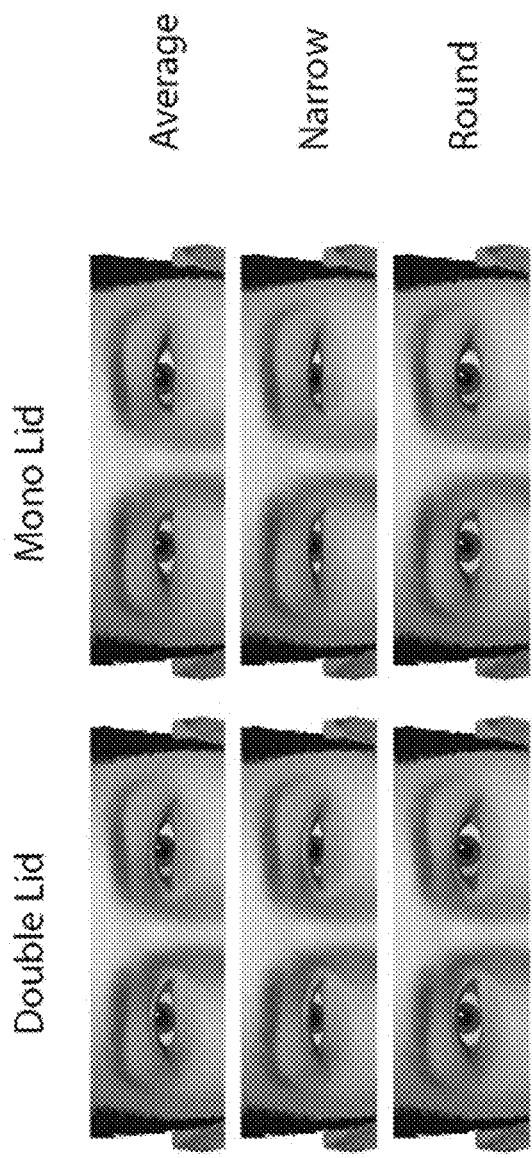
Figure 50:
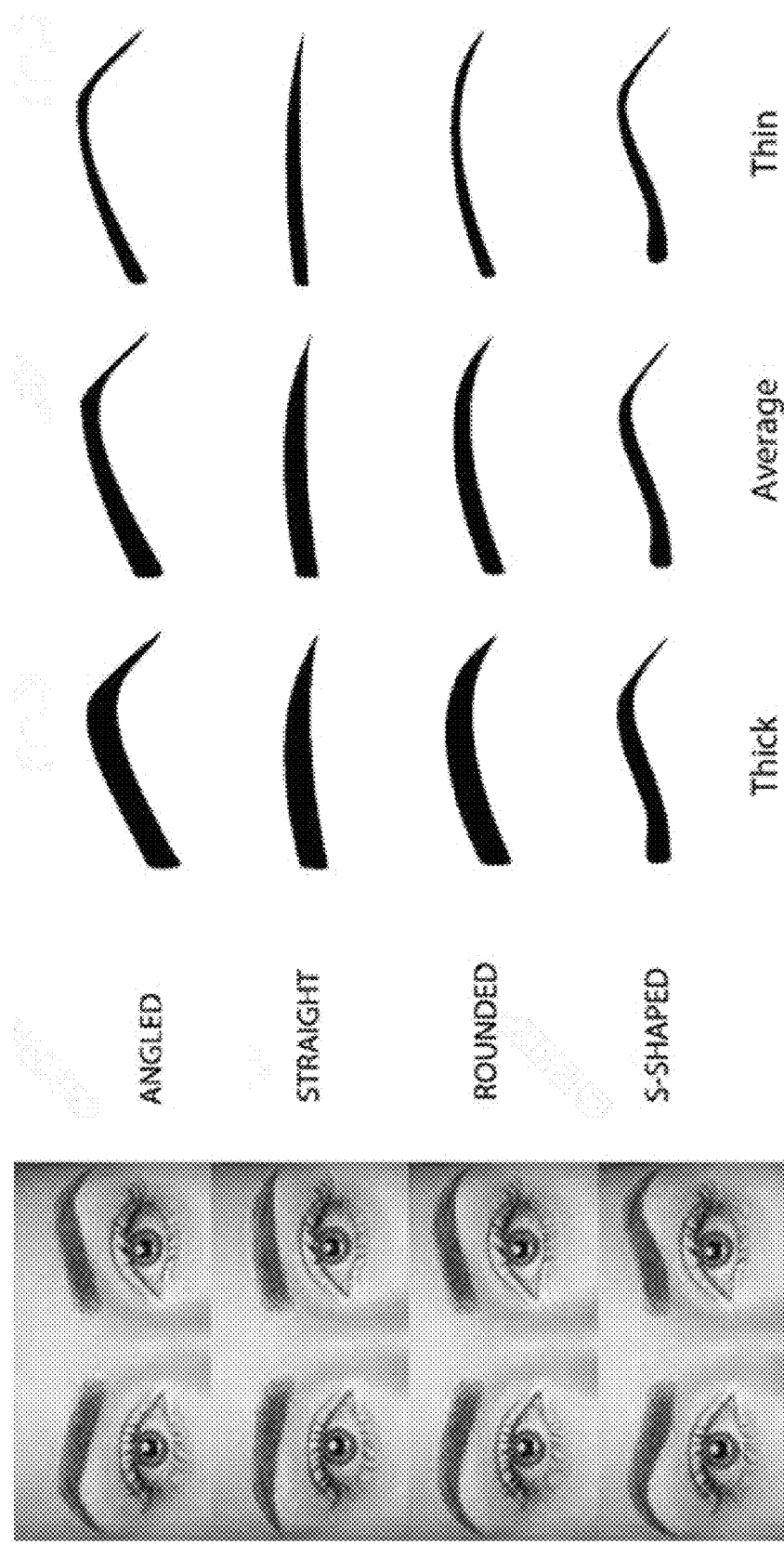
Figure 51:
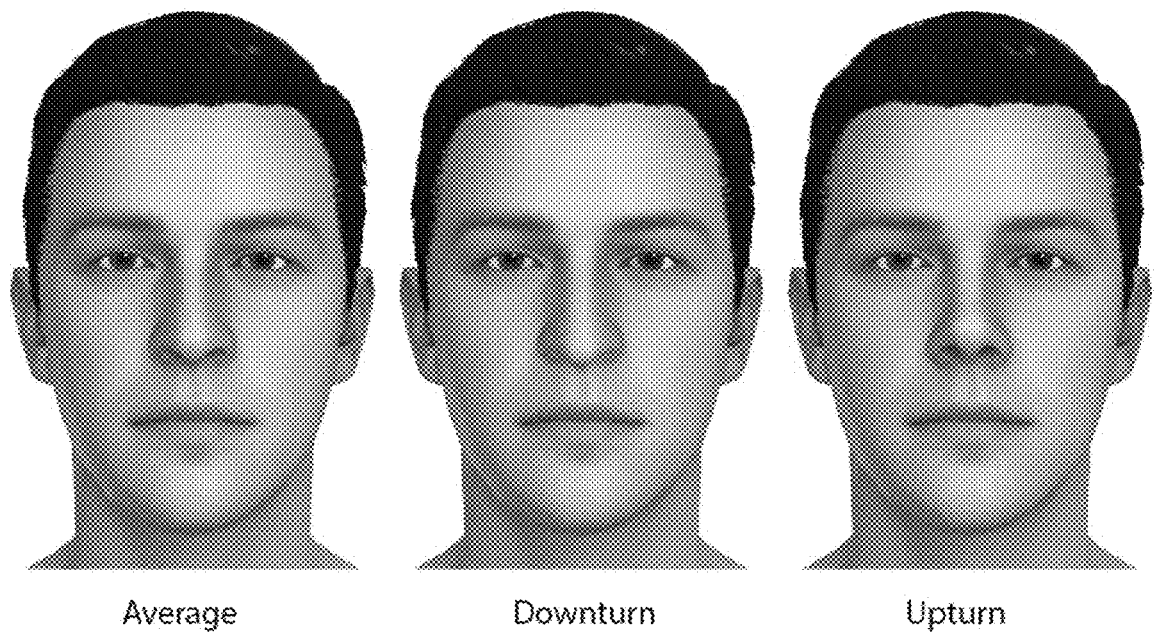
Figure 52:
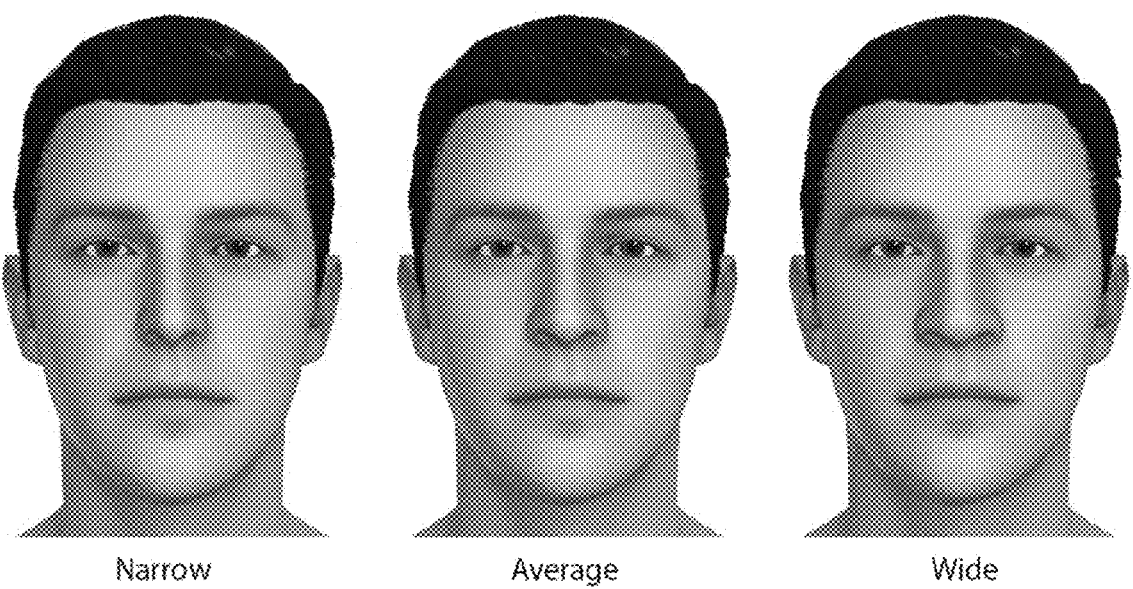
Figure 53:
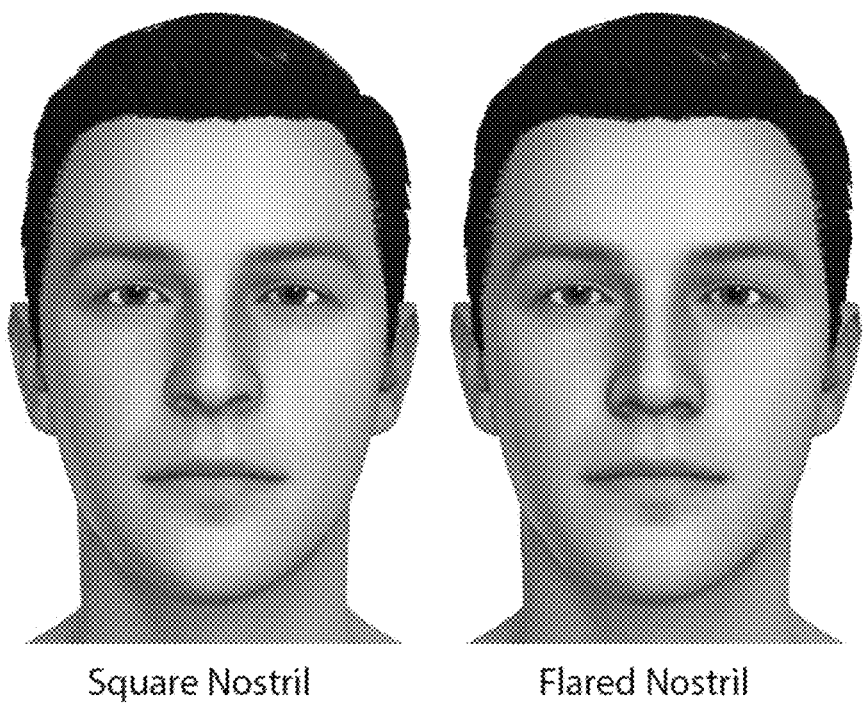
Figure 54:
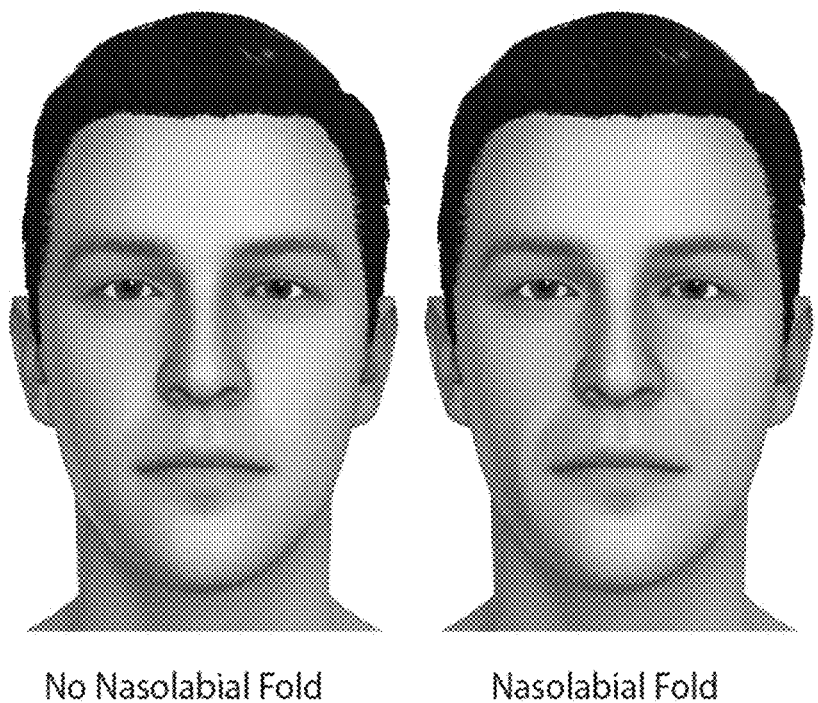
Figure 55:
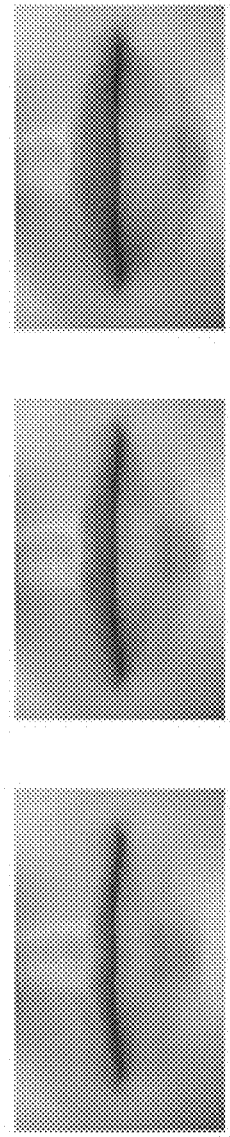
Figure 56:
Figure 57:
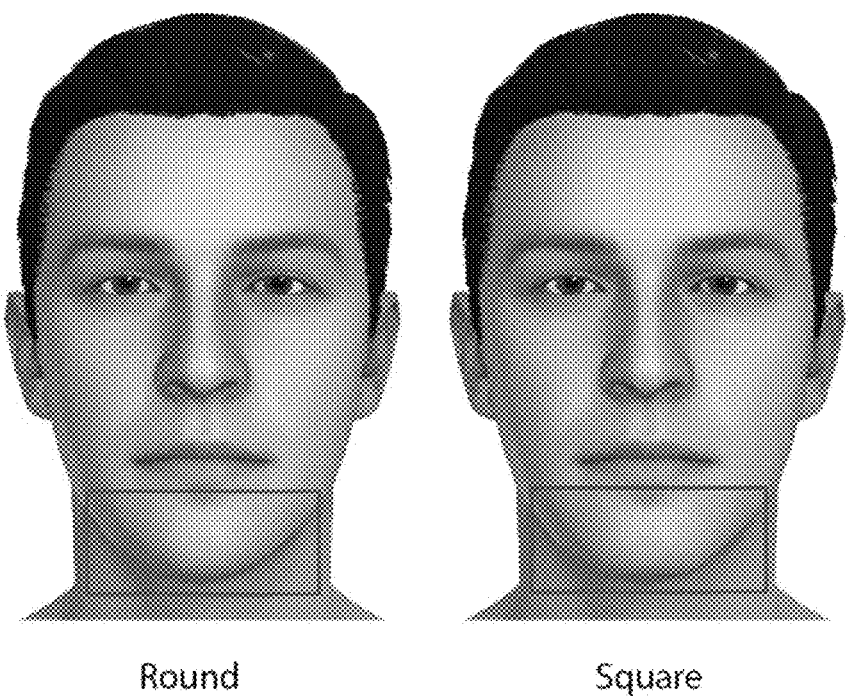
Figure 58:
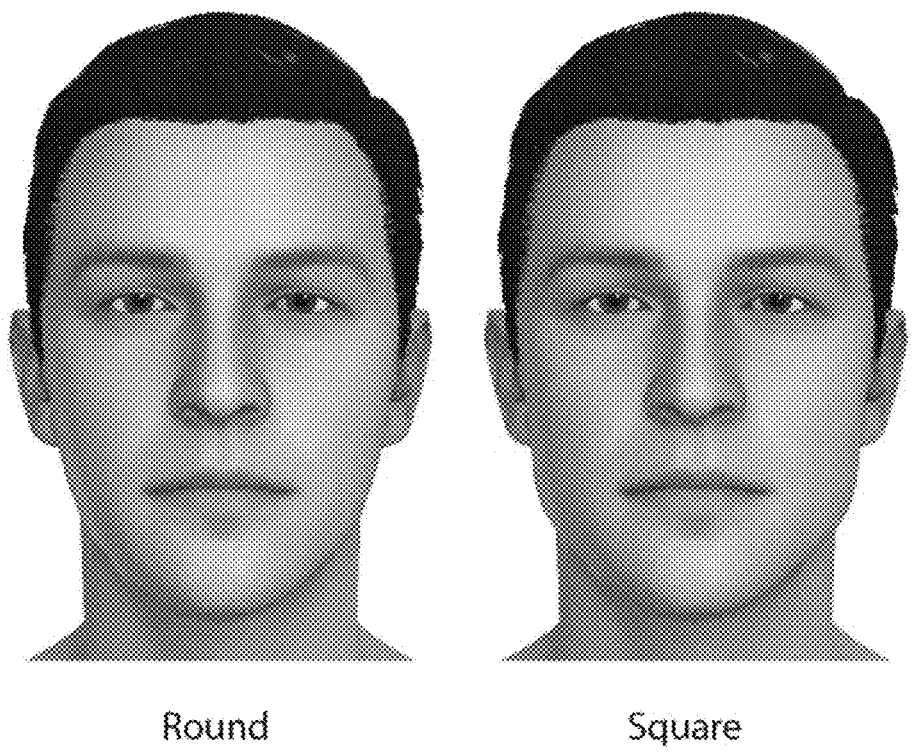
Figure 59:
Figure 60:
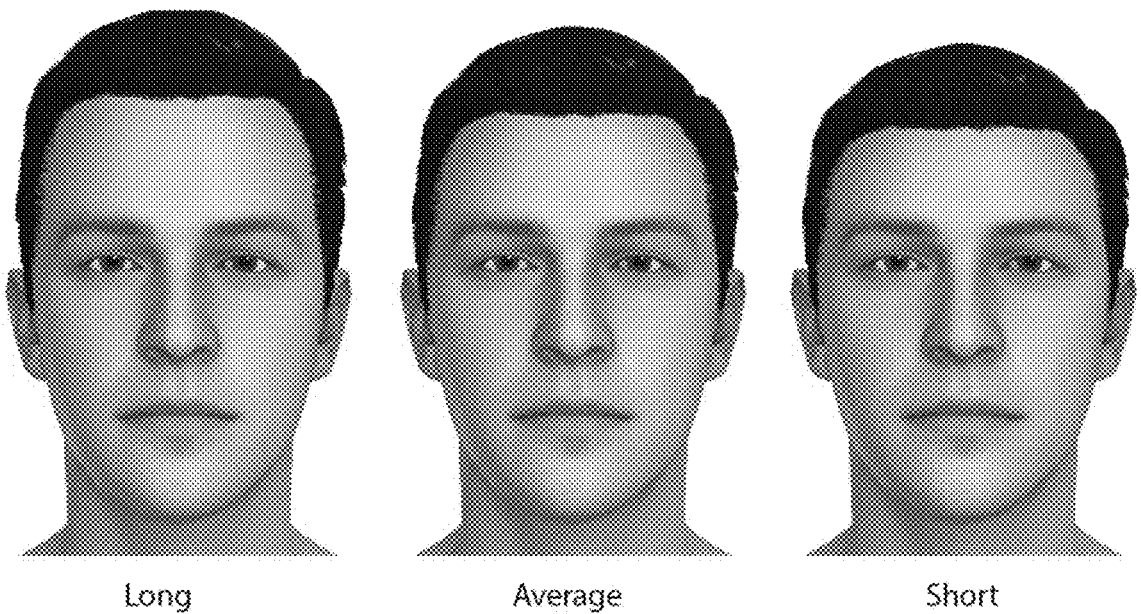
Figure 61:
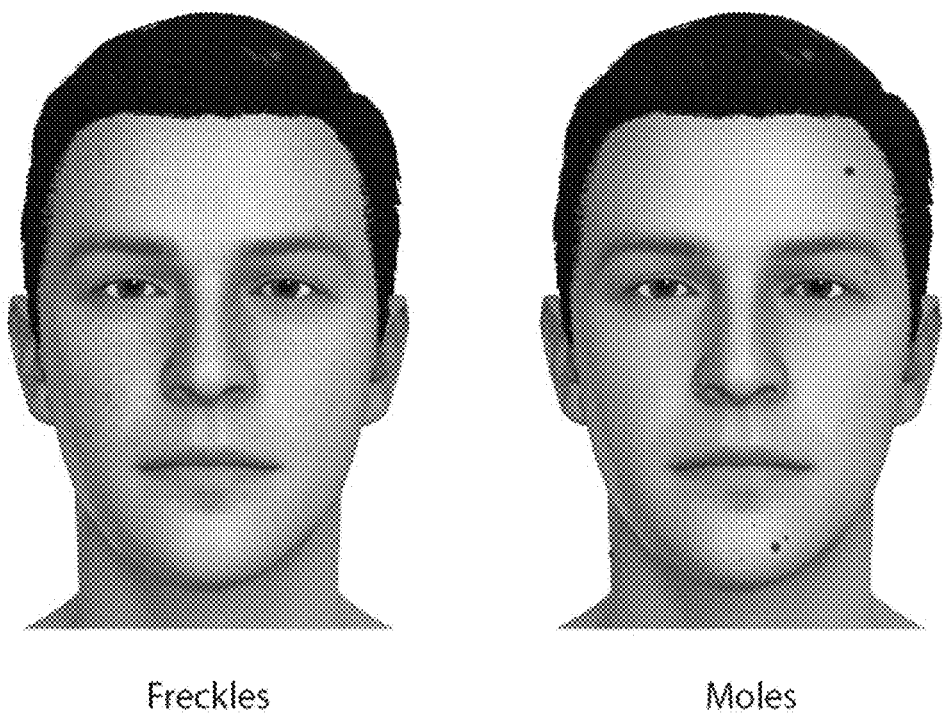

In certain embodiments, terminals are used to predict local taxonomy attributes in addition to the global ones. For a given base network, terminals can be added, modified, and/or removed to train a network and to generate a variety of different local attributes. Local taxonomy attributes can provide more fine-grained attributes within a broader class attribute. Local taxonomy attributes in accordance with a variety of embodiments of the invention can include variations such as (but not limited to) head shape, eye rotation, jaw angle, lip thickness, chin shape, and facial hair. Examples of such variations are illustrated in FIGS. 47-61. Examples of different eyelid types are illustrated in FIG. 47. In numerous embodiments, different shapes can be identified for a local shape attribute based on a secondary attribute. For example, a local eye shape height (or vertical narrowness or wideness) can provide different shapes based on whether a user has a mono lid or a double lid. FIGS. 48 and 49 illustrate examples of different variations (depth and height, respectively) that can be seen in a local eye attribute, as affected by an eyelid type. The different variations can include various different attributes of the eyes and/or surrounding regions, including (but not limited to) eye depths, eye rotations, eyelid hoods, and/or eye heights.

Different labeled examples of other attributes are illustrated in FIGS. 47-58. Examples of attributes for eyebrows, nose turn, nose width, nostril flare, nasolabial fold, lip thickness, cleft chin, chin shape, and jaw angle are illustrated in FIGS. 47-58 respectively. Taxonomy attributes can also include other more general features, such as, but not limited to, head shape and skin attributes. Examples of head shape, face height, and skin attributes are illustrated in FIGS. 47-61.

Skin-related taxonomy attributes such as age, gender, ethnicity, skin color, nasolabial fold, moles and freckles may be used for texture synthesis. For example, the attribute predictions for the above attributes may be used to compute a blend of textures which form a taxonomy texture basis to generate personalized skin textures.

Hair and facial hair-related taxonomy attributes may be used for selecting or synthesizing personalized hair and facial hair styles respectively. One possible implementation could perform a nearest neighbor lookup of the hair or facial hair style which is closest to the hair or facial hair predictions.

Although a specific example of a taxonomy attribute classification system is illustrated in FIG. 46 and examples of different taxonomy attributes are illustrated in FIGS. 47-61, any of a variety of attributes and attribute classification systems can be utilized to perform processes similar to those described herein as appropriate to the requirements of specific applications in accordance with embodiments of the invention.

Although the present invention has been described in certain specific aspects, many additional modifications and variations would be apparent to those skilled in the art. It is therefore to be understood that the present invention may be practiced otherwise than specifically described, including any variety of models of and machine learning techniques to learn the 3D shape of human faces and the manner in which to animate 3D models of heads to mimic facial movements during speech, without departing from the scope and spirit of the present invention. Thus, embodiments of the present invention should be considered in all respects as illustrative and not restrictive.

What is claimed is:

1. A method for generating a three dimensional (3D) head model from a captured image, the method comprising:
   receiving a captured image;
   identifying a set of taxonomy attributes from the captured image by:
      using a single encoder model to generate an embedding of the captured image;
      using a set of one or more terminal models to analyze the generated embedding; and
      identifying taxonomy attributes based on the classifications of the terminal models;
   selecting a template model for the captured image; and
   performing a shape solve for the selected template model based on the identified taxonomy attributes.

2. The method of claim 1, wherein the set of taxonomy attributes comprises a set of one or more local taxonomy attributes and a set of one or more global taxonomy attributes.

3. The method of claim 2 further comprising performing a texture synthesis based on one or more of the taxonomy attributes.

4. The method of claim 2, wherein the template model is selected based on the set of global taxonomy attributes.

5. The method of claim 2, wherein identifying the set of global taxonomy attributes comprises using a classifier model to classify the captured image.

6. The method of claim 2, wherein the set of global taxonomy attributes comprises at least one of an ethnicity and a gender.

7. The method of claim 2, wherein the set of local taxonomy attributes comprise one or more of head shape, eyelid turn, eyelid height, nose width, nose turn, mustache, beard, sideburns, eye rotation, jaw angle, lip thickness, and chin shape.

8. The method of claim 1, wherein each terminal model of the set of terminal models produces a score for an associated local taxonomy attribute, wherein performing the shape solve for a given local taxonomy attribute is based on the score calculated for the local taxonomy attribute.

9. The method of claim 1 further comprising:
   training the single encoder model and the set of terminal models, wherein each terminal model is trained to classify a different taxonomy attribute.

10. The method of claim 9, wherein training the encoder comprises:
    generating an embedding from the single encoder model;
    calculating a first loss for a first terminal model based on the generated embedding;
    back propagating the first calculated loss through the encoder;
    calculating a second loss for a second terminal model based on the generated embedding; and
    back propagating the second calculated loss through the single encoder model.

11. The method of claim 1, wherein receiving the captured image comprises capturing an image with a camera of a mobile device, wherein performing the shape solve is performed on the same mobile device.

12. A non-transitory machine readable medium containing processor instructions for generating a three dimensional (3D) head model from a captured image, where execution of the instructions by a processor causes the processor to perform a process that comprises:
    receiving a captured image;
    identifying a set of taxonomy attributes from the captured image by:
       using a single encoder model to generate an embedding of the captured image;
       using a set of one or more terminal models to analyze the generated embedding; and
       identifying taxonomy attributes based on the classifications of the terminal models;
    selecting a template model for the captured image; and
    performing a shape solve for the selected template model based on the identified taxonomy attributes.

13. The non-transitory machine readable medium of claim 12, wherein the set of taxonomy attributes comprises a set of one or more local taxonomy attributes and a set of one or more global taxonomy attributes, wherein the template model is selected based on the set of global attributes.

14. The non-transitory machine readable medium of claim 13, wherein the set of global taxonomy attributes comprises at least one of an ethnicity and a gender.

15. The non-transitory machine readable medium of claim 13, wherein execution of the instruction further causes the processor to perform a texture synthesis based on one or more of the taxonomy attributes.

16. The non-transitory machine readable medium of claim 12, wherein the process further comprises training the single encoder model and the set of terminal models, wherein each terminal model is trained to classify a different taxonomy attribute.

17. The non-transitory machine readable medium of claim 16, wherein training the encoder comprises:
generating an embedding from the single encoder model;
calculating a first loss for a first terminal model based on the generated embedding;
back propagating the first calculated loss through the encoder;
calculating a second loss for a second terminal model based on the generated embedding; and
back propagating the second calculated loss through the single encoder model.

18. The non-transitory machine readable medium of claim 12, wherein receiving the captured image comprises capturing an image with a camera of a mobile device, wherein performing the shape solve is performed on the same mobile device.

\* \* \* \* \*